US012621133B2

(12) United States Patent
Zhang et al.

(10) Patent No.: US 12,621,133 B2
(45) Date of Patent: May 5, 2026

(54) SYSTEM AND METHOD FOR QUANTUM-SECURE MICROGRIDS

(71) Applicants: THE RESEARCH FOUNDATION FOR THE STATE UNIVERSITY OF NEW YORK, Albany, NY (US); UNIVERSITY OF CONNECTICUT, Storrs, CT (US)

(72) Inventors: Peng Zhang, Storrs, CT (US); Zefan Tang, Stony Brook, NY (US); Walter Krawec, Storrs, CT (US)

(73) Assignees: The Research Foundation for The State University of New York, Albany, NY (US); University of Connecticut, Storrs, CT (US)

( * ) Notice: Subject to any disclaimer, the term of this patent is extended or adjusted under 35 U.S.C. 154(b) by 101 days.

(21) Appl. No.: 18/578,146

(22) PCT Filed: Jul. 19, 2022

(86) PCT No.: PCT/US2022/037549
§ 371 (c)(1),
(2) Date: Jan. 10, 2024

(87) PCT Pub. No.: WO2023/003847
PCT Pub. Date: Jan. 26, 2023

(65) Prior Publication Data
US 2025/0007700 A1      Jan. 2, 2025

Related U.S. Application Data

(60) Provisional application No. 63/325,210, filed on Mar. 30, 2022, provisional application No. 63/223,751, filed on Jul. 20, 2021.

(51) Int. Cl.
*H04L 9/08* (2006.01)
*H04L 45/28* (2022.01)

(52) U.S. Cl.
CPC ............ *H04L 9/0852* (2013.01); *H04L 9/085* (2013.01); *H04L 45/28* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS

| | | | |
|---|---|---|---|
| 5,764,765 A * | 6/1998 | Phoenix | H04L 9/0858 380/256 |
| 6,748,083 B2 * | 6/2004 | Hughes | H04L 9/0858 380/278 |

(Continued)

FOREIGN PATENT DOCUMENTS

| | | |
|---|---|---|
| AU | 2018204727 B2 | 5/2020 |
| CN | 109347634 A | 2/2019 |

(Continued)

OTHER PUBLICATIONS

Angjelichinoski, M., et al., "Secure and Robust Authentication for DC MicroGrids based on Power Talk Communication", arXiv:1612. 07213v2 [cs.SY], Dec. 22, 2016, 7 pages.

(Continued)

*Primary Examiner* — Sharif E Ullah
(74) *Attorney, Agent, or Firm* — Scully, Scott, Murphy & Presser, P.C.

(57)      ABSTRACT

A quantum-key distributed (QKD)-enabled communication architecture it devises for networked microgrids (NMGs). A real-time QKD-enabled NMGs testbed built in an RTDS environment, and a novel two-level key pool sharing (TLKPS) strategy it designs to improve the system resilience against cyberattacks. In the QKD-based microgrid testbed design there is used a real-time power system simulator, i.e., RTDS, including the QKD modeling, hardware connection, (Continued)

10 communication network design, and QKD integration. By integrating QKD features into a real-time microgrid simulator, this testbed offers a flexible and programmable testing environment for evaluating the performance of QKD-enabled microgrids under a variety of scenarios.

37 Claims, 32 Drawing Sheets

(58) Field of Classification Search
   CPC ....... H04L 9/3226; H04L 9/0891; H04L 9/14; H04L 9/0827; H04L 2209/24; H04L 9/08; H04L 9/0819; H04L 9/088; H04L 9/0869; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
   USPC ........ 380/278, 255, 264, 276; 726/2, 21, 36; 713/150, 163, 181
   See application file for complete search history.

(56) References Cited

U.S. PATENT DOCUMENTS

| | | | | | |
|---|---|---|---|---|---|
| 7,437,081 | B2 * | 10/2008 | Mitchell | ............... | H04B 10/70 398/154 |
| 8,855,316 | B2 * | 10/2014 | Wiseman | ............. | H04L 9/0855 380/278 |
| 9,960,465 | B2 * | 5/2018 | Dudley | ............... | H01M 50/204 |
| 10,057,058 | B2 * | 8/2018 | Murakami | ............ | H04L 9/0858 |
| 10,103,880 | B2 * | 10/2018 | Fu | ......................... | H04L 9/0897 |
| 10,678,198 | B2 * | 6/2020 | Burstall | ............ | H02J 13/00028 |
| 2005/0138352 | A1 * | 6/2005 | Gauvreau | ............. | H04L 9/3247 713/153 |
| 2005/0221759 | A1 * | 10/2005 | Spadafora | .............. | G08G 1/093 455/39 |
| 2007/0065154 | A1 * | 3/2007 | Luo | ..................... | H04J 14/0282 398/141 |
| 2007/0076884 | A1 * | 4/2007 | Wellbrock | ............ | H04L 9/0855 380/263 |
| 2007/0195774 | A1 * | 8/2007 | Sherman | ................. | H04L 69/16 370/392 |
| 2011/0206204 | A1 * | 8/2011 | Sychev | ................... | H04J 14/06 380/256 |
| 2011/0213979 | A1 * | 9/2011 | Wiseman | ............. | H04L 9/0844 713/171 |
| 2011/0243331 | A1 * | 10/2011 | Yasuda | ................ | H04L 9/0836 380/46 |
| 2012/0045208 | A1 * | 2/2012 | Yasuda | ................... | H04B 10/60 398/65 |
| 2012/0082464 | A1 * | 4/2012 | Yasuda | ............. | H04B 10/6166 398/152 |
| 2012/0237202 | A1 * | 9/2012 | Abe | ................... | H04B 10/6164 398/16 |
| 2013/0051790 | A1 * | 2/2013 | Yasuda | ............. | H04B 10/6151 398/16 |
| 2013/0266308 | A1 * | 10/2013 | Fukuchi | ............... | H04B 10/616 398/16 |
| 2014/0010234 | A1 * | 1/2014 | Patel | ....................... | H04L 45/74 370/392 |
| 2014/0068765 | A1 * | 3/2014 | Choi | ................... | H04L 63/1416 726/23 |
| 2014/0133652 | A1 * | 5/2014 | Oshida | ................. | H04L 9/0897 380/255 |
| 2014/0286638 | A1 * | 9/2014 | Yasuda | ................... | H04J 14/06 398/65 |
| 2015/0372765 | A1 * | 12/2015 | Yasuda | ............... | H04B 10/613 398/29 |
| 2016/0036554 | A1 * | 2/2016 | Yasuda | ................... | H04J 14/06 398/65 |
| 2016/0050025 | A1 * | 2/2016 | Yasuda | .............. | H04B 10/6165 398/65 |
| 2016/0155327 | A1 * | 6/2016 | Schlienz | .......... | G08G 1/096791 340/907 |
| 2016/0218867 | A1 * | 7/2016 | Nordholt | ............... | H04L 9/0852 |
| 2016/0241396 | A1 * | 8/2016 | Fu | ......................... | H04L 9/0836 |
| 2016/0323736 | A1 * | 11/2016 | Donahue | .............. | H04L 63/061 |
| 2016/0359626 | A1 * | 12/2016 | Fu | ......................... | H04L 9/0858 |
| 2016/0366094 | A1 * | 12/2016 | Mason | ................ | H04L 61/5038 |
| 2017/0019251 | A1 * | 1/2017 | Jain | ........................... | H04L 9/12 |
| 2017/0214525 | A1 * | 7/2017 | Zhao | ................. | H04W 12/0431 |
| 2017/0230173 | A1 * | 8/2017 | Choi | ..................... | H04L 9/0861 |
| 2017/0338895 | A1 * | 11/2017 | Yasuda | ............. | H04B 10/6971 |
| 2017/0338952 | A1 * | 11/2017 | Hong | ..................... | H04L 9/083 |
| 2018/0176091 | A1 * | 6/2018 | Yoon | ..................... | H04L 5/1446 |
| 2018/0248582 | A1 * | 8/2018 | Yasuda | ................... | H04J 11/00 |
| 2019/0036821 | A1 * | 1/2019 | Levy | ................... | G06F 12/0868 |
| 2019/0115983 | A1 * | 4/2019 | Yasuda | ............... | H04B 10/612 |
| 2019/0149327 | A1 * | 5/2019 | Yuan | ..................... | H04L 9/0852 380/255 |
| 2019/0260581 | A1 * | 8/2019 | Su | ............................ | H04L 9/08 |
| 2019/0349392 | A1 * | 11/2019 | Wetterwald | ......... | H04L 43/0852 |
| 2020/0084222 | A1 * | 3/2020 | William | .................. | H04L 63/12 |
| 2020/0382219 | A1 * | 12/2020 | Innes | .................... | H04W 12/04 |
| 2022/0360434 | A1 * | 11/2022 | Choi | ..................... | H04L 63/061 |
| 2024/0283638 | A1 * | 8/2024 | Yasuda | ................... | H04L 9/085 |
| 2025/0141671 | A1 * | 5/2025 | Kawakami | ............ | H04L 9/0819 |

FOREIGN PATENT DOCUMENTS

| | | |
|---|---|---|
| CN | 112583580 A | 3/2021 |
| CN | 112039657 B | 5/2021 |
| CN | 110365476 B | 6/2021 |
| CN | 112887086 A | 6/2021 |
| EP | 3417569 A1 | 12/2018 |
| EP | 3417569 B1 | 11/2020 |
| TW | 201731252 A | 9/2017 |
| WO | 2012139174 A1 | 10/2012 |
| WO | 2016027041 A1 | 2/2016 |

OTHER PUBLICATIONS

Guejia Burbano, R.A., et al., "IED Design for a Small-Scale Microgrid Using IEC 61850", IEEE Transactions on Industry Applications, Nov./Dec. 2019, pp. 7113-7121, vol. 55, No. 6.

Kayem, A., et al., "Key Management for Secure Demand Data Communication in Constrained Micro-grids.", 2016 30th International Conference on Advanced Information Networking and Applications Workshops, Mar. 2016, pp. 585-590.

Kounev, V., et al., "A Secure Communication Architecture for Distributed Microgrid Control", IEEE Transactions on Smart Grid, Sep. 2015, pp. 2484-2492, vol. 6, No. 5.

Setiawan, M.A., et al., "ZigBee-Based Communication System for Data Transfer Within Future Microgrids", IEEE Transactions on Smart Grid, Sep. 2015, pp. 2343-2355, vol. 6, No. 5.

Tang, Z., et al., "Quantum-Secure Networked Microgrids", 2020 IEEE Power & Energy Society General Meeting (PESGM), Aug. 2020, 5 pages.

Tang, Z., et al., "Programmable Quantum Networked Microgrids", IEEE Transactions on Quantum Engineering 2020, Received Jun. 27, 2020, revised Aug. 4, 2020, accepted Aug. 24, 2020, date of publication Aug. 26, 2020, date of current version Sep. 16, 2020, 13 pages, vol. 1, 4101013.

Tang, Z., et al., "A Quantum Leap in Microgrids Security", IEEE Electrification Magazine, Mar. 2021, pp. 66-73.

Tang, Z., et al., "Quantum-Secure Microgrid", IEEE Transactions on Power Systems, Mar. 2021, pp. 1250-1263, vol. 36, No. 2.

International Search Report dated Dec. 29, 2022 issued in PCT/US2022/037549.

Written Opinion dated Dec. 29, 2022 issued in PCT/US2022/037549.

Tang et al., "Quantum-Secure Networked Microgrids", 2020 IEEE Power & Energy Society General Meeting (PESGM), 2020, pp. 107-112 [online], [retrieved on Oct. 13, 2002]. Retrieved from the

(56)  References Cited

OTHER PUBLICATIONS

Internet <URL:https://drive.google.com/file/d/ 1Xul2OW6h3hkxxtYUw7Oeh4hRd9-EHz-D/vlew> <DOI: 10.1109/ PESGM41954.2020.9281884>.

* cited by examiner

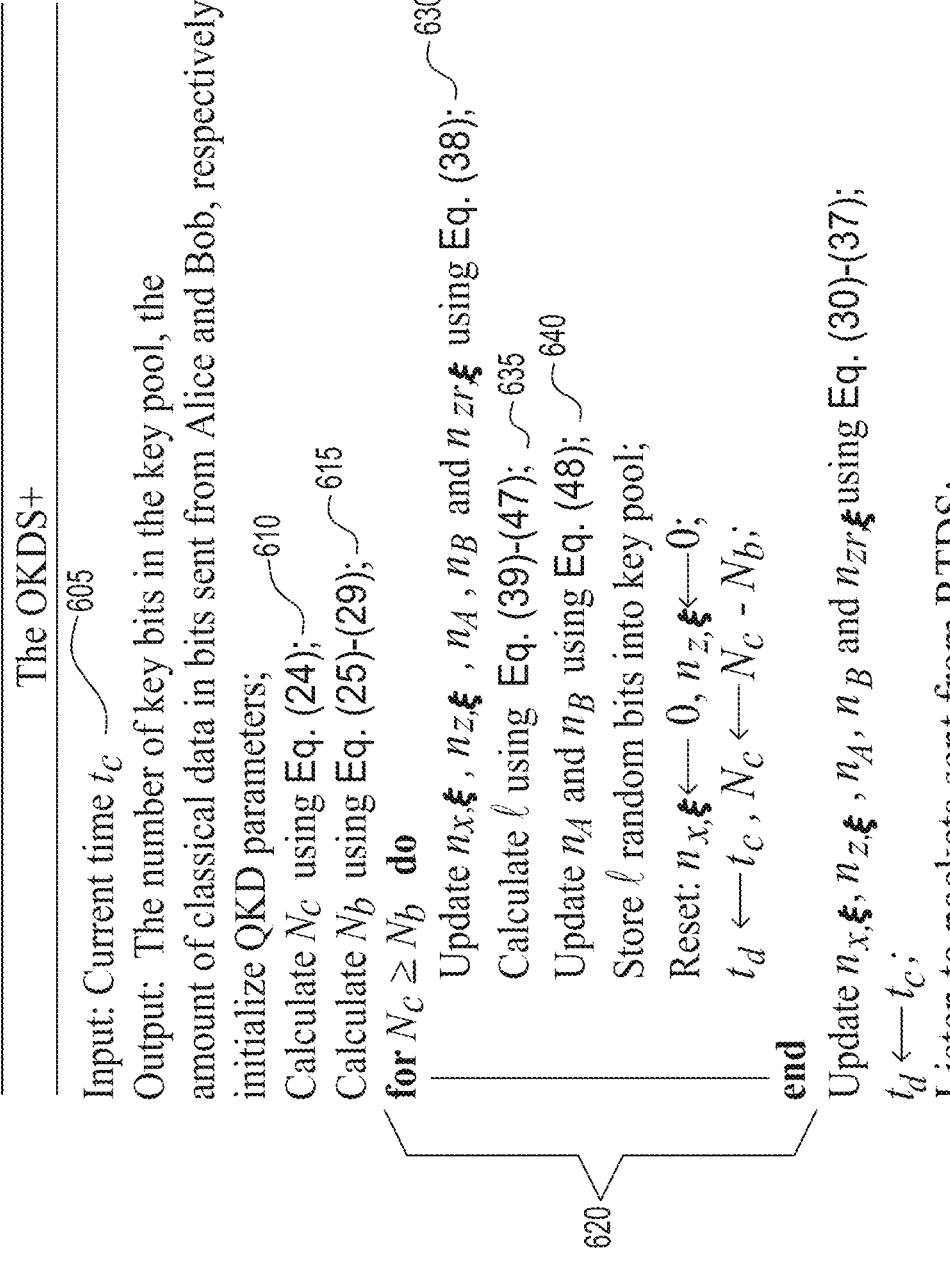

The OKDS+ ~605

Input: Current time $t_c$

Output: The number of key bits in the key pool, the amount of classical data in bits sent from Alice and Bob, respectively initialize QKD parameters;

Calculate $N_c$ using Eq. (24); ~610

Calculate $N_b$ using Eq. (25)-(29); ~615 for $N_c \geq N_b$ do

Update $n_{x,\xi}$, $n_{z,\xi}$, $n_A$, $n_B$ and $n_{zr,\xi}$ using Eq. (38); ~630

Calculate $\ell$ using Eq. (39)-(47); ~635

Update $n_A$ and $n_B$ using Eq. (48); ~640

Store $\ell$ random bits into key pool;

Reset: $n_{x,\xi} \leftarrow 0$, $n_{z,\xi} \leftarrow 0$;

$t_d \leftarrow t_c$, $N_c \leftarrow N_c - N_b$;

end

Update $n_{x,\xi}$, $n_{z,\xi}$, $n_A$, $n_B$ and $n_{zr,\xi}$ using Eq. (30)-(37);

$t_d \leftarrow t_c$;

Listen to packets sent from RTDS;

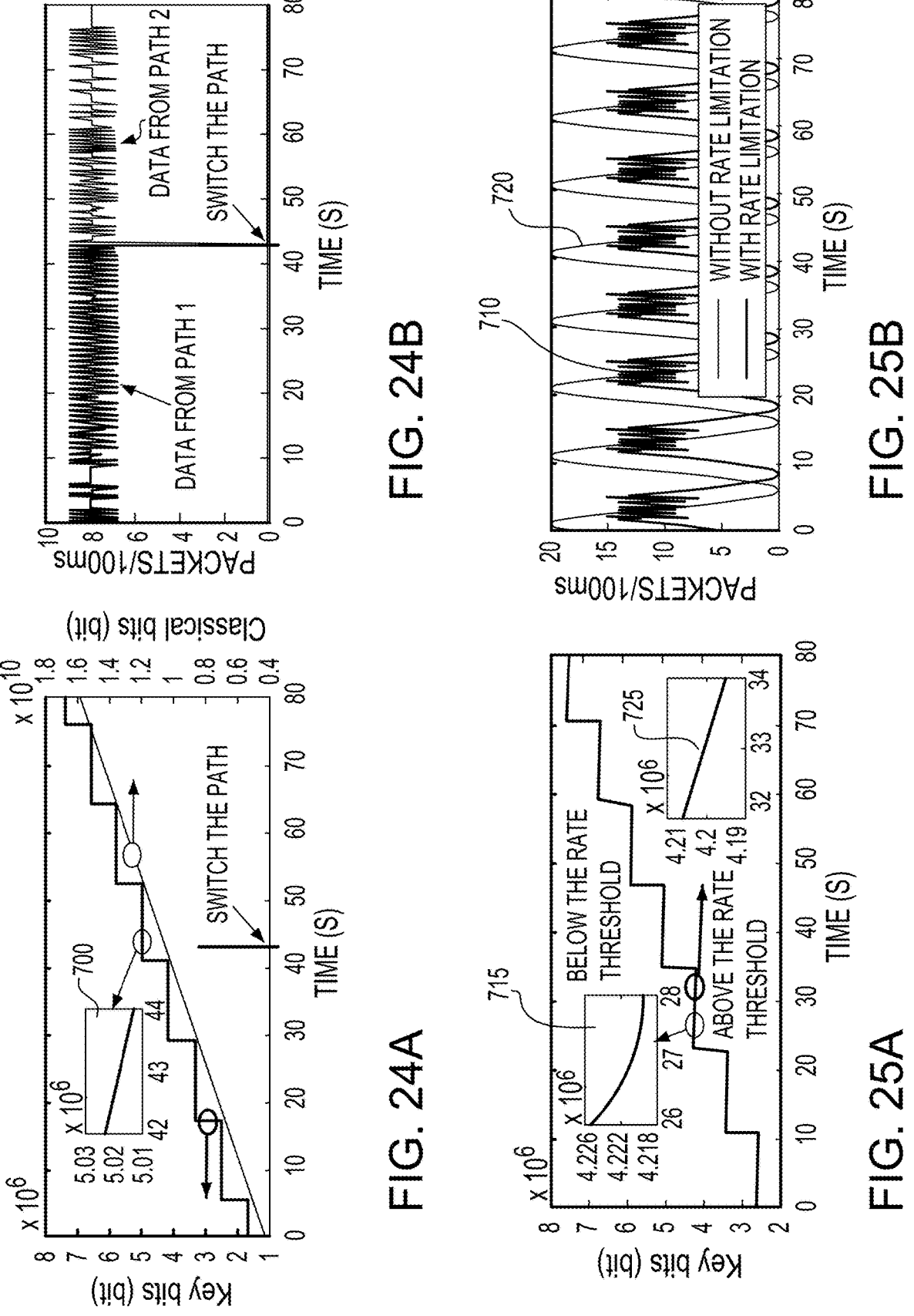

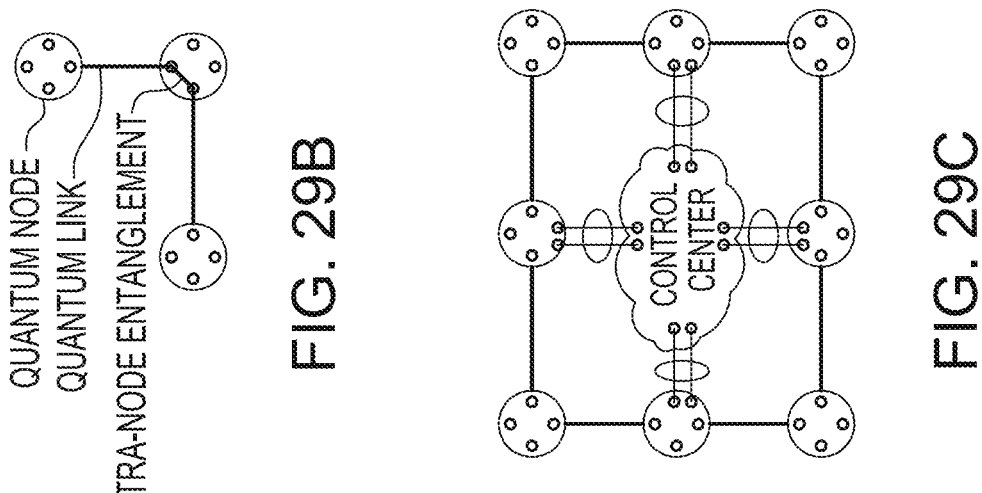
QUANTUM NODE
QUANTUM LINK
INTRA-NODE ENTANGLEMENT
FIG. 29B
FIG. 29C
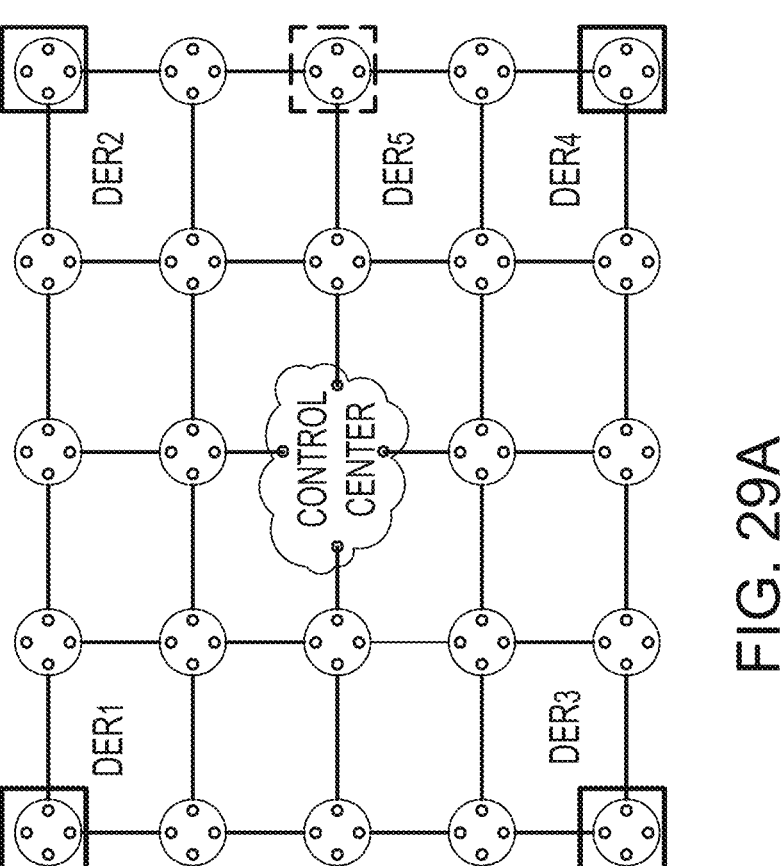
FIG. 29A

Figure 30:
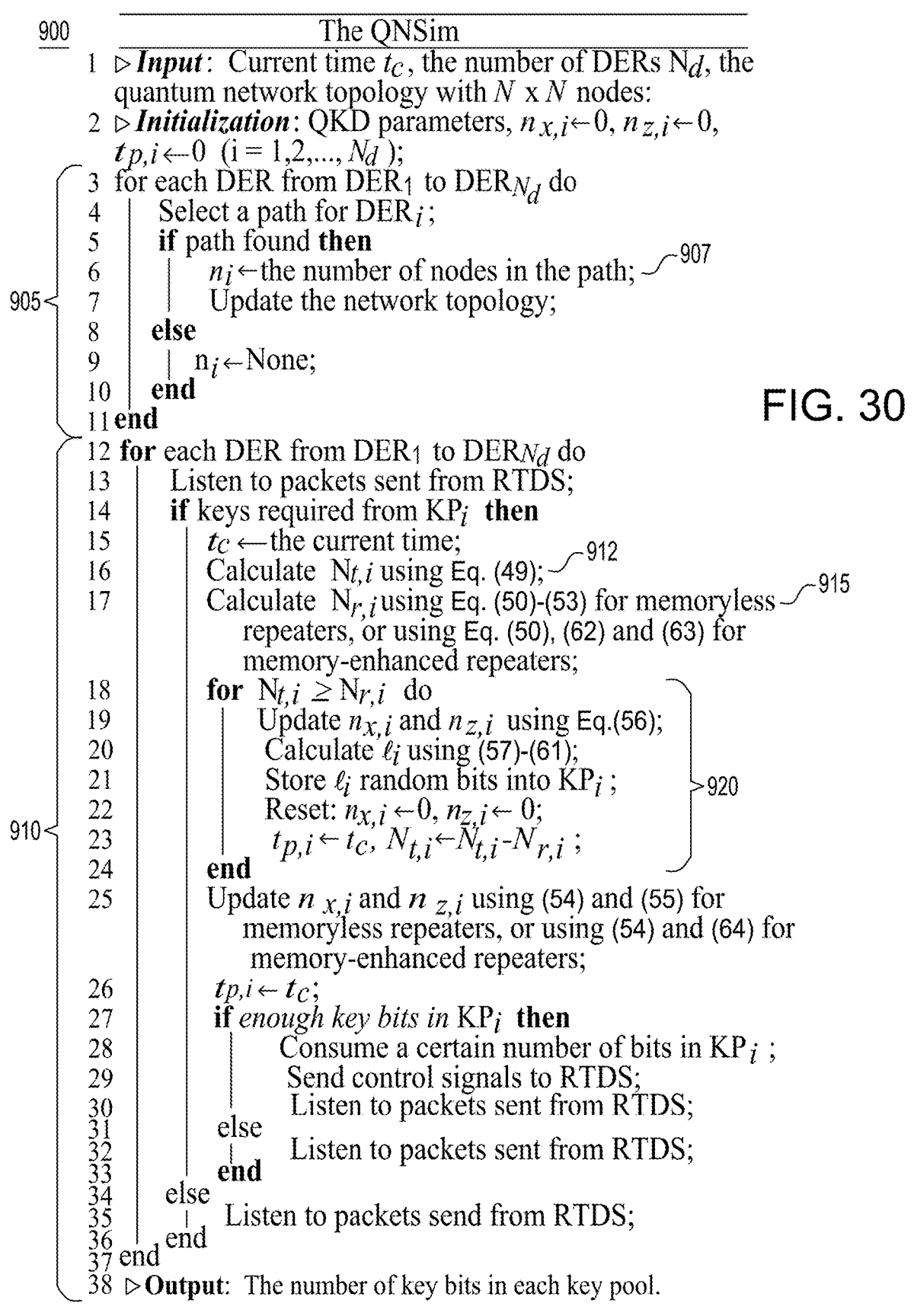

900

| The QNSim |

1 ▷ Input: Current time $t_c$, the number of DERs $N_d$, the quantum network topology with $N \times N$ nodes:

2 ▷ Initialization: QKD parameters, $n_{x,i} \leftarrow 0$, $n_{z,i} \leftarrow 0$, $t_{p,i} \leftarrow 0$ $(i = 1,2,...,N_d)$;

3 for each DER from $DER_1$ to $DER_{N_d}$ do

4 　　Select a path for $DER_i$;

5 　　if path found then

6 　　　　$n_i \leftarrow$ the number of nodes in the path; ⟋907

7 　　　　Update the network topology;

8 　　else

9 　　　　$n_i \leftarrow$ None;

10 　　end 11 end

12 for each DER from $DER_1$ to $DER_{N_d}$ do

13 　　Listen to packets sent from RTDS;

14 　　if keys required from $KP_i$ then

15 　　　　$t_c \leftarrow$ the current time;

16 　　　　Calculate $N_{t,i}$ using Eq. (49); ⟋912

17 　　　　Calculate $N_{r,i}$ using Eq. (50)-(53) for memoryless ⟋915 repeaters, or using Eq. (50), (62) and (63) for memory-enhanced repeaters;

18 　　　　for $N_{t,i} \geq N_{r,i}$ do

19 　　　　　　Update $n_{x,i}$ and $n_{z,i}$ using Eq.(56);

20 　　　　　　Calculate $\ell_i$ using (57)-(61);

21 　　　　　　Store $\ell_i$ random bits into $KP_i$;

22 　　　　　　Reset: $n_{x,i} \leftarrow 0$, $n_{z,i} \leftarrow 0$;

23 　　　　　　$t_{p,i} \leftarrow t_c$, $N_{t,i} \leftarrow N_{t,i} - N_{r,i}$;

24 　　　　end

⟩920

25 　　　　Update $n_{x,i}$ and $n_{z,i}$ using (54) and (55) for memoryless repeaters, or using (54) and (64) for memory-enhanced repeaters;

26 　　　　$t_{p,i} \leftarrow t_c$;

27 　　　　if *enough key bits in* $KP_i$ then

28 　　　　　　Consume a certain number of bits in $KP_i$;

29 　　　　　　Send control signals to RTDS;

30 　　　　　　Listen to packets sent from RTDS;

31 　　　　else

32 　　　　　　Listen to packets sent from RTDS;

33 　　　　end

34 　　else

35 　　　　Listen to packets send from RTDS;

36 　　end 37 end

38 ▷ Output: The number of key bits in each key pool.

910

[m, 4, b] [m, 3, C] [m, 2, h]

[m, 1, m]

1100

TRADITIONAL SWITCH

SDN CONTROLLER

SDN SWITCH

GTNET CHASSIS

RTDS

RSCAD & CONTROL CENTER (RUNNING QNSim)

SYSTEM AND METHOD FOR QUANTUM-SECURE MICROGRIDS

CROSS REFERENCE TO RELATED APPLICATIONS

This application claims the benefit of U.S. Provisional Application Nos. 63/223,751 filed on Jul. 20, 2021 and 63/325,210 filed on Mar. 30, 2022, the entirety of each of which is incorporated by reference.

STATEMENT REGARDING FEDERALLY SPONSORED RESEARCH OR DEVELOPMENT

This invention was made with government support under ECCS-2018492 and OIA-2040599 awarded by National Science Foundation. The government has certain rights to this invention.

FIELD

The present application relates generally to a system and method for secure communications and more specifically systems and methods for quantum-secure microgrids and quantum network—based microgrid operations.

BACKGROUND

Securing data transmission in microgrid is critical for maintaining normal grid operations and achieving desirable benefit, e.g., fast recovery during a main grid blackout, improved system reliability and resilience, and economic power supply to customers. Existing methods on this topic largely rely on cryptographic systems such as the Advanced Encryption Standard (AES), the One-Time Pad (OTP), and similar methods.

The security of AES, OPT, and other symmetric-key cryptographic systems relies on classical public key system which are vulnerable to attacks from quantum computers. Classical public key systems used in networked microgrids (NMGs) to distribute keys for two communicating parties are secured based on the assumed limits on an adversary's power, i.e., the mathematical problems such as the discrete logarithm problem [1] or the factoring problem [2] cannot be efficiently solved even by the fastest modern computers with any existing algorithms. This mathematical assumption however can be broken by attacks from quantum computers, as quantum computing promises to efficiently solve mathematical problems. Although today's quantum computers are still noisy and their advent on a degree powerful enough to break current cryptographic systems is perhaps still decades away, their sudden appearance will leave microgrid organizers little time to adapt.

A potent solution to tackle this quantum-era challenge is to use the quantum key distribution (QKD). QKD provides information-theoretic security through the laws of physics. Those laws have been fairly heavily tested and provide a more solid foundation than computational assumptions. Different protocols have been proposed to implement QKD including the well-known BB84, decoy-state, six-state, Ekert91, and BBM92. However, while QKD has been extensively analyzed and widely applied in areas such as computer networks, online banking, ATM transactions, e-voting systems, and portable applications, the microgrid community is unfortunately largely silent on the topic of developing quantum-secure networked microgrids (NMGs). In the context of quantum secure NMGs, the existing QKD systems however cannot be directly applied. With multiple data transmission channels existing in NMGs, it is unclear how the QKD's performance will be in the system. A real-time QKD-enabled NMGs simulation testbed for evaluating the performance of the system is significantly needed but does not yet exist.

Furthermore, the key generation speed in a QKD system is affected by various factors such as the distance between two communicating parties and the noise, which can be either natural or caused by an adversary, on quantum optic equipment. A large distance or a strong attack on the QKD equipment can unfortunately reduce the speed, detrimentally causing keys to be exhausted. A proper strategy is therefore needed to improve the cyberattack resilience for the system.

SUMMARY

Accordingly, disclosed are systems, methods and computer program products for a QKD-based communication architecture for NMGs.

In one aspect there is provided a practical decoy-state protocol utilized to implement QKD.

In a further aspect there is provided a QKD-integrated quantum-secure NMGs testbed in an RTDS environment, including the hardware connection, communication network design, and QKD integration.

Further to this aspect, there is provided, a novel two-level key pool sharing (TLKPS) strategy to improve the system's cyberattack resilience. Extensive tests are implemented on the testbed. Test results validate the effectiveness of the presented strategy, and provide insightful resources for building quantum-secure NMGs.

In a further aspect, systems and methods described herein address the cyber-resilience of QKD-based microgrids by leveraging software defined networking (SDN).

In accordance with a first aspect of the invention, there is provided a communications system for a plurality of microgrids. The system comprises: a first microgrid and a second microgrid, the first and second microgrids providing power to a load, a quantum channel connecting the first and second microgrids, the quantum channel adapted for distributing quantum generated keys between the first microgrid and second microgrid; one or more key pools associated with the first and second microgrids for storing quantum generated keys; a controller associated with a microgrid, the controller configured for determining a number of key bits in one key pool and comparing the number of key bits against a pre-determined threshold; and upon determining a number of key bits is below the pre-determined threshold, sharing a certain number of key bits from another key pool.

In a further aspect, there is provided: a quantum key distribution system for networked microgrids. The system comprises: one or more microgrids, each microgrid providing a supply of power to loads and obtaining measurements from different loads associated with use of a microgrid; a controller associated with a microgrid and employing control signals associated with communications among the one or more microgrids and between the microgrid and a local controller associated with the microgrid; at least one key pool associated with one or more of the microgrids, the microgrid using quantum generated keys associated with key bits supplied from each of the at least one key pool for communications among the one or more microgrids and between the microgrid and its associated local controller, a key consumption speed associated with a rate of the communications among the one or more microgrids, wherein the controller at the microgrid is configured to transmit measurements at the microgrid as real-time messages from the microgrid to its associated local controller using a quantum generated key supplied from the key pool; and the controller at a microgrid employing a two level key pool sharing strategy to ensure there are enough key bits in each key pool.

In a further aspect, there is provided a method for operating a plurality of microgrids. The method comprises: providing a system having a first microgrid with a second microgrid, the first and second microgrids providing power to a load, and a quantum channel connecting the first and second microgrids, the quantum channel for distributing quantum bits between the first microgrid and second microgrid to generate secret keys; providing one or more key pools associated with the first and second microgrids, the one or more key pools for storing quantum generated keys; determining, using a controller associated with a microgrid, a number of key bits in one key pool and comparing the number of key bits against a pre-determined threshold; and upon determining a number of key bits is below the pre-determined threshold, sharing a certain number of key bits from another key pool of the one or more key pools.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3A depicts a typical QKD network; FIG. 3B illustrates a first scenario of an attack within a single microgrid; FIG. 3C illustrates a second scenario of an attack between two microgrids without an alternative QKD path; and FIG. 3D is a third scenario depicting an attack between two microgrids with an alternative QKD path;

FIG. 19 depicts a QKDS+ simulator method according to a further embodiment;

FIG. 24A depicts example test results of dynamic routing with the number of stored key bits and the total number of classical bits generated from Alice and Bob before and after dynamic routing; and FIG. 24B depicts example test results of dynamic routing with the traffic captured in the two paths;

FIGS. 25A, 25B give the test results of rate limitation with number of stored key bits under rate limitation (FIG. 25A), and the traffic captured with and without rate limitation (FIG. 25B);

FIG. 26 depicts the effectiveness of firewalls with FIG. 26A depicting power generated by each DER and the system frequency before and after a fake control signal is received.

FIG. 29 depicts an example of QNetGrid quantum network with FIG. 29A depicting an example quantum network of a 5×5 grid; FIG. 29B depicting a quantum link connecting two quantum nodes and the intra-node entanglement; and FIG. 29C depicting the installing of more links around the control center;

FIG. 30 depicts a QNSim algorithm according to an embodiment;

FIG. 31 shows a quantum routing for QNetGrid with FIG. 31A depicting when there are two or more neighbors that can connect to the control center at the same minimum cost.

DETAILED DESCRIPTION

Figure 1:
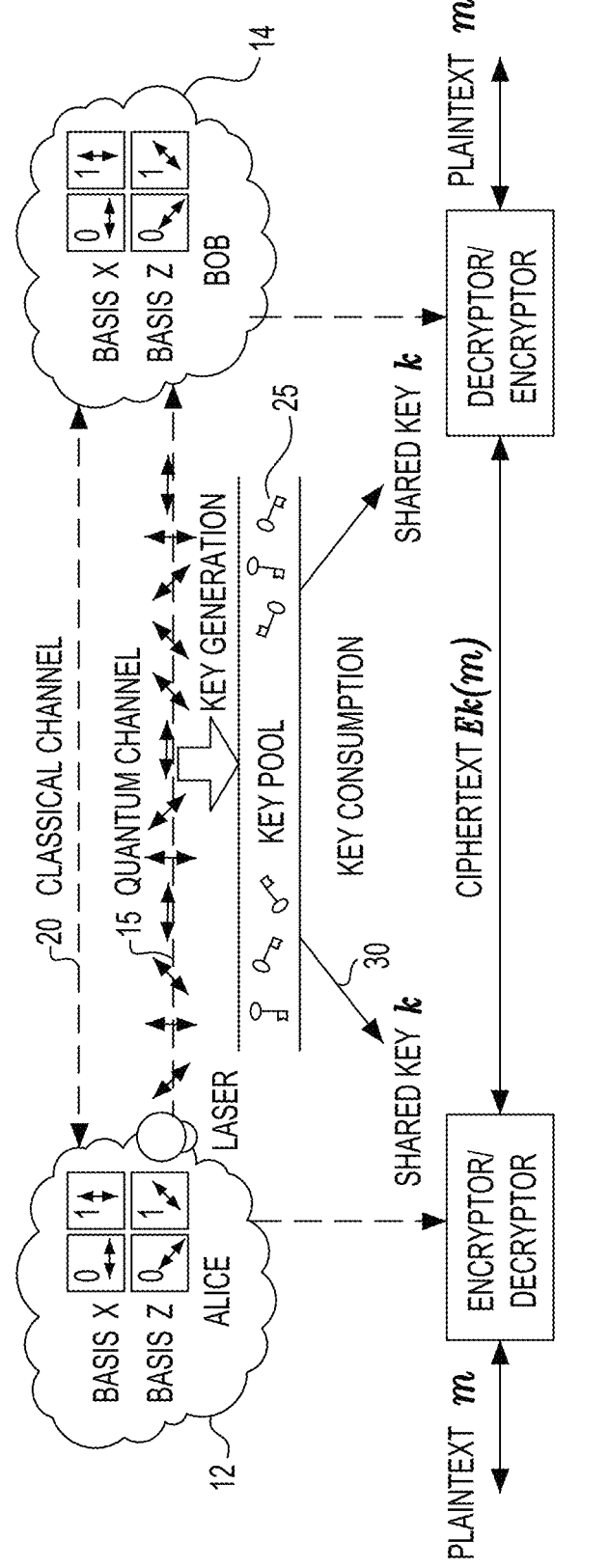
FIG. 1 illustrates a general setting of a QKD-based communication system in an aspect of the disclosure.

The following detailed description of aspects of the disclosure will be made in reference to the accompanying drawings. In this disclosure, explanation about related functions or constructions known in the art are omitted for the sake of clearness in understanding the concept of the disclosure to avoid obscuring the disclosure with unnecessary detail.

QKD is a key-growing method used to generate and distribute secret keys for two distant parties. It utilizes the fundamental properties of quantum mechanics, which are resilient against increasing computational power, improved computational algorithms, and quantum computers. A QKD system, in general, consists of a quantum channel, i.e., a fiber or free space, and a classical one, i.e., a public but authenticated communication link. Quantum states are first transferred through the quantum channel between the sender and the receiver for generating raw keys. After the transmission and measurement of the quantum states, the corresponding postprocessing steps are performed over the classical channel to distill the final secret keys. With the generated keys, data messages are encrypted and transmitted over the classical channel.

Over the years, a variety of QKD protocols have emerged, many of which have been experimentally demonstrated in real-world scenarios. In general, there are two types of QKD. One is the discrete-variable QKD (DV-QKD), where quantum information is encoded in discrete variables, and single-photon detectors are used to measure the received quantum states, and thus, the measured results are discrete. Examples of DV-QKD are the BB84 protocol and the E91 protocol. Alternatively, the other type, continuous-variable QKD (CV-QKD), encodes quantum information in the phase and amplitude quadratures of a coherent laser and uses homodyne detectors to measure the received quantum states where the measured results are continuous. Examples include the Gaussian-modulated CV-QKD.

The systems and methods described herein provide for a QKD-based communication architecture for NMGs and particularly address the cyber-resilience of QKD-based microgrids.

In embodiments, the systems and methods described herein address the cyber-resilience of QKD-based microgrids by leveraging software defined networking (SDN).

Specifically, the systems and methods provide: 1) a novel QKD- and SDN-based communication framework devised for microgrids; 2) three practical SDN applications developed to improve the system's resilience; 3) a complete QKD simulator; and 4) a QKD- and SDN-enabled cyber-physical prototypes built in an RTDS environment using real Pica8 SDN switches.

The prototype includes a "hardware-in-the-loop" testbed that provides a realistic testing environment, and can significantly benefit the power grid community by promoting the adoption of quantum techniques.

The systems and methods integrate both quantum key distribution (QKD) and software defined networking (SDN) into a real-time power system simulator, i.e., RTDS, using real SDN switches. Unlike other power system testbeds, this testbed has its unique feature, i.e., the quantum key generation and key consumption are integrated in a microgrid context where the generation speed is determined by a complete QKD algorithm and the consumption speed is affected by the real data transmission managed by the SDN controller over real SDN switches. This design presents a realistic cyber-physical testing environment with both SDN and QKD features incorporated.

FIG. 1 illustrates a general setting of a QKD-based communication system 10. QKD-based communication system 10 consists of a quantum channel 15 and a classical channel 20. The quantum channel allows two parties, commonly named Alice 12 and Bob 14, to share quantum bits (or qubits) for creating raw keys that are partially secure and secret. The generated raw keys are processed through postprocessing over a classical channel 20 to produce secure keys 30 used for tasks such as encryption and authentication. With the created keys 30, the information to be transmitted is encrypted and later decrypted over a classical communication channel 20. The produced secure keys are stored in a key pool (KP) 25, and will be extracted later from the KP for encryption and decryption. The security of a QKD protocol, in a way, takes advantage of this: by encoding a classical bit string using different, randomly-chosen bases, an adversary who is unaware of the basis choice can never be truly certain of the information being transmitted. Furthermore, any attempt to actually learn this information causes noise in the quantum channel which can be detected by the two parties later.

In embodiments herein, adversaries have complete control over all quantum communication channels along with perfect quantum memories. In addition, they are free to perform an optimal attack on the quantum communication utilizing any computational capability available now or in the future (e.g., using quantum computers). The security guarantees the QKD-produced keys are information theoretic in that they do not make any assumptions on the computational abilities of the adversary. Thus, the keys derived are secure even against future computational or algorithmic breakthroughs. In embodiments, devices internal to communication nodes (e.g., quantum sources and quantum measurement devices) are assumed trusted and cannot be tampered with by the adversary.

Finally, it is assumed an authenticated classical channel 20 connects the two parties 12, 14. Such channels are needed for QKD systems to operate and provide information theoretic authentication (but not secrecy). These authentication tags, being also information theoretic secure, are secure against future computational or algorithmic breakthroughs (e.g., they are secure against a future quantum computer).

Figure 2:
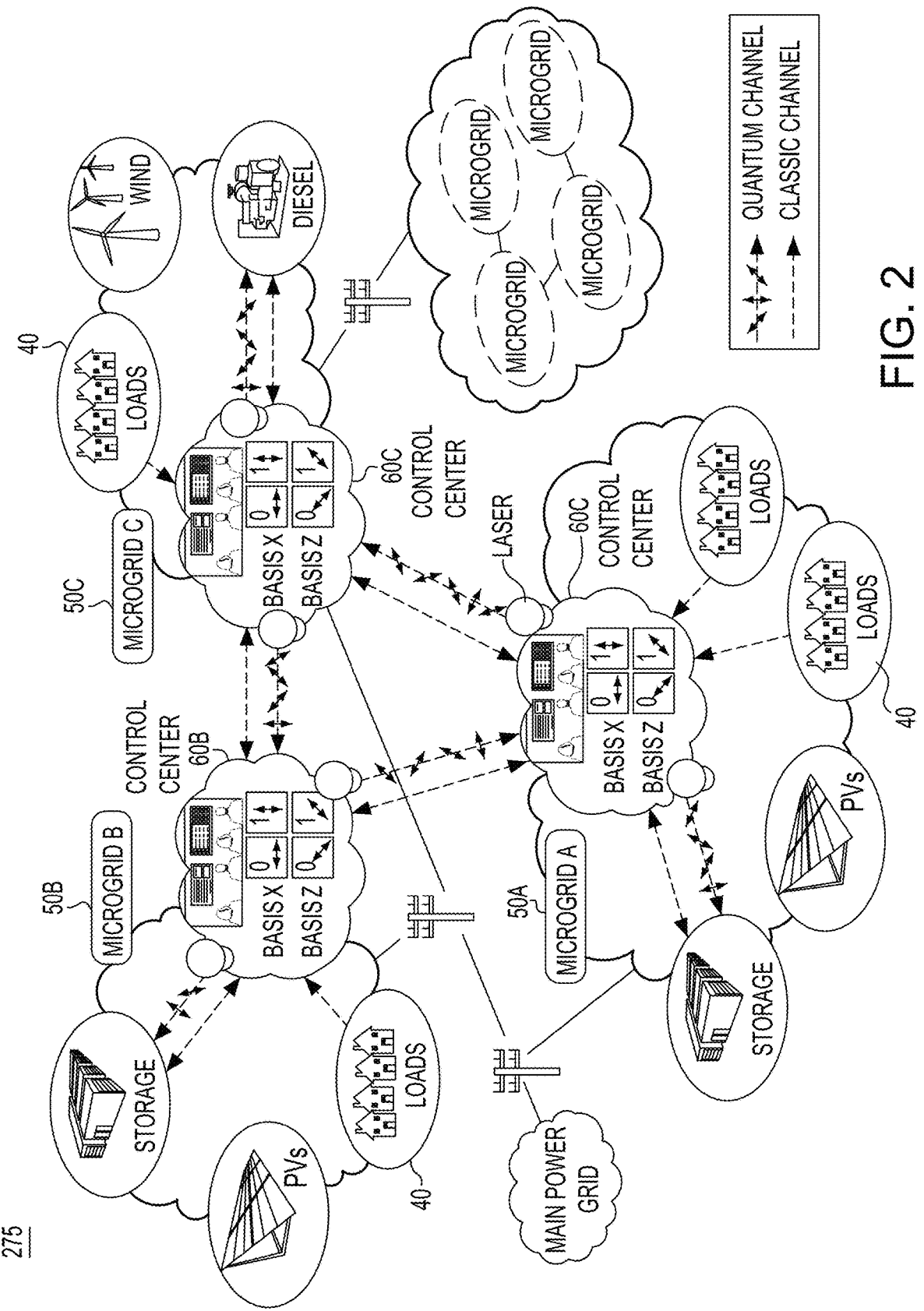
FIG. 2 depicts a QKD-based quantum-secure NMGs architecture.

QKD-based microgrids and NMGs according to embodiments of the present disclosure are now presented in view of FIG. 2. In a single microgrid, a control center is typically in charge of collecting data from customers, handling the received data for various operating functions, and sending control signals to corresponding local controllers to regulate the power output of certain distributed energy resources (DERs). In the example networked MGs system illustrated in FIG. 2, QKD systems are installed for the communications between the control center and local controllers as those communications are considered relatively more critical.

In particular, FIG. 2 depicts a QKD-based quantum-secure networked microgrids (NMGs) architecture 75. As shown in FIG. 2, the NMGs system consists of multiple interconnected MGs 50A, 50B, 50C. Within each MG, a microgrid control center (MGCC) 60A, 60B, 60C collects information from customers, e.g., loads 40, and sends corresponding control signals to local controllers.

For the QKD-enabled NMGs, QKD systems are installed not only for the communications between each control center and local controllers in the same microgrid but also for the communications between two neighboring microgrids. QKD-based NMGs differ from conventional QKD networks in several aspects. For instance, in a QKD network, two communicating parties can be far remote; in NMGs, however, two communicating parties are normally geographically close. As a result, while there are multiple QKD paths existing between two remote parties in a QKD network, only one or limited QKD paths exist between two communicating parties in NMGs. Additionally, a common QKD node in QKD networks and a control center in NMGs have different levels of security, trustfulness, and reliability.

In this architecture of FIG. 2, QKD is utilized to generate keys for communications between each MGCC and local controllers in the same MG, while the communications between each MGCC and customers in the same MG are established over classical channels. The keys used for the communication between two MGCCs in different MGs are also generated using QKD.

Note that, because from the economic perspective, building a quantum link is costly; therefore, quantum channels are only allocated for important communications. Keys generated by different quantum channels are stored in separate key pools (KPs).

Ideally, the key generation speed in a QKD system has to be large enough to guarantee there are always enough keys in the KP. However, this speed can be affected by a variety of factors such as the distance between two communicating parties and the attack on quantum optic equipment. To maintain normal operations in the QKD-enabled NMGs, a proper strategy is needed in case the bits in any KP are used up.

Keys produced by QKD are unconditionally secure because by using different, randomly chosen bases to encode classical bits, an adversary with little knowledge on the basis choices cannot truly obtain the information being transmitted. Further, any eavesdropping attack on the quantum channel causes noise which can be detected by the two parties.

However, this inevitably introduces Denial of Service (DoS) attacks. Any DoS attack on quantum optical equipment increases noise and causes key establishment sessions in a QKD system to be aborted, potentially leading to the exhaustion of keys.

Figures 3A, 3B, 3C, 3D:
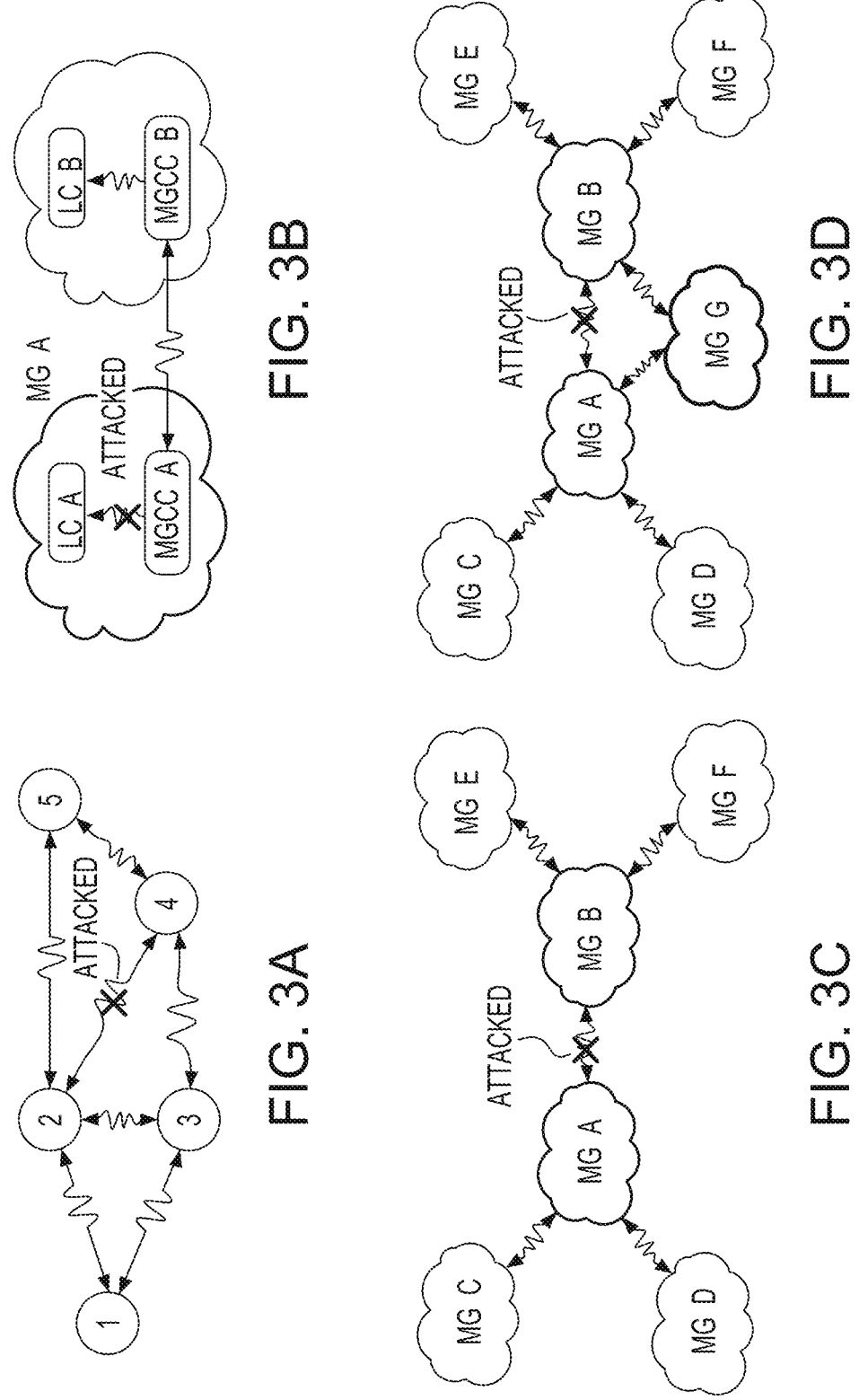
FIGS. 3A-3D depict differences between QKD networks and quantum NMGs where

There are existing works on mitigating DoS attacks for QKD networks. However, while the approaches are applicable for QKD networks, they are not suited for quantum NMGs. The difference between QKD networks and quantum NMGs is illustrated in FIG. 3. As shown in FIG. 3A, in a QKD network, multiple QKD paths exist between two nodes, and hence, when one path is attacked, an alternative path can be switched to. For instance, Nodes 1 and 4 can select not only Paths 1-2-4, but also Paths 1-3-4, 1-2-3-4 and 1-3-2-4 to distribute keys between them.

However, a quantum NMGs system typically has only one quantum path between two communicating parties, i.e., a MGCC and a local controller, or two neighboring MGCCs. Based on the NMGs topology and location of the attack on the system, three cases exist as follows.

1) Scenario 1: The KP that lacks key bits is within a single microgrid, i.e., between a MGCC and a local controller.

2) Scenario 2: The KP that lacks key bits is between two microgrids that do not have an alternative QKD path.

3) Scenario 3: The KP that lacks key bits is between two microgrids with an alternative QKD path.

Most communications in NMGs fall under Scenarios 1 and 2 as shown in FIGS. 3B and 3C, where there is only one QKD path between two communicating nodes. The traditional method for QKD networks, i.e., reselecting an alternative QKD path, is however infeasible in these cases. Generally, few situations are under Scenario 3 when an alternative QKD path exists between MGCCs A and B (i.e., MGCC A-G-B) as shown in FIG. 3D.

To mitigate the impact of DoS attacks on quantum NMGs, there is presented a software-defined adaptive post-processing (SDAPP) approach and a two-level key pool sharing (TLKPS) approach (a TLKPS strategy). Specifically, SDAPP is launched to improve QKD's performance during the DoS attack, and TLKPS is performed when the number of bits in a KP is below a predetermined threshold.

Figure 4:
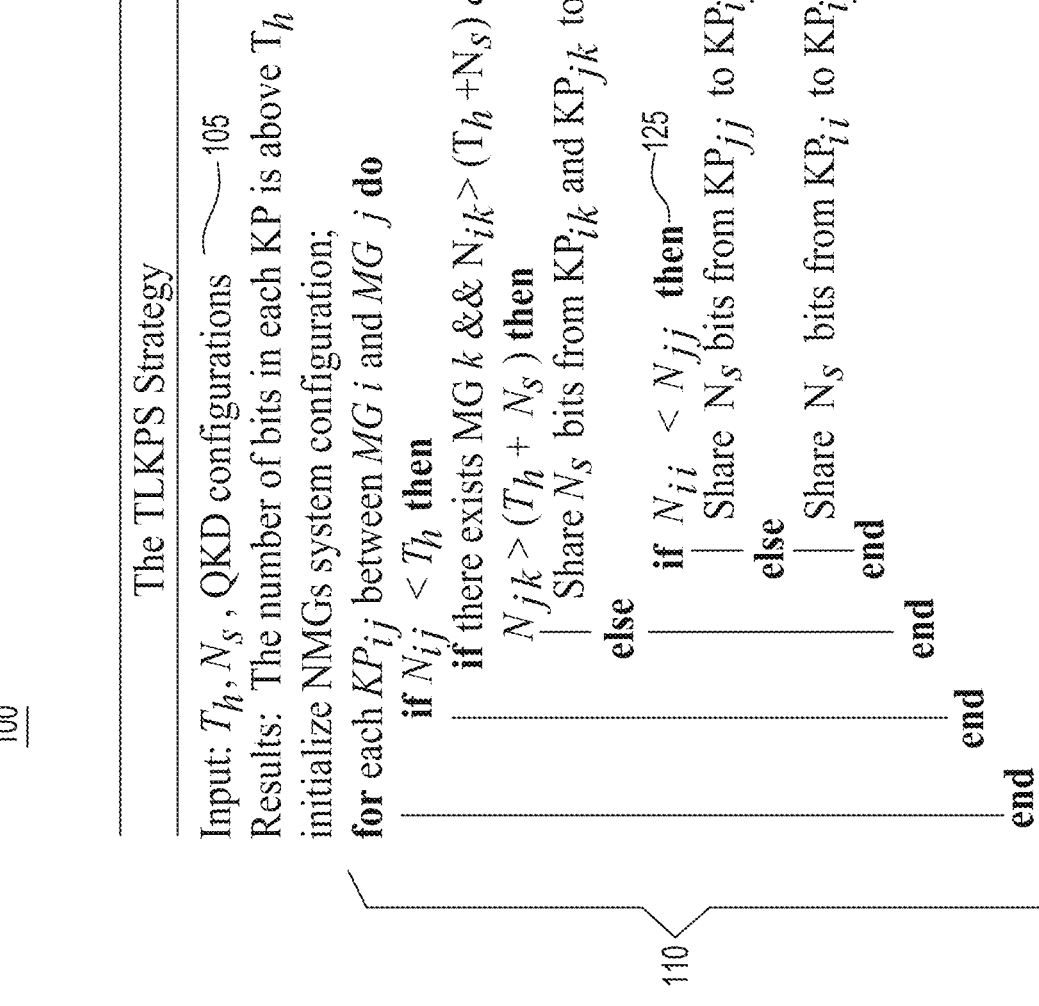
FIG. 4 depicts a two-level key pool sharing (TLKPS) strategy according to an embodiment.

In one embodiment, FIG. 4 provides a two-level key pool sharing (TLKPS) strategy 100. Input to the algorithm 100 are parameters 105 including: a threshold Th, which restricts the minimum number of bits in a KP, a number of bits Ns, and the actual QKD configurations. The algorithm output includes the number of bits in each KP that is above threshold Th. In sum, a threshold Th, which restricts the minimum number of bits in a KP, is first determined. If the number of bits in each KP is below Th, a given number of bits will be shared from other KPs. Let KPij be the KP between MG i and MG j, Nij the number of bits in KPij, and Ns the number of bits sent to KPij. Then, if Nij is below Th, Ns bits will be sent to KPij. For example, as shown in FIG. 3, upon initializing the NMGs system configuration, a FOR loop 110 is entered pertaining to each KPij between MG i and MG j. A determination is first made as to whether Nij<Th, and if so, a further determination is made to determine whether there exists MG k && Nik>(Th+Ns) && Njk>(Th+Ns). If such a statement holds then, Ns bits are shared from KPik and KPjk to KPij at 120. Otherwise, according to a second level KPS strategy, if it is determined at 125 that Nii<Njj, then Ns bits are shared from KPjj to KPij at 130; Otherwise, Ns bits are shared from KPii to KPij at 140, FIG. 4.

Figures 5A, 5B:
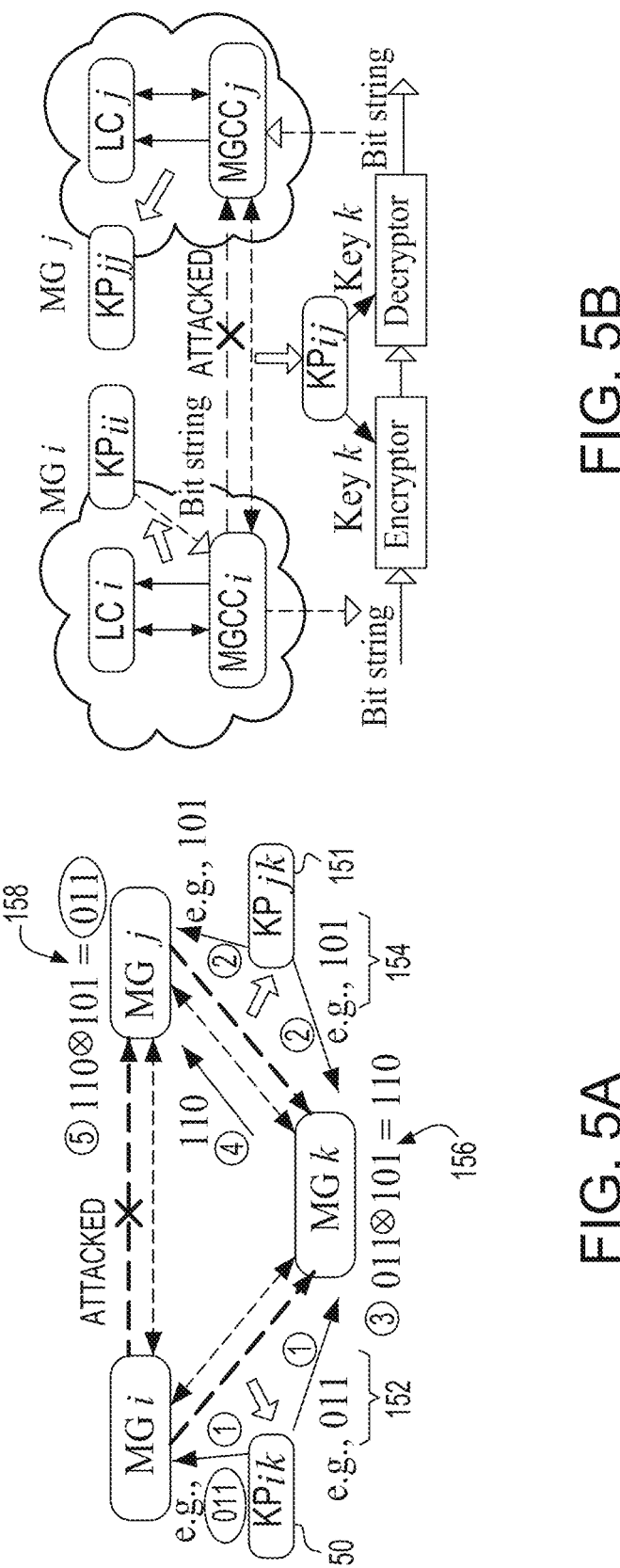
FIG. 5A illustrates a first level of the TLKPS strategy.
FIG. 5B illustrates a second level of the TLKPS strategy.

FIGS. 5A and 5B illustrate the TLKPS strategy according to embodiments herein. The TLKPS strategy consists of two levels of bit-sharing from other KPs to KPij. FIG. 5A depicts a first level of the TLKPS strategy. As illustrative of an exemplary scenario of the first level TLKPS strategy of FIG. 5A, a NMGs system is shown as including three microgrids MG i, MG j, and MG k having classical communication channel interconnections and quantum communication channel interconnections therebetween. As shown in FIG. 5A, there is a first key pool KPik 150 providing quantum generated keys for use in communications among microgrids MG i and MG k, and a second key pool KPjk 151 providing quantum generated keys for use in communications among microgrids MG j and MG k.

In the TLKPS strategy, there consists of two levels of bit-sharing from other KPs to KPij. According to embodiments herein, when there exists MG k that establishes KPs with both MG i and MG j, and the numbers of bits in KPik and KPjk are both above (Th+Ns), Ns bits can be shared to KPij using the first level of TLKPS. In this case, MG k is utilized as an intermediate node to distribute keys between MG i and MG j as shown in FIG. 5A. Here, MG k and MG i both extract a string of bits (i.e., Ns bits) 152 from KPik 150, and MG k and MG j both extract the same number of bits 154 from KPjk 151. MG k then processes these extracted bits, e.g., performs exclusive-OR operation at 156 and XORs the extracted two bit strings, and sends the result to MG j. MG j performs the same logic function at 158, e.g., XORs the received bit string with the bit string extracted previously from KPjk. The result obtained by MG j will be exactly the same as the bit string extracted by MG i from KPik. In this way, a string of bits is securely transferred from KPik and KPjk to KPij. Note that this first level of TLKPS still maintains information-theoretic security, and therefore is given the first priority in TLKPS.

In a further embodiment, there is addressed a scenario when there is no such intermediate MG, or attacks are performed on multiple links, making intermediate MGs fail to share enough bits. The second level of TLKPS is thus established as shown in FIG. 5B. As shown in FIG. 5B, instead of using an intermediate MG to share keys to KPij, the second level of TLKPS utilizes the KP inside MG i (denoted as KPii) or the KP inside MG j (denoted as KPjj). When Nij is below Th, a string of bits is extracted from KPii (or KPjj depending on which KP has more bits). This bit string is then used as a plaintext, encrypted by MGCC i via a key extracted from KPij (note there are still some keys left in KPij), and sent to MGCC j. MGCC j uses the same key from KPij to decrypt the received message and obtains the bit string. A bit string is thus transferred from KPii and is securely shared to KPjj. Note that this AES-based key distribution loses information-theoretic security, and is performed when the first level of TLKPS fails. But it is still better than relying on public key systems because AES is considered quantum-secure.

QKD-Enabled Quantum-Secure NMGs Testbed

Figures 6A, 6B:
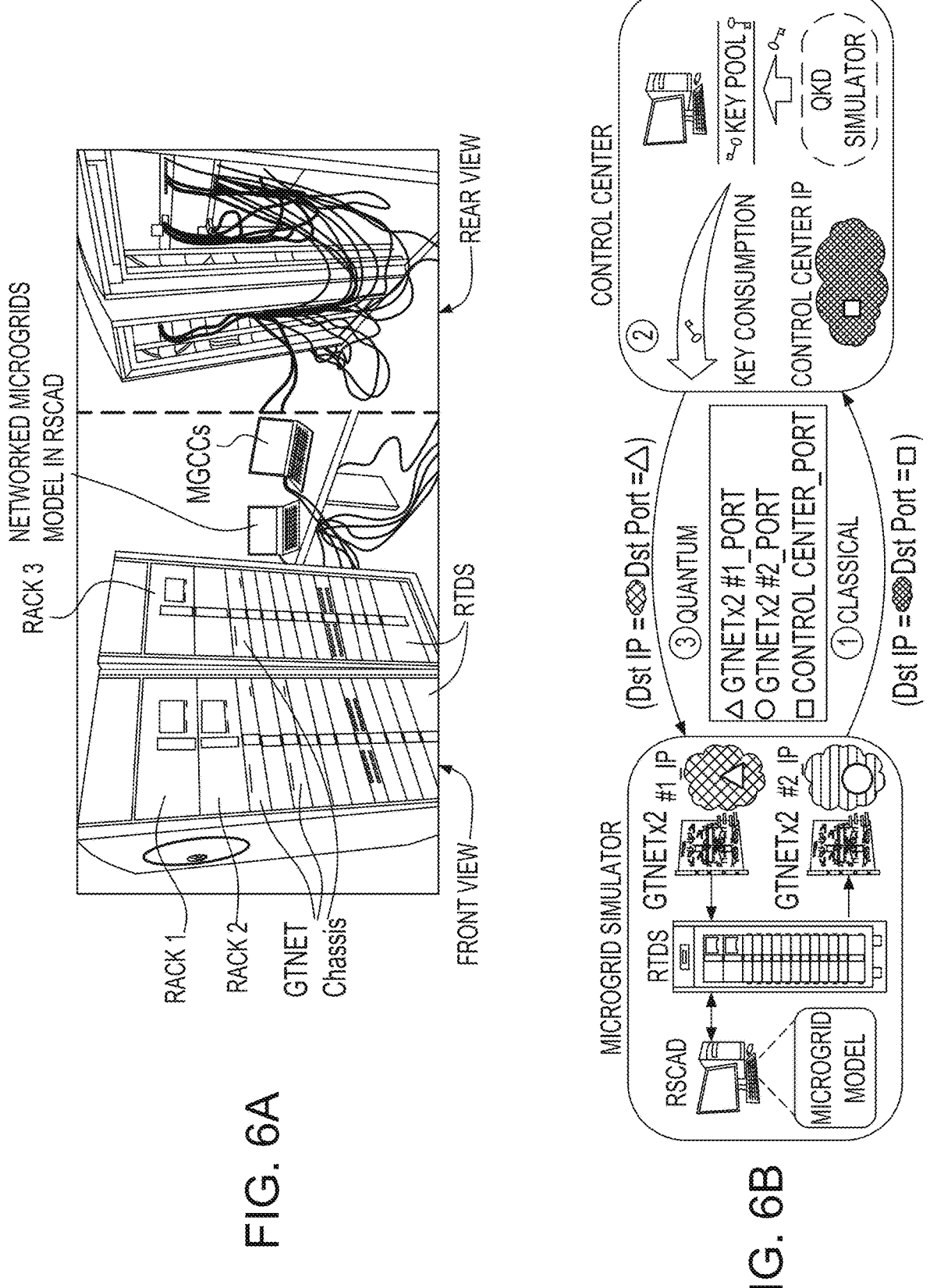
FIG. 6A depicts an example testbed for QKD-enabled quantum-secure NMGs in a RTDS.
FIG. 6B depicts a high-level design of the testbed illustrated in FIG. 6A.

FIG. 6A illustrates a design of a testbed for the QKD-enabled quantum-secure NMGs in RTDS, a real-time power system simulator. Specifically, the model of the NMGs is developed and compiled in RSCAD, a power system simulation software designed to interact with the RTDS simulation hardware. The RTDS in the testbed consists of three racks, which can be either used separately for small-scale power systems or combined together to provide more cores for a large-scale system. In FIG. 6A, computing system labeled "Rack 1" is utilized to simulate the NMGs in real-time, where the six cores in that rack are sufficient to provide high fidelity for the test results.

The measurements from the RTDS simulator are sent to a remote server using Giga-Transceiver Network Communication Card (GTNET), e.g., GTNET×2 cards, which can, in real-time, either receive data from the RTDS and send it to external equipment, or receive data from the network and send it back to the RTDS, depending on whether they are designed to be in sending or receiving mode. The MGCCs in the NMGs run on the same remote server (they can also run on different servers). The server receives load measurements from the RTDS, and sends signals back to RTDS, with a 1 Gbps Ethernet connection.

The high-level design of the testbed is illustrated in FIG. 6B. Two GENET×2 cards are utilized for the purpose of network communication. It should be noted that, although only one quantum channel is established in this case, the principle can be easily extended to cases with multiple quantum channels. GTNET×2 card #2 is used to transmit data from the RTDS to the MGCC, which models the classical communication (represented in 1 in FIG. 6B) in real-time, i.e., collecting load measurements to MGCC as shown in FIG. 2. When the data is received by the MGCC, an analysis of the data is conducted, and proper control signals are sent to the local controller. Before a control signal is sent out, a key with the same length is extracted from the key pool. This process (represented in 2 in FIG. 6B) succeeds only when there are enough key bits.

GTNET×2 card #1 is utilized to receive signals from the MGCC (represented in 3 in FIG. 6B) and transfer them to the RTDS. The simulation results with the updated control signals are demonstrated in RSCAD. Note that the QKD system is modeled using the QKD simulator described herein with respect to FIG. 13. Keys are continuously generated by the QKD algorithm, and are stored in a key pool. This real-time communication between the RTDS microgrid simulator and the MGCC using the QKD algorithm is the salient feature of this testbed.

QKD-Based Microgrid Communication Network

Figure 6C:
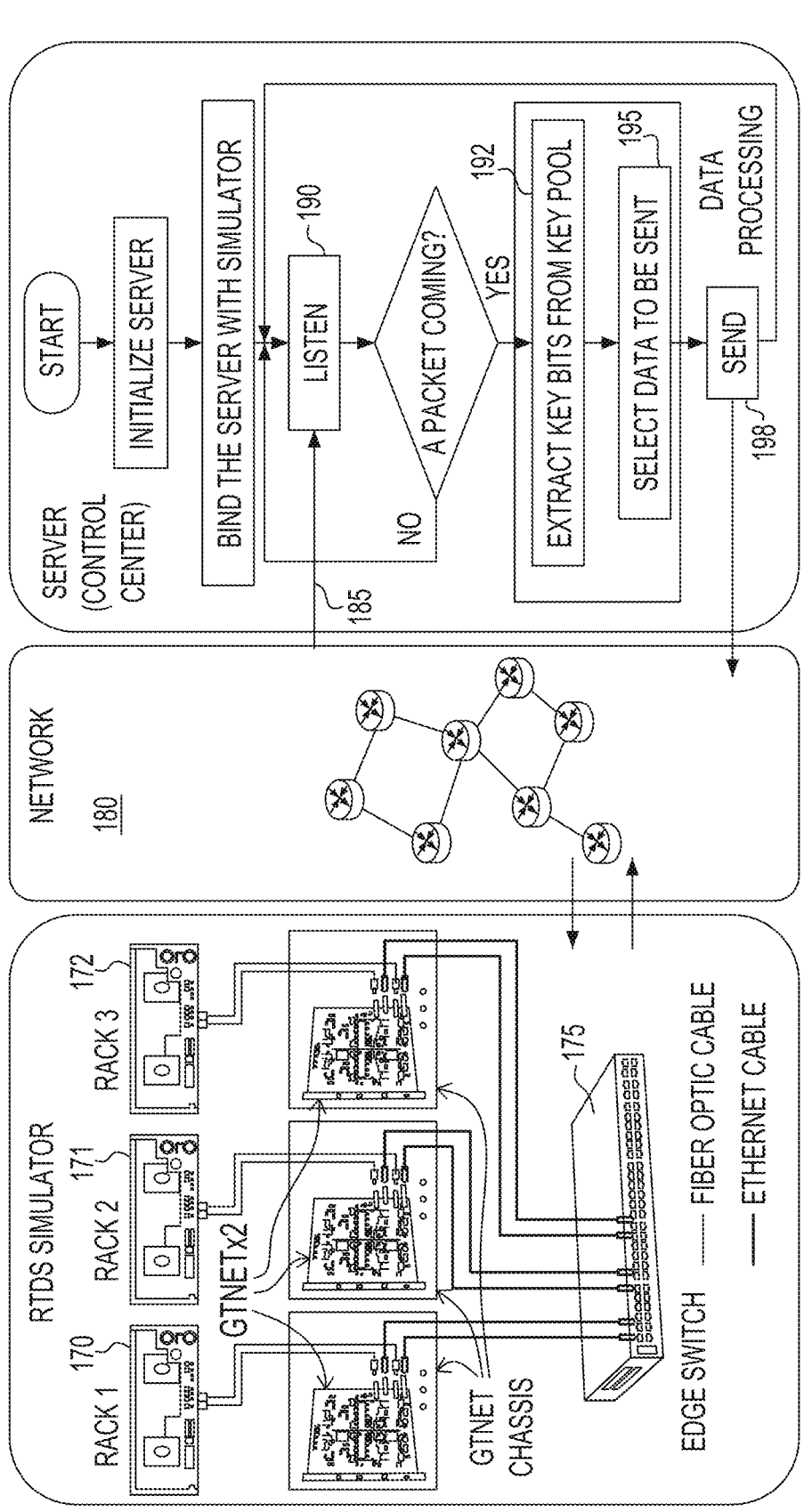
FIG. 6C depicts the network connection of key components in the RTDS simulator and a flow chart of the algorithm running in the MGCC.

The network connection of key components in the RTDS simulator and a flow chart of the algorithm running in the MGCC are illustrated in FIG. 6C. As shown on the left side of FIG. 6C, each RTDS rack 170, 171, 172 is connected to one or more GTNET×2 cards using fiber optic cables. All the GTNET×2 cards are connected with an edge switch 175 through Ethernet cables to transmit and receive data over the network 180. The User Datagram Protocol (UDP) is used in the simulation.

From the MGCC side, as shown on the right side of FIG. 6C, the server enters the listening mode 190 after being connected to the simulator. At this stage, the server at 185 is receiving any UDP packet whose destination IP and port match those of the server, respectively. Once a packet arrives, a quantum key with the same length of the received data, e.g., 64 bits, is extracted at 192 from the key pool, and corresponding control signals are generated at 195. The server then enters the sending mode at 198 and starts to send out control signals whose destination IP and port are the IP and port of GTNET×2 card #1 in the RTDS simulator (see FIG. 6A), respectively. After controller signals are sent out, the server goes back to the listening mode 190.

A QKD simulator capable of simulating the decoy-state BB84 protocol is developed in Python in the remote server. It simulates the probabilities of various events occurring such as multiple photon emission, photons being lost in the channel, phase errors, and detector imperfections. The simulator assumes quantum signals are continually being sent from end nodes building a raw-key pool. When the simulator is called, it determines how many signals could have been sent from the last call (based on the speed of the simulated laser source and detector dead times), what the user's choices were for those signals (e.g., basis and intensity choices), and whether the receiver got a measurement outcome. If a sufficient number of signals have been sent the error correction and privacy amplification results are simulated leading to the generation of a simulated secret key of the actual size that would be generated under these conditions in practice. These secret key bits are added to the respective key pool.

Quantum-Secure NMGs Communication Network

Figure 7:
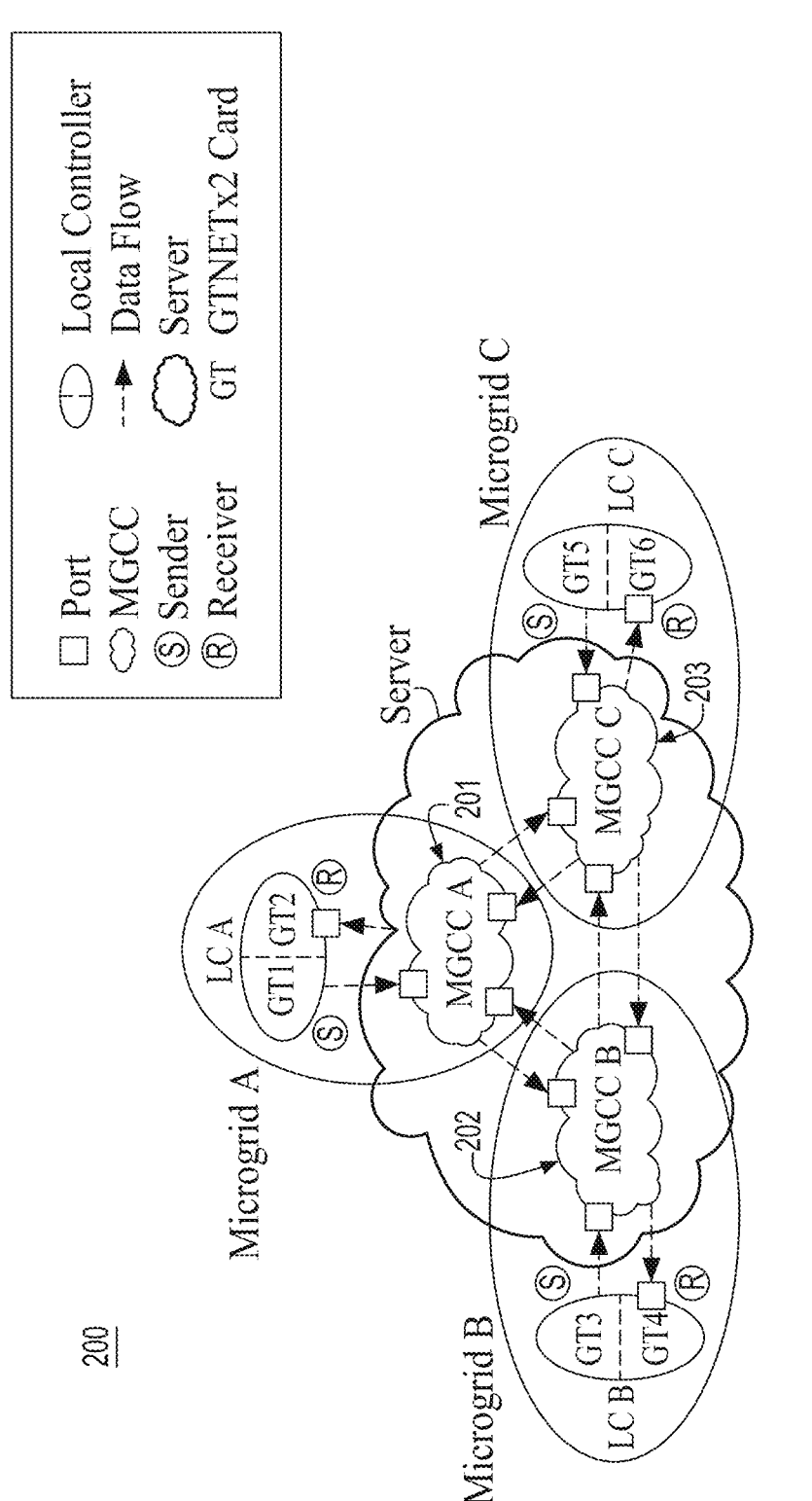
FIG. 7 depicts a network topology for the QKD-enabled quantum-secure NMGs in an embodiment.

FIG. 7 depicts generally an exemplary network topology 200 for the QKD-enabled quantum-secure NMGs. In an embodiment, three MGs, MGA 201, MGB 202 and MGC 203 are interconnected with each other. In the testbed, the keys used for communications between two MGs and between a MGCC and a respective local controller (LC) are generated using separate QKD algorithms, and are stored in separate KPs. When there is a need to use keys, a certain number of bits are consumed from the corresponding KP. Two GTNET×2 cards are utilized for the communication between a LC in the RTDS simulator and each MGCC on the remote server. The User Datagram Protocol (UDP) is used in the simulation to transmit and receive data.

The measurements in each MG are transmitted to its MGCC through one GTNET×2 card with a fixed speed set in RSCAD. The destination IP address is set as the IP address of the server, and the destination port is a specific number for the MGCC. Another GTNET×2 card is used for the LC to receive data from MGCC. Any UDP packet whose destination IP and port match those of this GTNET×2 card, will be received.

From the MGCC side, each MGCC is receiving any UDP packet whose destination IP is the server's IP and destination port match the MGCC's port. When each MGCC receives a data packet from the RTDS, it sends out messages to other two MGCCs and a control signal to its LC. Two other ports are set for each MGCC to receive UDP packets from other two MGCCs. When each MGCC receives a data packet from another MGCC, a certain number of bits in the KP between the two MGCCs are deducted.

NMGs Modeling

Figure 8:
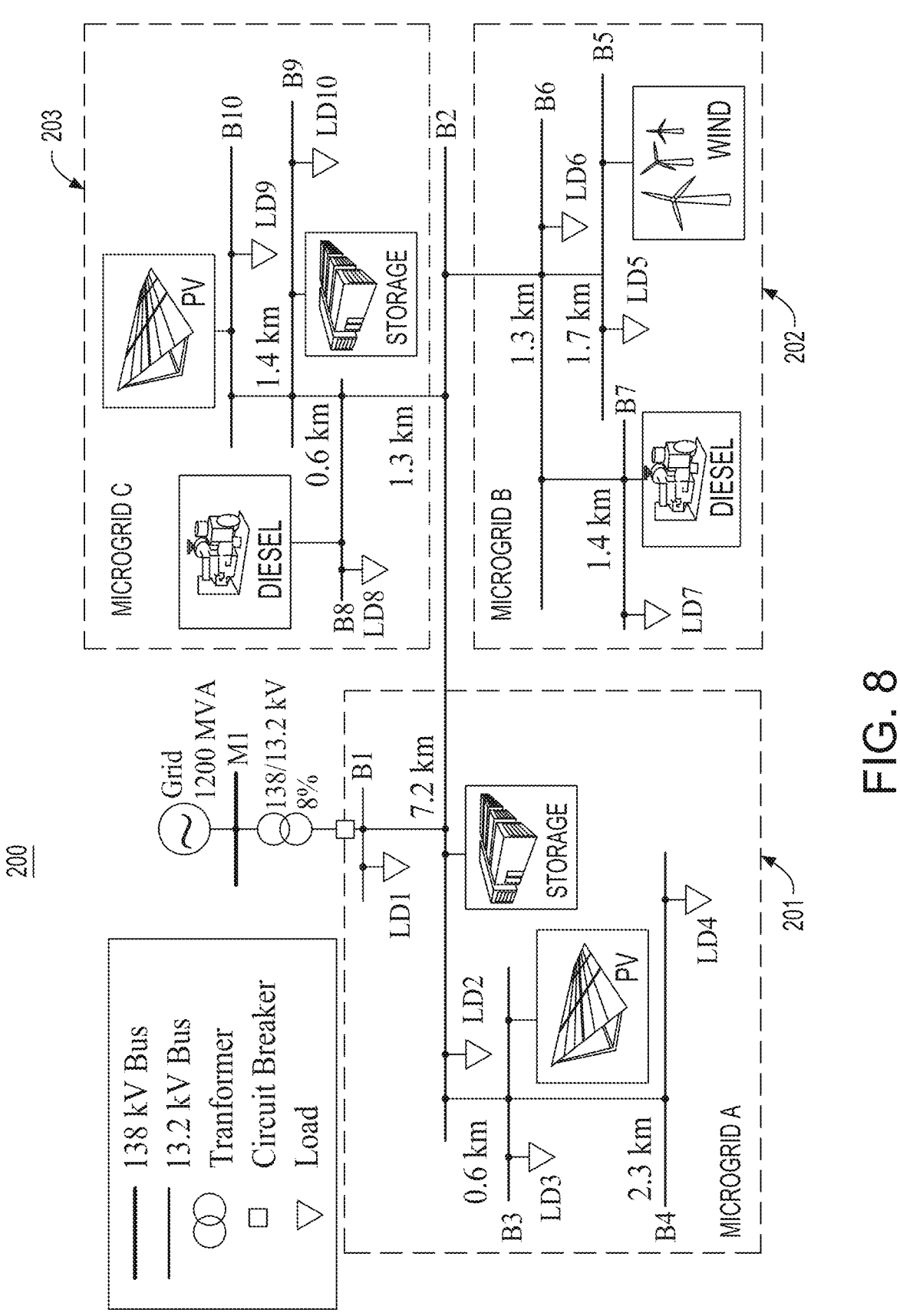
FIG. 8 depicts a one-line diagram of the NMGs model in an exemplary embodiment.

A typical NMGs system 200 shown in FIG. 8 is modeled to evaluate the performance of the QKD-enabled NMGs. This system is designed based on a medium-voltage MG with a battery and communication channels added. In an embodiment, three MGs, MGA 201, MGB 202 and MGC 203 are interconnected with each other. MG A 201 contains a photovoltaic (PV) system and a battery storage. A P-Q control is designed to regulate the output power of the battery, the value of which is determined by the real and reactive power references transferred from MGCC A. MG B 202 contains a diesel generator and a wind turbine. A droop control is utilized to regulate the output power of the diesel, the value of which is determined by the real and reactive power references transferred from MGCC B. MG C 203 contains a diesel generator, a PV system and a storage, where the storage uses a P-Q control whose real and reactive power references are given by MGCC C. Both the PV and wind turbine in the NMGs use the Maximum Power Point Tracking (MPPT) control to maximize their output powers. The information shared between two MGs includes the total power generation and the total load in each MG.

Key Generation Speed with Different Distances and Noises

Figures 9, 10:
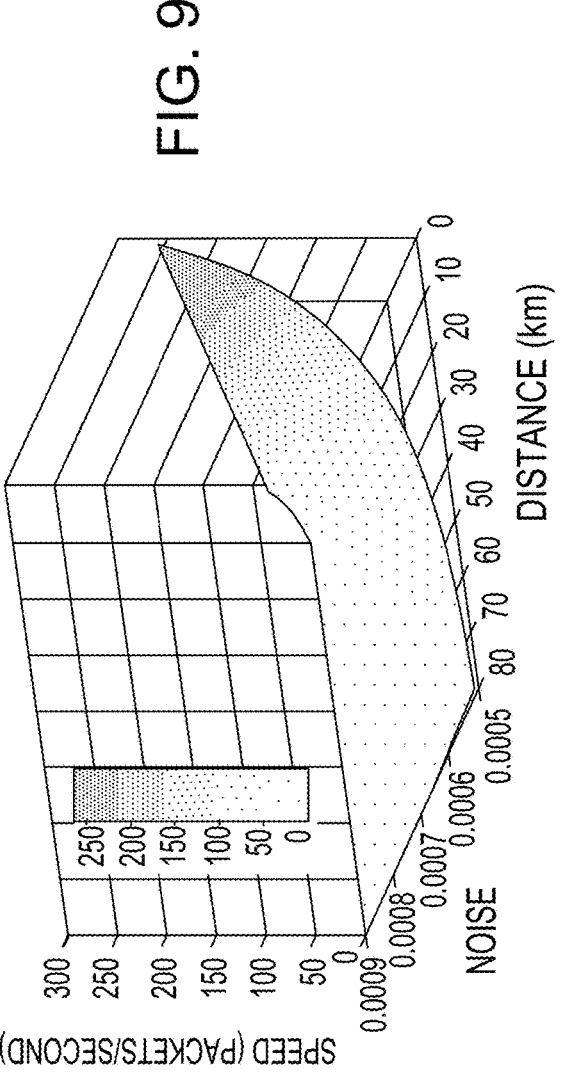
FIG. 9 depicts an example key generation speed with different distances and noises with each packet consisting of 64 bits in an embodiment.
FIG. 10 depicts an example voltage response of a bus 1 before and after the key bits are used up in the example NMG model of FIG. 8.

The key generation speed is a critical metric in a QKD based system, as it determines the maximum data transmission speed. FIG. 9 gives the experimental results of the key generation speed under different distances and noises, where each packet consists of 64 bits. It can be seen that 1) a small distance exhibits great superiority over a large one under the same noise, which gives valuable insights that two QKD parties should not be too far from each other, and 2) a large noise dramatically decreases the speed even with a small distance; this indicates that a proper strategy is significantly needed to improve the system's resilience against attacks.

Impact of Attacks on NMGs

The impact of attacks on NMGs is evaluated. For a classical communication or a quantum communication when keys are exhausted, the security of the communication can be easily broken by using quantum computers. The control signals sent from the MGCC to the LC can thus be intercepted and falsified by an adversary. The impact of a malicious control signal on the NMGs system is illustrated in FIG. 10, where the real power reference of the P-Q control for the battery in MG A is changed from 0 to −6 MW at time t=16 s during the islanded mode. It can be observed that 1) the voltage's magnitude decreases, 2) the frequency also decreases, and 3) at time t=59 s, the system collapses. It is thus of great importance to have enough key bits in the KP.

Effectiveness of TLKPS in Single-Attack Scenario

Figures 11A, 11B:
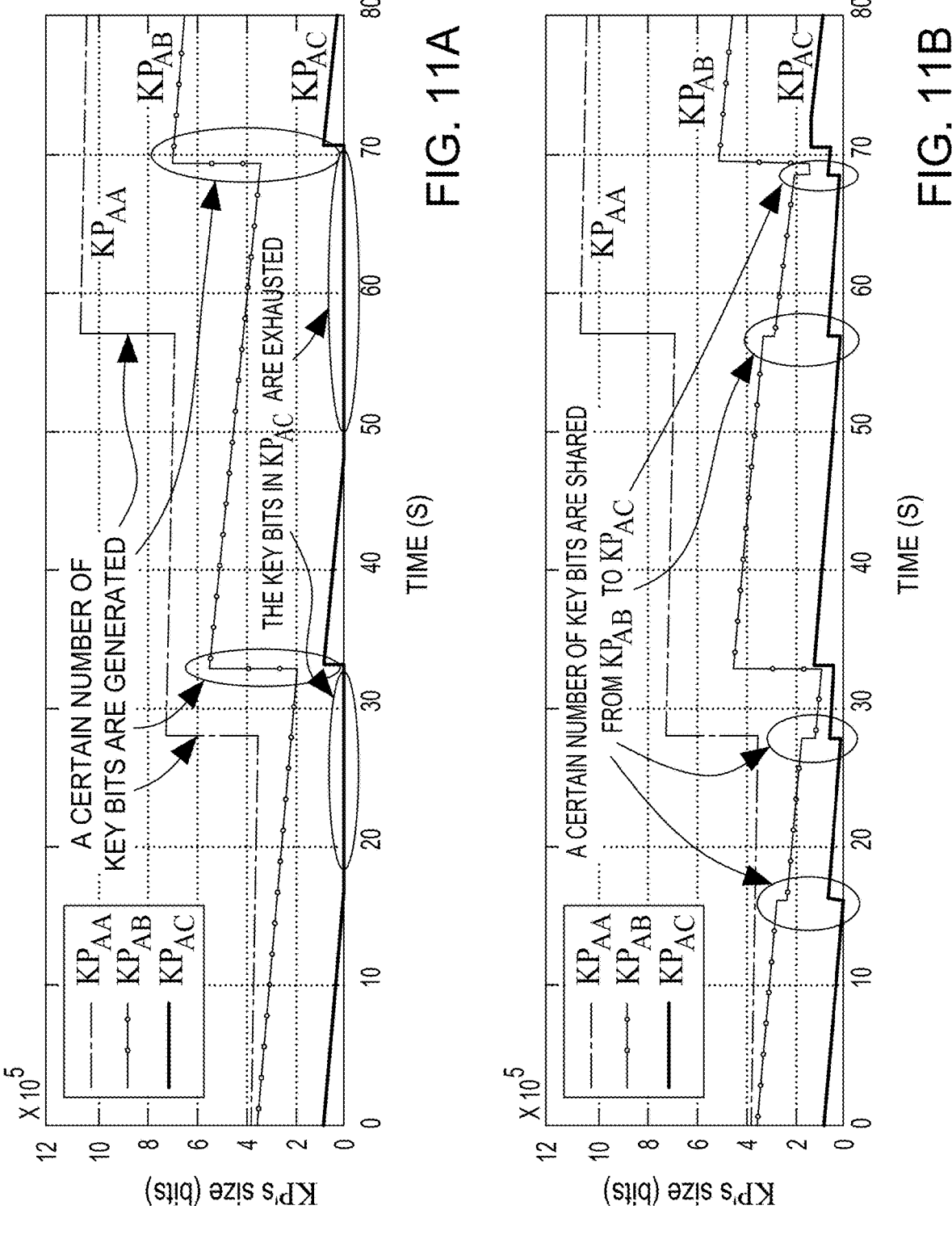
FIG. 11A shows a comparison of results of different key pools' (KPs') sizes without TLKPS.
FIG. 11B shows a comparison of results of different KPs' sizes with TLKPS when only the quantum channel between MG A and MG C is attacked.

There is now depicted a comparison of results of the numbers of bits in KPAA, KPAB and KPAC with and without TLKPS when only the quantum channel between MG A and MG C is attacked. In particular, FIG. 11A shows a comparison of results of different KPs' sizes without TLKPS; and FIG. 11B shows a comparison of results of different KPs' sizes with TLKPS. The noise for the quantum channel between MG A and MG C is set at $8 \times 10^{-4}$ to simulate a strong attack, while the noises for other quantum channels are $5 \times 10^{-4}$. The distance between two MGs is set at 10 km, and the distance between each MGCC and its LC is 5 km. For the TLKPS strategy, the threshold is set at 10,000, meaning that once the number of bits in any KP is below 10,000, a given number of bits (which is set at 50,000) will be shared to that KP. It can be seen that: 1) as shown in FIG. 11A, without TLKPS, there is a shortage of bits in KPAC while at the same time other KPs do not have the shortage issues; and 2) as shown in FIG. 11B, with TLKPS, the shortage issue can be well solved; when the number of bits in KPAC is below 10,000, 50,000 bits are sent from KPAB to KPAC.

Effectiveness of TLKPS in Multi-Attack Scenario

Figures 12A, 12B:
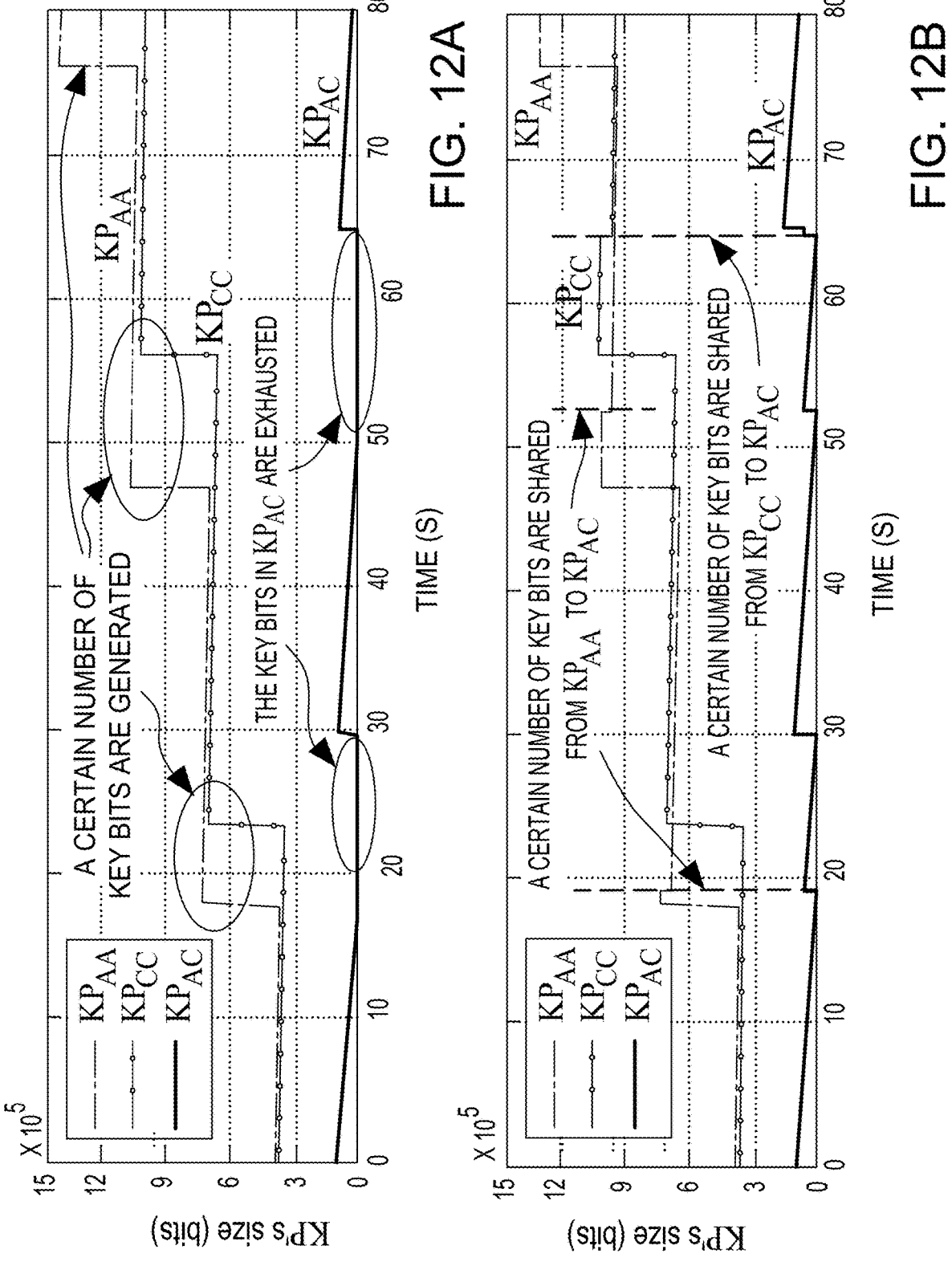
FIG. 12A depicts a comparison of results of the numbers of key bits in KPAA, KPAB and KPAC without TLKPS (FIG. 12A) and with TLKPS (FIG. 12B) in a multi-attack scenario.

There is further depicted a comparison of results of the numbers of bits in KPAA, KPCC and KPAC with and without TLKPS in a multi-attack scenario. In particular, FIG. 12A shows a comparison of results of different KPs' sizes without TLKPS; and FIG. 12B shows a comparison of results of different KPs' sizes with TLKPS. The noises for the quantum channel between MG A and MG B, and the quantum channel between MG A and MG C are both set at $8 \times 10^{-4}$ to simulate strong attacks, while the noises for other quantum channels are $5 \times 10^{-4}$ for weak attacks or no attack. The distance between MGCC A and LC A is set at 5 km, while the distance between MGCC C and LC C is 7 km for a slight difference in the numbers of bits in KPAA and KPCC. The distance between MG A and MG C is set at 9 km. The setting for the TLKPS strategy is the same as depicted in FIGS. 11A, 11B. It can be seen that: 1) without TLKPS, in FIG. 12A, there is a shortage of bits in KPAC; and 2) with TLKPS, as shown in FIG. 12B, when the number of bits in KPAC is below 10,000, 50,000 bits are shared from either KPAA or KPCC to KPAC depending on which KP (KPAA or KPCC) has more bits; the shortage issue is well solved.

Practical QKD Protocol

Different protocols have been proposed to implement QKD such as the BB84, decoy-state, six-state, Ekert91, and BBM92. A practical decoy-state BB84 QKD protocol is chosed for its ability to tolerate high channel loss and to operate robustly even with today's hardware. Its security and feasibility have been well-demonstrated by several experimental groups, and theoretical security analyses including the evaluation of concise and tight finite-key security bounds have been provided.

The idea of this protocol is as follows: The information is encoded into qubits and then sent out by one party, commonly named Alice, using weak coherent laser pulses. With today's technology, the production of a single qubit is not practical; instead, weak coherent laser pulses are used. However, these pulses contain, with non-zero probability, multiple qubit signals that would cause a break in security. To tackle this challenge, the decoy-state protocol varies the intensity of each laser pulse randomly using one of three intensities $k_1$, $k_2$ and $k_3$, which are the intensities of the signal state, decoy state and vacuum state, respectively. Two bases X and Z are selected with probabilities $p_x$ and $1-p_x$, respectively. Recall that these bases refer to the polarization setting of the qubit. The other party, named Bob, measures the qubits by randomly selecting bases from X and Z. If Alice and Bob choose the same basis, they share information since sending and receiving qubits in the same basis, as mentioned, leads to a deterministic outcome; otherwise, the iteration is discarded. By repeating this numerous times, the two parties share the referred to raw-key, which is partially correlated and partially secret. Error correction is then performed (leaking additional information to the adversary which must be taken into account) followed by privacy amplification, yielding a secret key of size $\ell$.

Figure 13:
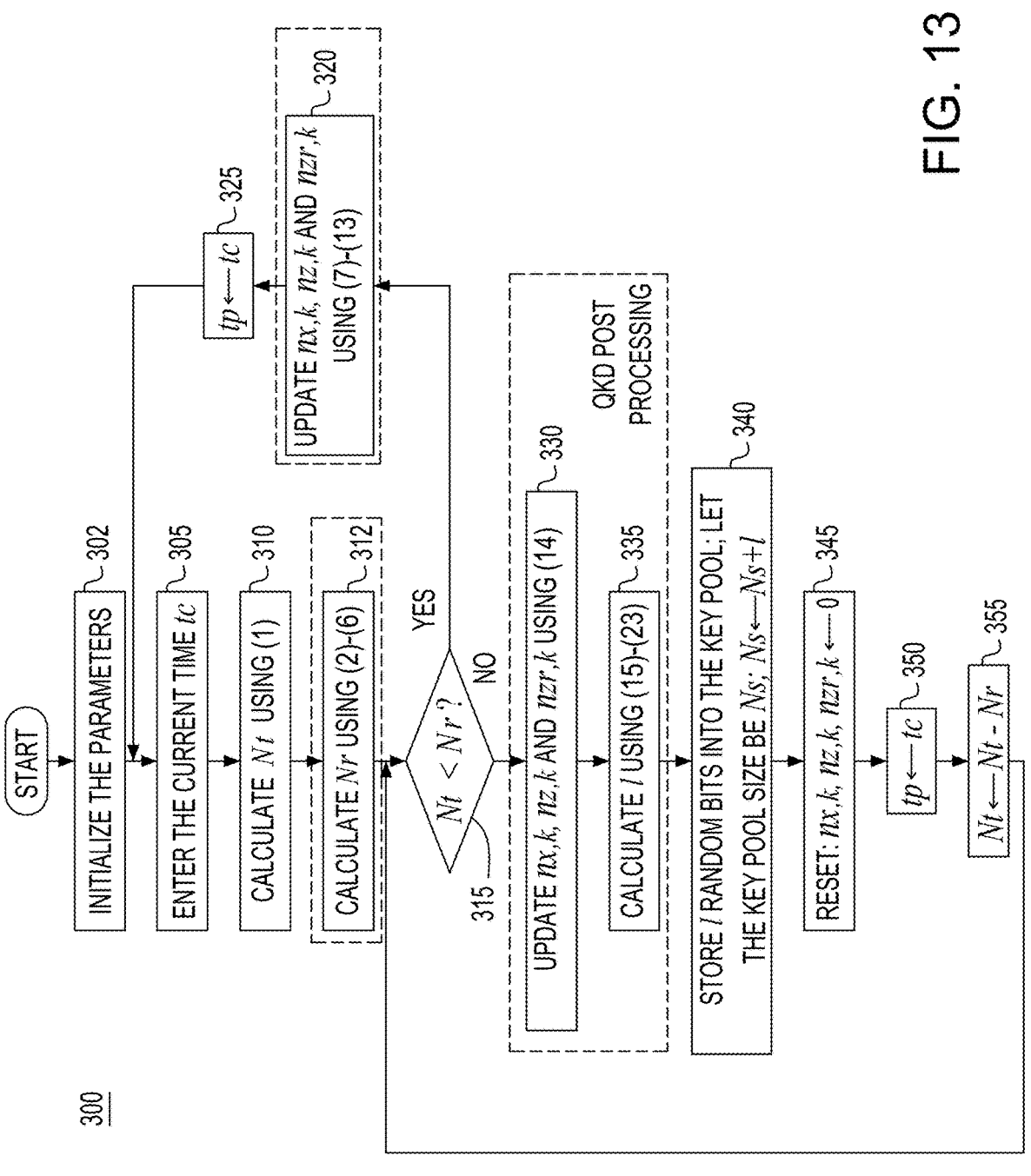
FIG. 13 depicts a flow chart of the QKD simulator in an embodiment.

To integrate QKD systems into a real-time microgrid simulation testbed, a QKD simulator is implemented using Python that is capable of simulating QKD protocols. FIG. 13 is a flow chart depiction of the QKD simulator 300 capable of simulating the decoy-state protocol. Note that this simulator is easily extensible for different QKD protocols.

In this simulator, time is used as the indicator to determine whether a sufficient number of key signals have been sent by the laser for generating the secret key of size $\ell$. In initializing the parameters at 302, at 305 there is let the current time be $t_c$, and the last calling time be $t_p$. Then, at 310, within the interval $(t_c-t_p)$, the number of signals that have been sent by the laser, $N_t$, can be obtained as $$N_t = v_s(t_c - t_p),\qquad(1)$$

where $v_s$ is the speed of the laser sending signals, a constant value assumed in this study.

The post measured signals received by Bob are temporarily stored in a classical "buffer". When a sufficient block size of signals have been received, the post processing will start. Let the block size for post processing be B which is set by the users, and the number of signals needed to be sent before the post processing can start be $N_r$. Then, at 312, there is computed:

$$N_r = \frac{B - N_b}{R_c},\qquad(2)$$

where $N_b$ is the number of raw-key signals in the "buffer", and $R_c$ is the rate of correctly-received raw-key signals, i.e., the ratio of the number of correctly-received signals (leading to a useful raw key) and the number of signals actually sent. Specifically, $R_c$ can be calculated as follows:

$$R_c = \Sigma_{k\in\{k_1,k_2,k_3\}}\; p_k p_x^2 p_{d_k},\qquad(3)$$

where $p_{d_k}$ is the probability that a signal with intensity k is received by Bob. It can be expressed as $$p_{d_k} = (1 + p_{ap})r_k, \forall\, k \in \{k_1,\, k_2,\, k_3\},\qquad(4)$$

where $p_{ap}$ is the after-pulse probability. $r_k$ is the expected detection rate (excluding after-pulse contributions) for intensity k, and can be calculated as follows:

$$r_k = 1 - (1 - 2p_{dc})e^{-\eta_{tr}\eta_{Bob}k}, \forall\, k \in \{k_1,\, k_2,\, k_3\},\qquad(5)$$

where $p_{dc}$ is the dark count probability and $\eta_{Bob}$ is Bob's detection efficiency. $\eta_{tr}$ is the transmittance that is related to the fiber length L as follows:

$$\eta_{tr} = 10^{-0.2L/10},\qquad(6)$$

where the fibers are assumed to have an attenuation coefficient of 0.2 dB/km. When the simulator is called, $N_t$ and $N_r$ are calculated and compared at 315. Based on the comparison result of $N_t$ and $N_r$ at 315, two cases exist as described below:

Case 1

If $N_t$ is smaller than $N_r$, the post processing will not start, and the value of $t_c$ will be assigned to $t_p$. Note that $t_c$ is continuously increasing. Meanwhile, a certain number of signals within the time interval $(t_c-t_p)$ will be added into the "buffer". Let $n_{X,k}$ be the number of X signals received using intensity k. Then, of course, $n_X$, the size of the raw key in the "buffer" with the X basis, is simply the sum of all $n_{X,k}$ over all the intensities used. Specifically, $n_{X,k}$ can be updated at 320 as follows:

$$n_{X,k} \leftarrow n_{X,k} + N_t R_{X,k}, \forall\, k \in \{k_1,\, k_2,\, k_3\},\qquad(7)$$

where $R_{X,k}$ is the expected transmission rate of X signals for intensity k. It can be expressed as $$R_{X,k} = p_k p_x^2 p_{d_k}, \forall\, k \in \{k_1,\, k_2,\, k_3\}.\qquad(8)$$

Similarly, the number of Z signals received using intensity k, $n_{Z,k}$, can be updated at 320 as follows:

$$n_{Z,k} \leftarrow n_{Z,k} + N_t R_{Z,k}, \forall\, k \in \{k_1,\, k_2,\, k_3\},\qquad(9)$$

where $R_{Z,k}$ is the expected transmission rate of Z signals for intensity k, and can be expressed as $$R_{Z,k} = p_k(1 - p_x)^2 p_{d_k}, \forall\, k \in \{k_1,\, k_2,\, k_3\}.\qquad(10)$$

The size of the raw key in the "buffer" with the Z basis, $n_Z$, is the sum of all $n_{X,k}$ over all the intensities used.

For one simulation, it is assumed a standard fiber channel and practical settings for devices. In this case, the probability of having a bit error for intensity k, $b_k$, is as follows:

$$b_k = p_{dc} + e_{mis}\left(1 - e^{-\eta_{tr}k}\right) + \frac{p_{ap}r_k}{2}, \forall\, k \in \{k_1, k_2, k_3\},\qquad(11)$$

where $e_{mis}$ is the error rate due to optical errors. Then, the number of erroneous bits in the Z basis for intensity k, $n_{Zr,k}$, can be updated at 320 as follows:

$$n_{Zr,k} \leftarrow n_{Zr,k} + N_t R_{Zr,k}, \forall\, k \in \{k_1, k_2, k_3\},\qquad(12)$$

where $R_{Zr,k}$ is the expected transmission error rate in the Z basis for intensity k, and can be expressed as $$R_{Zr,k} = p_k(1 - p_x)^2 b_k, \forall k \in \{k_1, k_2, k_3\}. \qquad (13)$$

When all the X, Z, and erroneous signals with all the intensities have been added, the simulator goes back to the "listening" mode at 325. As mentioned, $t_p$ becomes $t_c$, and $t_c$ continuously grows.

Case 2

Returning back to 315, FIG. 13, if it is determined that $N_t$ is greater than or equal to $N_r$, post processing will start at 330. The simulator will then add all the X, Z, and erroneous signals with all the intensities into $n_{X,k}$, $n_{Z,k}$ and $n_{Zr,k}$, respectively. Specifically, $n_{X,k}$, $n_{Z,k}$ and $n_{Zr,k}$ can be updated in the following way:

$$\begin{cases} n_{X,k} \leftarrow n_{X,k} + N_r R_{X,k} \\ n_{Z,k} \leftarrow n_{Z,k} + N_r R_{Z,k} \quad \forall k \in \{k_1, k_2, k_3\}. \\ n_{Zr,k} \leftarrow n_{Zr,k} + N_r R_{Zr,k} \end{cases} \qquad (14)$$

After the post processing is completed, the key is established and can be used by Alice and Bob. The simulator simulates the process by calculating, at 335, the length $\ell$ of the extracted secret key that would be generated under the same conditions in practice. The length $\ell$ of the extracted secret key can be obtained as follows:

$$\ell = \left\lfloor \xi_{X,0} + \xi_{X,1} - \xi_{X,1} h(\phi_X) - \lambda_{ec} - 6\log_2\frac{21}{\varepsilon_s} - \log_2\frac{2}{\varepsilon_c} \right\rfloor, \qquad (15)$$

where $h(x) = -x \log_2 x - (1-x)\log_2(1-x)$ is the binary entropy function. $\xi_{X,0}$, $\xi_{X,1}$, and $\phi_X$ are the number of vacuum events, the number of single-photon events, and the phase error rate of the single-photon events in the raw key with the X basis, respectively. $\varepsilon_c$ is the probability that the keys extracted by the two parties are not identical, and $\varepsilon_s$ is the user-specified maximum failure probability. $\lambda_{ec}$ specifies how much information is leaked during error correction. It is set to $n_X \eta_{ec} h(\phi_X)$, where $\eta_{ec}$ is the error-correction efficiency.

The above parameters cannot be directly observed; however, by using the decoy-state protocol, they can be bounded. Basically, $\xi_{X,0}$ satisfies $$\xi_{X,0} \geq \chi_0 \frac{k_2 n_{X,k_3}^- - k_3 n_{X,k_2}^+}{k_2 - k_3}, \qquad (16)$$

where $\chi_n$ is the probability that Alice sends a n-photon state. This value, using a weak-coherent laser, follows a Poisson distribution and is found to be:

$$\chi_n = \sum_{k \in \{k_1, k_2, k_3\}} e^{-k} k^n p_k / n!, \qquad (17)$$

and $$n_{X,k}^{\pm} = \frac{e^k}{p_k}\left(n_{X,k} \pm \sqrt{\frac{n_X}{2}\ln\frac{21}{\varepsilon_s}}\right), \forall k \in \{k_1, k_2, k_3\}. \qquad (18)$$

The number of single-photon events in the raw key with the X basis, $\xi_{X,1}$, satisfies $$\xi_{X,1} \geq \frac{\chi_1 k_1\left[n_{X,k_2}^- - n_{X,k_3}^+ - \frac{k_2^2 - k_3^2}{k_1^2}\left(n_{X,k_1}^+ - \frac{\xi_{X,0}}{\chi_0}\right)\right]}{k_1(k_2 - k_3) - k_2^2 + k_3^2}. \qquad (19)$$

Similarly, by using (16)-(19) with statistics from the basis Z, the number of vacuum events in $Z_A$, $\xi_{Z,0}$, and the number of single-photon events in the raw key with the Z basis, $\xi_{Z,1}$, can also be obtained.

The phase error rate of the single-photon events in the raw key with the X basis, $\phi_X$, satisfies, $$\phi_X \leq \frac{\delta_{Z,1}}{\xi_{Z,1}} + f\left(\varepsilon_s, \frac{\delta_{Z,1}}{\xi_{Z,1}}, \xi_{Z,1}, \xi_{X,1}\right), \qquad (20)$$

where $$f(a, b, c, d) = \sqrt{\frac{(c+d)(1-b)b}{cd\log 2}\log_2\left(\frac{c+d}{cd(1-b)b}\frac{441}{a^2}\right)}, \qquad (21)$$

and $\delta_{Z,1}$ is the number of bit errors of the single-photon events in the raw key with the Z basis. It is given by $$\delta_{Z,1} \leq \chi_1 \frac{m_{Z,k_2}^+ - m_{Z,k_3}^-}{k_2 - k_3}, \qquad (22)$$

where $$m_{Z,k}^{\pm} = \frac{e^k}{p_k}\left(m_{Z,k} \pm \sqrt{\frac{m_Z}{2}\ln\frac{21}{\varepsilon_s}}\right), \forall k \in \{k_1, k_2, k_3\}, \qquad (23)$$

and $m_Z = \sum_{k \in \{k_1, k_2, k_3\}} m_{Z,k}$. Here, $m_{Z,k}$ is the number of error events in the Z basis.

In an embodiment, the initial values of the parameters from equations (1)-(23) are given in Table 1.

TABLE 1

| Initial values of the parameters in the QKD simulator | | | | | | |
|---|---|---|---|---|---|---|
| $k_1$ | $k_2$ | $k_3$ | $p_{k_1}$ | $p_{k_2}$ | $p_{k_3}$ | $n_{X,k}$ |
| 0.4 | 0.1 | 0.007 | ⅓ | ⅓ | ⅓ | 0 |
| B | $p_x$ | $p_{dc}$ | $\varepsilon_c$ | $\eta_{Bob}$ | $e_{mis}$ | $n_{Z,k}$ |
| $10^7$ | 0.8 | $6 \times 10^{-7}$ | $10^{-11}$ | 0.1 | $5 \times 10^{-4}$ | 0 |
| $t_p$ (s) | $\eta_{ec}$ | $p_{ap}$ | $\varepsilon_s$ | L (km) | $v_s$ (bit/s) | $n_{Zr,k}$ |
| 0 | 1.16 | $4 \times 10^{-2}$ | $10^{-11}$ | 5 | $4 \times 10^7$ | 0 |

In sum, this simulator simulates the probabilities of various events occurring such as multiple-photon emission, photons being lost in the channel, phase errors, and detector imperfections. The simulator assumes quantum signals are continually being sent from end-nodes building a raw-key pool. When the simulator is called, it determines how many signals could have been sent from the last call (based on the speed of the simulated laser source and detector dead times), what the user's choices were for those signals (e.g., basis and intensity choices), and whether the receiver got a measurement outcome. If a sufficient number of signals have been sent, the error correction and privacy amplification results are simulated leading to the generation of a simulated secret key of the actual size that would be generated under these conditions in practice. These secret key bits are added to the corresponding key pool as shown at 340, FIG. 13. Then, $n_{X,k}$, $n_{Z,k}$, $n_{Zr,k}$ values are reset at 345 and the simulator goes back to the "listening" mode at 350 and $t_p$ becomes $t_c$. The number of signals that have been sent by the laser, $N_t$ is then updated at 355 and the process returns to 315, FIG. 13.

Note that this QKD simulator is able to flexibly alter QKD parameters for simulating different scenarios, e.g., with different fiber lengths and noise levels. The simulator is also easily extensible for different QKD protocols and quantum channels. With a different QKD protocol, the steps 312, 320, 330, 335 in FIG. 13 need to be changed correspondingly.

QKD is one of the most secure and practical instances of quantum cryptography. Specifically, using QKD provides the following benefits for microgrid:

Keys generated by QKD are almost impossible to steal even in the face of an adversary with infinite supplies of time and processing power, because by encoding a classical bit using a randomly-chosen basis, an adversary unaware of the basis choice can never be truly certain of the information being transmitted;

QKD is particularly well-suited to produce a long random key, which makes the OTP more realistic in practice. When QKD is combined with OTPs, both the key generation and encryption are unconditionally secure.

A QKD-enabled microgrid is able to detect the presence of an eavesdropper trying to gain knowledge of the keys, whereas existing communication systems without this ability will inevitably require extra detection mechanisms. This is because any attempt to learn keys causes noise in the quantum channel which can be detected by users.

QKD systems have the advantage of automatically generating provably secure keys over those manually distributing keys. This is needed in microgrid to satisfy various continuous data transmission requirements.

In a further embodiment, the QKD networked microgrid systems further incorporate real SDN switches (i.e., four Pica8 SDN switches) with attendant practical SDN functionalities to improve the resilience of the QKD-enabled microgrids.

In addition, an enhanced QKD simulator that can not only demonstrate the number of key bits generated each time by QKD, but also store the number of data that would need to be transmitted classically to get the real QKD system to work.

The QKD- and SDN-Enabled Microgrid Architecture

Figure 14:
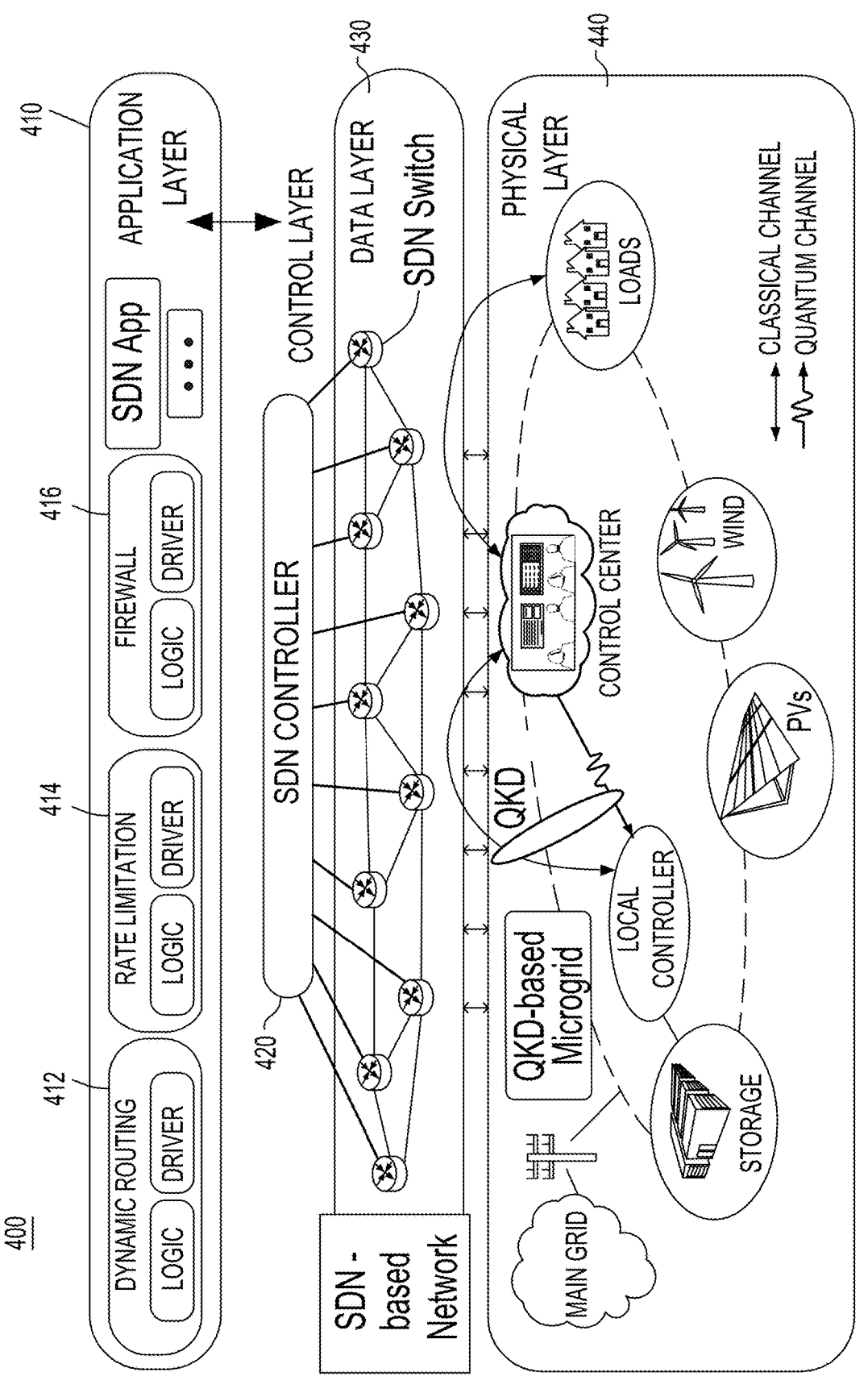
FIG. 14 depicts an architecture of the QKD- and SDN-enabled microgrid according to an embodiment.

The architecture of the QKD- and SDN-enabled microgrid 400 is illustrated in FIG. 14. The architecture consists of four layers, namely application layer 410, SDN control layer 420, data layer 430, and physical layer 440. In contrast to a traditional switch where the control and data layers are bounded together, an SDN switch separates its control and data layers where the control rules are developed in a separate SDN controller, making the SDN switch a simple forwarding switch. This setup offers a more flexible environment to manage the control logic including either modifying the existing control rules or developing new ones.

A QKD system consists of a quantum channel and a classical one, where the quantum channel is used to transfer quantum bits (qubits) from one party to the other and the classical channel is used for tasks including post-processing and normal data transmission. In this architecture, the classical channel for each QKD system goes through the SDN network, i.e., every classical packet sent from one party to the other is managed by SDN, no matter it is for the purpose of postprocessing or normal data transmission.

SDN Applications for Improving System Resilience

Three SDN functionalities are implemented in the embodiment shown in FIG. 14. Different with other applications, they are designed particularly for the sake of improving the resilience of QKD-enabled microgrids. They are also practical solutions to promote the adoption of QKD in microgrid contexts.

1) Dynamic Routing 412, FIG. 14: In QKD protocols such as the BB84 protocol, qubits are transferred from one party to the other over the quantum channel for generating "raw keys", and postprocessing steps including the error correction and privacy amplification, are later conducted over the classical channel to distill final keys. This results in that more data packets are injected into the communication network. If more QKD systems are installed in a microgrid, classical channels are likely to be crowded, potentially affecting the normal data transmission. In this embodiment, an SDN-based dynamic routing method is developed to tackle this issue. Specifically, an SDN switch, based on the control rules developed in the SDN controller, will forward the data via a different route under certain scenarios, e.g., when there is a link failure or the rate of packets in a link is above a threshold. The control rules can be flexibly modified in the SDN controller.

2) Rate Limitation 414, FIG. 14: The key generation speed of a QKD system can be affected by a variety of parameters such as the distance between two communicating parties, and the noise level on the quantum channel. Meanwhile, the key consumption speed is determined by the frequency of the normal data transmission. In a QKD-enabled microgrid with multiple QKD systems installed, it is likely that some QKD systems do not have enough keys while others have too much. An SDN-based rate limitation method is developed to address this issue. Specifically, a higher rate of packets is assigned to a QKD system that has a lower ratio of key generation speed and key consumption speed. This rate limitation function also works in other scenarios such as prioritization of those relatively-critical communications. The configuration can be dynamically changed over time within the SDN controller.

3) Firewall Implementation 416, FIG. 14: Implementing firewalls in QKD-enabled microgrids is of great importance as the compromised data packets injected into either the QKD postprocessing or normal data transmission can cause problems. Unlike a traditional switch that typically does not have firewalls installed, an SDN switch can implement firewalls by developing control rules in the SDN controller. For instance, it can block all the traffics outside the local network, only allow packets from certain areas, or separate the data paths for the QKD post-processing and normal data transmission. The network security can thus be greatly enhanced and the performance of QKD-enabled microgrids can also be improved.

SDN-Enabled Communication Scheme

Each microgrid has its own information such as the number of KPs it connects and the number of bits in each KP. It is, however, typically unconscious of the information owned by other microgrids. The SDN controller is thus established to manage the network by collecting information from each microgrid and providing the optimal decision unattainable by a single microgrid. In this study, SDAPP and TLKPS are enabled by SDN to mitigate DoS attacks under various circumstances. Specifically, the SDN controller has the following functions. 1) It monitors the information of KPs including the number of KPs each MGCC possesses and symbols indicating whether each KP is willing to share bits for other KPs. It updates the information periodically. 2) If faced with a DoS attack, it determines which case it is and tells corresponding MGCCs which layer of the TLKPS strategy should be implemented. 3) It provides parameters modification for each KP enabling a resilient, flexible, and economical NMGs system.

In an embodiment, as the TLKPS strategy is only required when the number of bits in a KP is lower than a threshold Th, an event triggered communication scheme is established to reduce the communication bandwidth while still maintaining the system resiliency.

KPs Monitoring

In view of FIG. 14, the SDN controller 420 is a logically centralized network controller that has access to all the SDN switches. It can communicate with all the MGCCs to collect KPs' information. In the presented scheme, the SDN controller periodically sends requests to all the MGCCs. Once receiving a request, each MGCC sends corresponding information to the SDN controller. It is thus important for the SDN controller to identify each MGCC and corresponding local controllers. Using the IP protocol as an example, each MGCC or local controller has a unique IP address. The information sent from each MGCC to the SDN controller includes the following. 1) IP addresses of all the local controllers that have established KPs with the MGCC. By knowing the local controllers' IP addresses, the SDN controller not only obtains the number of KPs inside each microgrid, but also identifies those KPs. 2) IP addresses of all the neighboring MGCCs that have established KPs with the MGCC. Similarly, the SDN controller obtains the number of KPs the MGCC connects outside the microgrid and identifies those KPs. Importantly, the SDN controller obtains a global overview of the KPs, with which it can determine if there is an alternative QKD path between two microgrids. 3) A symbol (i.e., 0 or 1) for each KP indicating whether the MGCC is willing to share bits from this KP to other KPs at this moment. With this information, the SDN controller determines which KPs should be utilized to share bits in TLKPS. Compared with sending the number of bits in each KP, the confidentiality is improved.

Figures 15, 16:
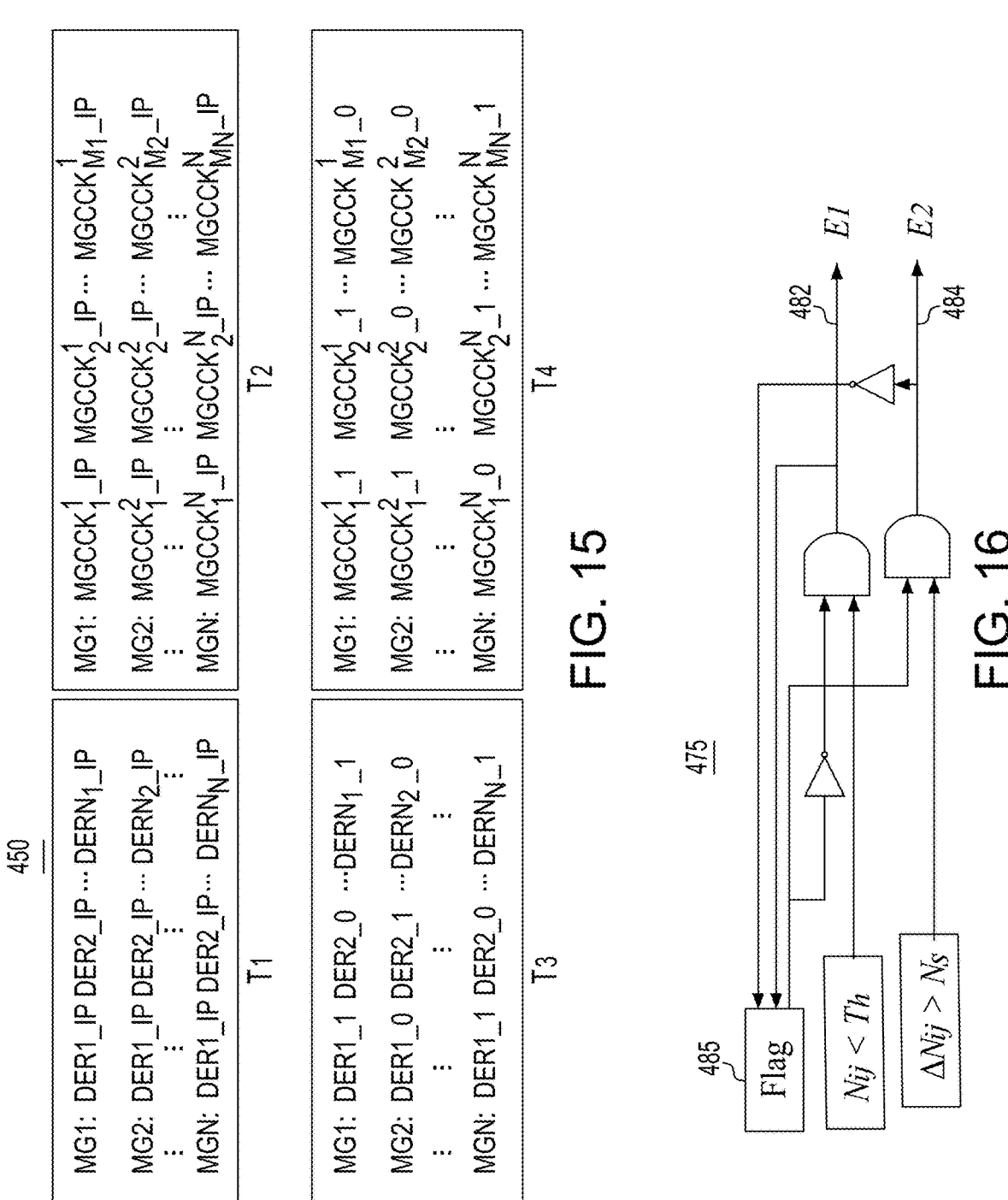
FIG. 15 depicts the use of lookup tables in the SDN controller according to an embodiment.
FIG. 16 depicts a logic diagram of the event detection in one embodiment.

Once the SDN controller receives the above information, it updates the lookup tables 450, i.e., T1-T4 as shown in FIG. 15. Specifically, tables T1 and T2 store IP addresses of local controllers and neighboring MGCCs that have established KPs with each MGCC, respectively. Tables T3 and T4 store the binary bits for KPs established inside each microgrid and between two microgrids, respectively. "1" indicates that the KP is willing to share bits for other KPs, and "0" means the KP refuses to share bits for other KPs. These tables will be checked when an event occurs and a request from any MGCC is received by the SDN controller.

Event-Triggered Communication

FIG. 16 illustrates a logic diagram 475 of the event detection. To reduce the network bandwidth consumption (corresponding to the achieved throughput, i.e., the average rate of successful data transfer through a communication path), an event-triggered communication scheme is developed. E1 and E2 are two events defined in this scheme where event E1 482 refers to the bit-sharing request from any MGCC to the SDN controller and event E2 484 is the request clearance after bit sharing is completed. These events 482, 484 are detected by each MGCC.

With more particularity, an E1 event 482 is triggered when the number of bits in a KP between two microgrids (i.e., Nij) is detected to be lower than the threshold Th. Note that if the KP between any MGCC and a local controller lacks bits, the MGCC can implement the second layer of TLKPS directly because it has control of all the KPs surrounding itself. E2 event 484 is triggered only after E1 is triggered and when the given number (i.e., Ns) of bits have been shared to the KP. This detection sequence can be achieved by setting a flag 485 which is initialized at zero.

When an E1 event is triggered, the MGCC sends the E1 request including its own IP address and the IP address of the other MGCC (with which the KP is established) to the SDN controller. Assume the index numbers of the two MGCCs are i and j, respectively. Upon receiving the request, the SDN controller checks T2 to determine whether there are any MGCCs that have established KPs with both MGCCs i and j. The procedures of the SDN controller for the E1 event are shown in FIG. 17, where Nt refers to the total number of microgrids.

Figure 17:
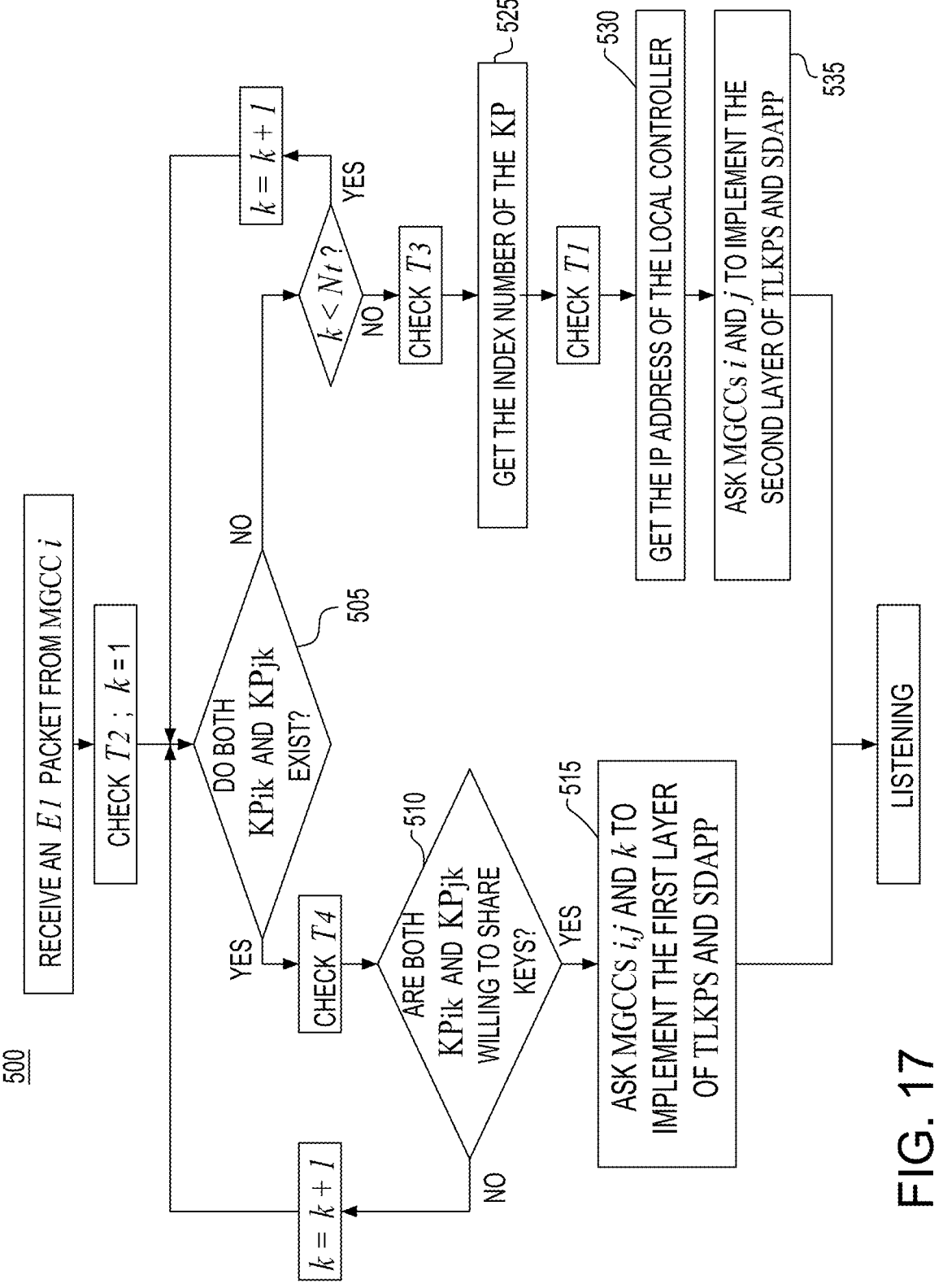
FIG. 17 depicts a flow chart representing the procedures of the SDN controller for the E1 event according to an embodiment.

FIG. 17 shows a flow chart of a method 500 for the SDN controller for the E1 event.

In response to receiving an E1 event, a check is made at look-up table 72 to determine at 505 whether both $KP_{ik}$ and $KP_{jk}$ exists. If there exists one MGCC k (checked in look-up table 72) and, as determined at 510, if the bits for both Nik and Njk are 1 (checked in look-up table T4), the SDN controller sends control signals to MGCCs i, j, and k to implement the first layer of TLKPS and the SDAPP at 515. Otherwise, returning to 505, if both $KP_{ik}$ and $KP_{jk}$ do not exist, the SDN controller checks 73 to select a KP from all KPs within MGs i and j that are willing to share keys and obtains an index number of the KP at 525. With the index number of the selected KP, the SDN controller checks T1 to obtain the local controller's IP address at 530, and sends it to MGCCs i and j to implement the second layer of TLKPS and the SDAPP at 535, FIG. 17.

It is noted that the SDAPP is implemented not only for attacked KPs but also for KPs that will share bits to attacked KPs. When an E2 event is triggered, the SDN controller sends control signals to corresponding MGCCs to finish the sharing.

Effectiveness of SDN-Enabled Communication

The SDN-enabled event-triggered scheme is effective as illustrated in the following example taken in view of FIG. 18. Specifically, the SDN controller receives 10 data packets from each MGCC per second to update the information. When an E1 event occurs, the speed for the E1 packets transmission from the MGCC to the SDN controller is set at 100 packets/s. At time t=20 s, the number of bits in $$KP_2^1$$

is below the threshold and E1 packets are sent from MGCC 2 to the SDN controller. At time t=55 s, both $$KP_2^1 \text{ and } KP_4^1$$

lack bits and E1 packets are sent from MGCCs 2 and 4 to the SDN controller. When an E1 packet is received by the SDN controller, the TLKPS is implemented and is completed in 1 s. The data packets received by the SDN controller are monitored using Wireshark, and the results are illustrated in FIG. 18.

Figure 18:
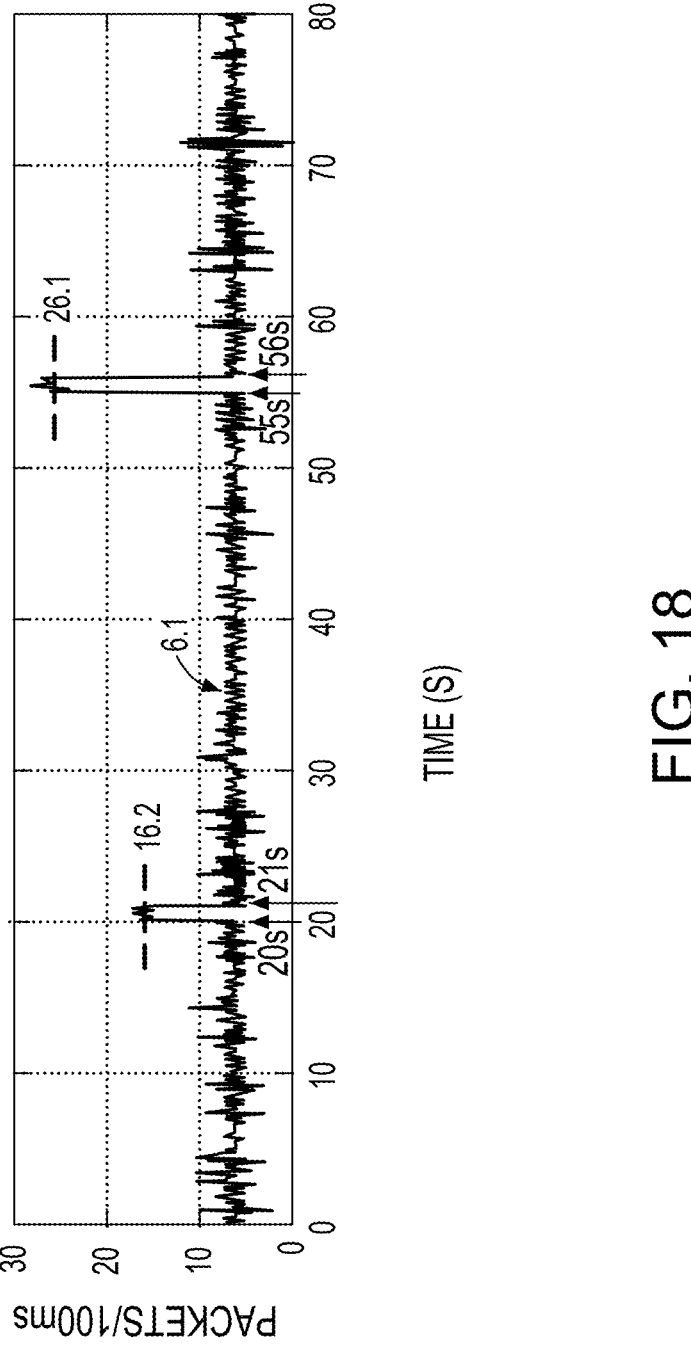
FIG. 18 depicts a timing diagram of data packets received by the SDN controller during two events according to an embodiment.

It can be observed from FIG. 18 that the throughput increases to 16.2 packets/100 ms from 20 to 21 s, and 26.1 packets/100 ms from 55 to 56 s, signaling that the SDN controller has received the packets during E1 events. Compared with continuous data transmissions, this scheme requires a shorter period, greatly reducing the usage of communication bandwidth.

Enhanced QKD Simulator

In addition to the capability of demonstrating the number of key bits generated each time by QKD (in the QKD simulator), an enhanced QKD simulator (QKDS+) is provided with a new feature, i.e., storing the amount of data that would need to be transmitted classically to get the real QKD system to work. Simulating the amount of classical data in QKD is vital to perform an accurate study and to determine how best resources should be distributed in microgrids.

QKDS+ is also developed in Python. Its procedures are given in the method 600 depicted in FIG. 19, where the decoy-state BB84 QKD protocol is adopted. Note that other QKD protocols can also be utilized with similar principles. Among various QKD protocols, the decoy-state BB84 QKD protocol is one of the most widely used schemes due to its capability of tolerating high channel loss and operating robustly. The basic idea of this QKDS+ protocol 600 is as follows: A transmitter, commonly named Alice, encodes information into qubits, and sends qubits to a receiver, commonly named Bob, through a quantum channel, i.e., a fiber. Weak coherent laser pulses are commonly utilized to prepare qubits. The intensity of each laser pulse varies randomly from three intensities $\xi_1$, $\xi_2$ and $\xi_3$, i.e., the intensity of the signal state, decoy state, and vacuum state, respectively. Alice randomly selects a basis from two bases (denoted as X and Z) with a certain probability (i.e., $p_x$ for basis X and $1-p_x$ for basis Z), to encode the information. When Bob receives the qubits, he also randomly selects a basis from X and Z (with a probability $p_x$ for basis X and $1-p_x$ for basis Z) to measure the state of each qubit. For each qubit, if the same basis is selected by the two parties, the result measured by Bob will be the same with that prepared by Alice; otherwise, the result will be discarded. The two parties share a so-called raw key (partially correlated and partially secret) after repeating this numerous times. Post-processing procedures including the error correction and privacy amplification are then performed, over a classical channel, to distill a final secret key of sized $\ell$.

In the QKD simulator of FIG. 13 there is used time as an indicator to determine how many key bits have been generated at any moment. In QKDS+ of FIG. 19, two new variables are added, denoted as $n_A$ (referring to the number of classical bits that need to be transmitted from Alice) and $n_B$ (referring to the number of classical bits that need to be transmitted from Bob). Note that Alice does a lot more data transmitting than Bob. The numbers of required classical bits transmitted from Alice and Bob can be summarized as follows:

Alice needs to transmit her basis choices to Bob (1 bit per signal). Note that after Alice sends her basis choices to Bob, Bob will check: is this the same basis and did I get a signal (i.e., no vacuum)? If "yes" to both, Bob will transmit a "1" to Alice; otherwise, transmit a "0". If Alice gets a "1" from Bob, she knows their basis choices are the same and that Bob did not get a vacuum.

Alice needs to transmit intensity choices ($\log_2 3$ bits per signal since there are three intensities).

Bob needs to disclose whether he got a vacuum or not, together with his basis choices (1 bit per signal).

Alice and Bob need to determine errors in the Z basis. Thus, Alice and Bob need to disclose all their Z basis measurements (1 bit per signal for each party).

Alice needs to transmit error correction information, which requires $\gamma_{ec}$ bits ($\gamma_{ec}$ specifies how much information is leaked during error correction.

Alice needs to transmit a hash of the key to verify the correctness. This requires $\log_2(1/\varepsilon_c)$ bits, where $\varepsilon_c$ is the probability that the keys extracted by the two parties are not identical.

Finally, Alice needs to send privacy amplification data to Bob, which requires (size of raw key+size of final secret key−1) bits.

Formulations of QKDS+

As shown at 605, FIG. 19, let $t_c$ be the current time input, and $t_d$ be the last calling time. Then, at 610, within the interval $(t_c-t_d)$, the number of qubits that are transmitted from Alice to Bob, $N_c$, is as follows:

$$N_c = v_q(t_c - t_d), \tag{24}$$

where $v_q$ is the frequency of sending qubits, e.g., $4 \times 10^7$ bits/s. For each qubit, if Alice and Bob selected the same basis and the result measured by Bob is not vacuum (contributing to the raw-key), the result will be stored in a "buffer". In the decoy-state BB84 QKD protocol, the post processing will only start after a sufficient number (denoted as B, a user-specified value) of X-basis raw-key signals have been stored in the "buffer". Then, the number of qubits needed to be sent before the post processing can start (denoted as $N_b$) can be computed at 615, FIG. 19 as follows:

$$N_b = \frac{B - n_x}{\alpha_x}, \tag{25}$$

where $n_x$ is the number of existing X-basis raw-key signals in the "buffer", and $\alpha_x$ is the ratio of the number of correctly received X-basis raw-key signals and the total number of signals actually sent, and can be obtained as follows:

$$\alpha_x = \sum_{\xi \in \{\xi 1, \xi 2, \xi 3\}} p\xi p_x^2 p_{d_\xi}, \tag{26}$$

where $p_\xi$ is the probability that a qubit is prepared with the intensity $\xi$ (i.e., $\xi_1$, $\xi_2$, or $\xi_3$), and $p_{d_\xi}$ is the probability that a qubit is received with the intensity $\xi$. $p_{d_\xi}$ can be obtained as follows:

$$p_{d_\xi}(1 + p_{ap})r_\xi, \tag{27}$$

$$\xi = \xi_1, \xi_2, \xi_3$$

where $p_{ap}$ is the after-pulse probability, i.e., $4 \times 10^{-2}$ in an example. $r_\xi$ is the expected detection rate for intensity $\xi$, and can be expressed as $$r_\xi = 1 - (1 - 2p_{dc})e^{-\eta_{tr}\eta_{Bob}\xi}, \quad (28)$$

$$\xi = \xi_1, \xi_2, \xi_3,$$

where $p_{dc}$ is the dark count probability, i.e., $6\times10^{-7}$ in this study, $\eta_{Bob}$ is the detection efficiency of the receiver, and $\eta_{tr}$ is the transmittance. With a fiber of length L (assuming the fiber has an attenuation coefficient of 0.2 dB/km in this study), $\eta_{tr}$ can be obtained as follows:

$$\eta_{tr} = 10^{-0.2L/10}. \quad (29)$$

QKDS+ uses time as an indicator to determine both the number of keys generated and the amount of classical data required. At any time when QKDS+ is called, $N_c$ and $N_b$ are calculated and compared with each other. While $N_c \geq N_b$, FOR-Do loop 620 is entered and the post processing will start leading to one or more pieces of final secret keys (each having a size of $\ell$); otherwise, the post processing will not start.

That is, if $N_c < N_b$, the post processing will not start. The value of $t_c$ is assigned to $t_d$, and a certain number of signals are added into the "buffer". Let $n_{x,\xi}$ be the number of X signals with the intensity $\xi$ in the "buffer". Then, the number of existing X-basis raw-key signals in the "buffer" (denoted as $n_x$, as mentioned), is the sum of all $n_{x,\xi}$ over all the intensities. Specifically, $n_{x,\xi}$ can be updated as follows:

$$n_{x,\xi} \leftarrow n_{x,\xi} + N_c\alpha_{x,\xi}, \quad (30)$$

$$\xi = \xi_1, \xi_2, \xi_3,$$

where $\alpha_{x,\xi}$ is the expected transmission rate of X signals with the intensity $\xi$, and can be obtained as follows:

$$\alpha_{x,\xi} = p_\xi p_x^2 p_{d_\xi}, \quad (31)$$

$$\xi = \xi_1, \xi_2, \xi_3.$$

Similarly, the number of Z signals with the intensity $\xi$ in the "buffer" (denoted as $n_{z,\xi}$), can be updated as follows:

$$n_{z,\xi} \leftarrow n_{z,\xi} + N_c\alpha_{z,\xi}, \quad (32)$$

$$\xi = \xi_1, \xi_2, \xi_3,$$

where $\alpha_{z,\xi}$ is the expected transmission rate of Z signals with the intensity $\xi$. It can be obtained as $$\alpha_{z,\xi} = p_\xi(1 - p_x)^2 p_{d_\xi}, \quad (33)$$

$$\xi = \xi_1, \xi_2, \xi_3.$$

The number of existing Z-basis raw-key signals in the "buffer" (denoted as $n_z$), is the sum of all $n_{z,\xi}$ over all the intensities. The two newly-added variables, $n_A$ (referring to the number of classical bits that need to be transmitted from Alice) and $n_B$ (referring to the number of classical bits that need to be transmitted from Bob), are updated as follows:

$$\begin{cases} n_A \leftarrow n_A + N_c\log_2 3 + N_c \\ n_B \leftarrow n_B + N_c \end{cases}. \quad (34)$$

With a standard fiber and practical settings for devices, the probability of having a bit error for the intensity $\xi$, $b_\xi$, is $$b_\xi = P_{dc} + e_{mis}(1 - e^{-\eta_{tr}\xi}) + \frac{p_{ap}r_\xi}{2}, \quad (35)$$

$$\xi = \xi_1, \xi_2, \xi_3,$$

where $e_{mis}$ is the rate of the error in the fiber, caused by natural noises or an adversary attack. The number of erroneous Z-basis bits for the intensity $\xi$, $n_{zr,\xi}$, can be updated as $$n_{zr,\xi} \leftarrow n_{zr,\xi} + N_c\alpha_{zr,\xi}, \quad (36)$$

$$\xi = \xi_1, \xi_2, \xi_3,$$

where $\alpha_{zr,\xi}$ is the expected transmission error rate in the Z basis with the intensity $\xi$. It can be obtained as follows:

$$\alpha_{zr,\xi} = p_\xi(1 - p_x)^2 b_\xi, \quad (37)$$

$$\xi = \xi_1, \xi_2, \xi_3.$$

After all the X, Z, $n_A$, $n_B$, and erroneous signals with all the intensities have been updated from (30)-(37), QKDS+ goes back to the "listening" mode. Note that $t_c$ continuously grows.

Referring to FOR-DO loop 620, while $N_c \geq N_b$:

In this case, the post-processing will start. Similarly, $n_{x,\xi}$, $n_{z,\xi}$, $n_A$, $n_B$, and $n_{zr,\xi}$ are updated as follows:

$$\begin{cases} n_{x,\xi} \leftarrow n_{x,\xi} + N_b\alpha_{x,\xi} \\ n_{z,\xi} \leftarrow n_{z,\xi} + N_b\alpha_{z,\xi} \\ n_A \leftarrow n_A + N_b\log_2 3 + N_b, \\ n_B \leftarrow n_B + N_b \\ n_{zr,\xi} \leftarrow n_{zr,\xi} + N_b\alpha_{zr,\xi} \end{cases} \quad (38)$$

$$\xi = \xi_1, \xi_2, \xi_3.$$

After each post processing is completed, a final secret key of size $\ell$ is established. Specifically, $\ell$ can be calculated at 635, FIG. 19, as follows:

$$\ell = \left\lfloor n_{x,0} + n_{x,1} - n_{x,1}h(\beta_x) - \gamma_{ec} - 6\log_2\frac{21}{\varepsilon_s} - \log_2\frac{2}{\varepsilon_c} \right\rfloor, \quad (39)$$

where $h(j)$ is the binary entropy function, i.e., $h(j) = -j \log_2 j - (1-j)\log_2(1-j)$. $n_{x,0}$, $n_{x,1}$, and $\beta_x$ are the number of vacuum X signals, the number of single-photon X signals, and the phase error rate of the single-photon X signals in the "buffer", respectively. $\varepsilon_c$ is the probability that the keys extracted by Alice and Bob are not identical, and $\varepsilon_s$ is the maximum failure probability, a user-defined value. $\gamma_{ec}$ specifies how much information is leaked during error correction, and can be expressed as $n_x \eta_{ec} h(\beta_x)$, where $\eta_{ec}$ is the efficiency of the error correction. The above parameters can be bounded. Basically, $n_{x,0}$ satisfies $$n_{x,0} \geq \lambda_0 \frac{\xi_2 n_{x,\xi_3}^- - \xi_3 n_{x,\xi_2}^+}{\xi_2 - \xi_3}, \tag{40}$$

where $\lambda_n$ is the probability of sending a n-photon signal, which follows a Poisson distribution as follows:

$$\lambda_n = \sum_{\xi \in \{\xi_1,\xi_2,\xi_3\}} e^{-\xi} \xi^n p_\xi / n!. \tag{41}$$

with $$n_{x,\xi}^\pm$$

is expressed as follows:

$$n_{x,\xi}^\pm = \frac{e^\xi}{p_\xi} \left( n_{x,\xi} \pm \sqrt{\frac{n_x}{2} \ln \frac{21}{\varepsilon_s}} \right), \xi = \xi_1, \xi_2, \xi_3. \tag{42}$$

In (39), $n_{x,1}$ satisfies $$n_{x,1} \geq \frac{\lambda_1 \xi_1 \left[ n_{x,\xi_2}^- - n_{x,\xi_3}^+ - \frac{\xi_2^2 - \xi_3^2}{\xi_1^2} \left( n_{x,\xi_1}^+ - \frac{n_{x,0}}{\lambda_0} \right) \right]}{\xi_1(\xi_2 - \xi_3) - \xi_2^2 + \xi_3^2}. \tag{43}$$

Similarly, the number of vacuum Z-basis signals in the "buffer", $n_{z,0}$, and the number of single-photon Z-basis signals in the "buffer", $n_{z,1}$, can also be obtained by using (40)-(43) with statistics from the basis Z.

In (39), $\beta_x$ satisfies $$\beta_x \leq \frac{\delta_{z,1}}{n_{z,1}} + g \left( \varepsilon_s, \frac{\delta_{z,1}}{n_{z,1}}, n_{z,1}, n_{x,1} \right), \tag{44}$$

where $$g(a, b, c, d) = \sqrt{\frac{(c+d)(1-b)b}{cd \log 2} \log_2 \left( \frac{c+d}{cd(1-b)b} \frac{441}{a^2} \right)}, \tag{45}$$

and $\delta_{z,1}$ is the number of bit errors of the single-photon Z-basis signals in the "buffer", and is expressed as $$\delta_{z,1} \leq \lambda_1 \frac{m_{z,\xi_2}^+ - m_{z,\xi_3}^-}{\xi_2 - \xi_3}, \tag{46}$$

where $$m_{z,\xi}^\pm = \frac{e^\xi}{p_\xi} \left( m_{z,\xi} \pm \sqrt{\frac{m_z}{2} \ln \frac{21}{\varepsilon_s}} \right), \xi = \xi_1, \xi_2, \xi_3, \tag{47}$$

and $m_z = \sum_{\xi \in \{\xi_1,\xi_2,\xi_3\}} m_{z,\xi}$. Here, $m_{z,\xi}$ is the number of erroneous events in the Z basis.

After the post-processing is completed, $n_A$ and $n_B$ can be updated at 640. FIG. 19 as follows:

$$\begin{cases} n_A \leftarrow n_A + \gamma_{ec} + \log_2 \frac{1}{\varepsilon_c} + \ell + n_x - 1 + n_z \\ n_B \leftarrow n_B + n_z \end{cases}. \tag{48}$$

The initial values of the parameters from (23)-(48) are shown in Table 2.

TABLE 2

| Initial values of the parameters in QKDS+ | | | | | |
|---|---|---|---|---|---|
| $\xi_1$ | $\xi_2$ | $\xi_3$ | $p_{\xi_1}$ | $p_{\xi_2}$ | $p_{\xi_3}$ |
| 0.4 | 0.1 | 0.007 | 1/3 | 1/3 | 1/3 |
| B | $p_x$ | $p_{dc}$ | $\varepsilon_c$ | $\eta_{Bob}$ | $e_{mis}$ |
| 7 | 0.8 | $6 \times 10^{-7}$ | $10^{-11}$ | 0.1 | $5 \times 10^{-4}$ |
| $t_d$ (s) | $\eta_{ec}$ | $p_{ap}$ | $\varepsilon_s$ | L (km) | $v_q$ (bit/s) |
| | 1.16 | $4 \times 10^{-2}$ | $10^{-11}$ | 5 | $4 \times 10^7$ |
| $n_{x,\xi}$ | $n_{z,\xi}$ | $n_{zr,\xi}$ | $n_A$ | $n_B$ | |
| 0 | 0 | 0 | 0 | | |

SDN-Enabled Real-Time Testing Environment

In a further embodiment, there is provided a QKD- and SDN-enabled microgrid testbed using RTDS, QKDS+, and real SDN switches. Unlike other power system testbeds, this system has its unique feature, i.e., the quantum key generation and key consumption are integrated in a microgrid context where the generation speed is determined by a complete QKD algorithm and the consumption speed is affected by the real data transmission managed by the SDN controller over real SDN switches. This design presents a realistic cyber-physical test environment incorporating both SDN and QKD features.

Figure 20:
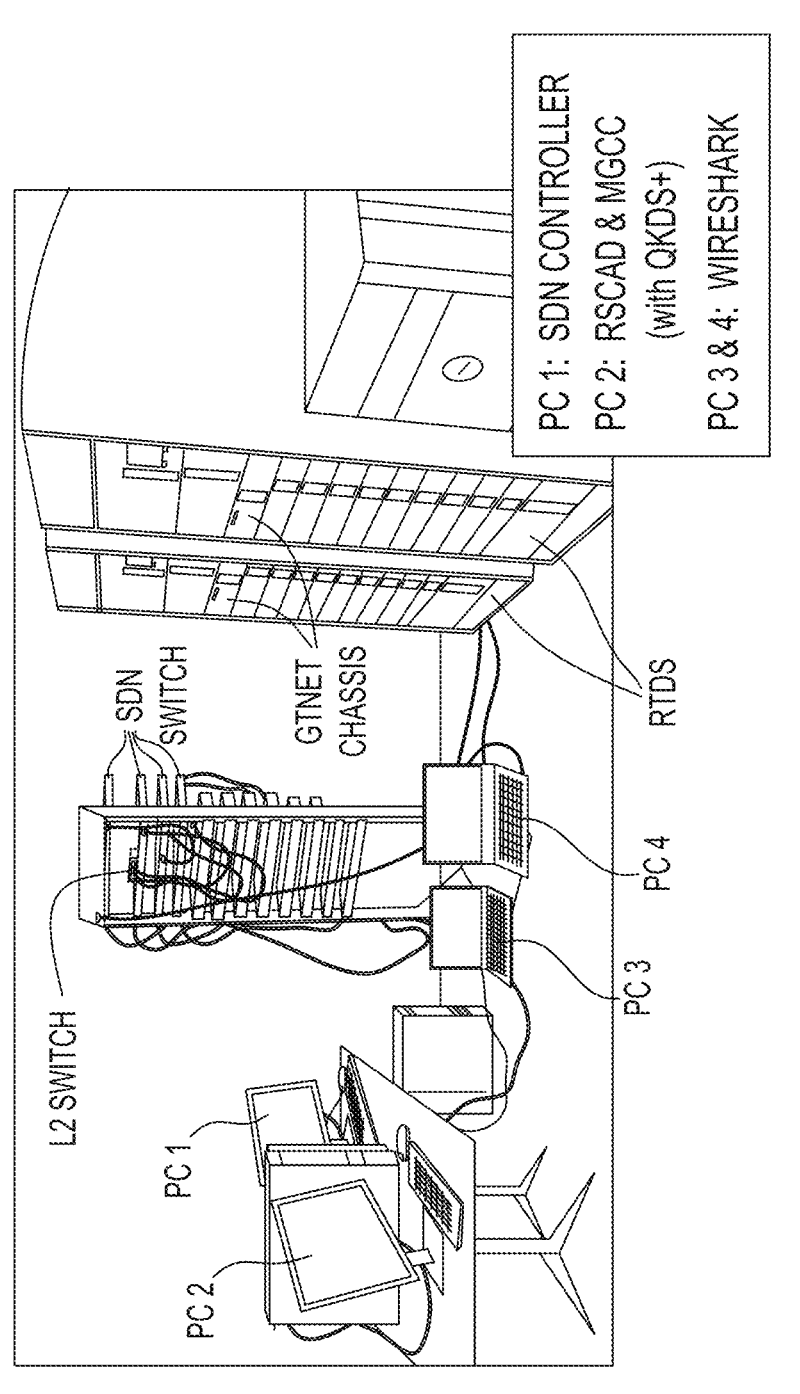
FIG. 20 depicts a further QKD- and SDN-enabled microgrid real-time test environment according to an embodiment.

A further QKD- and SDN-enabled microgrid real-time test environment is shown in FIG. 20 consisting of four computers (PCs), a traditional L2 switch, four Pica8 SDN switches, GTNET×2 cards, and the RTDS hardware. PC 1, which is connected to four SDN switches using Ethernet cables and a traditional switch, functions as the SDN controller. PC 2 is used to not only serve as the microgrid control center (MGCC), but also run the RSCAD, namely the software used to compile the microgrid model and send the model to the RTDS hardware for real-time simulation. The GTNET×2 cards, installed within the GTNET chassis, can either transfer data from the RTDS to external devices, or in a reverse way.

Figure 21:
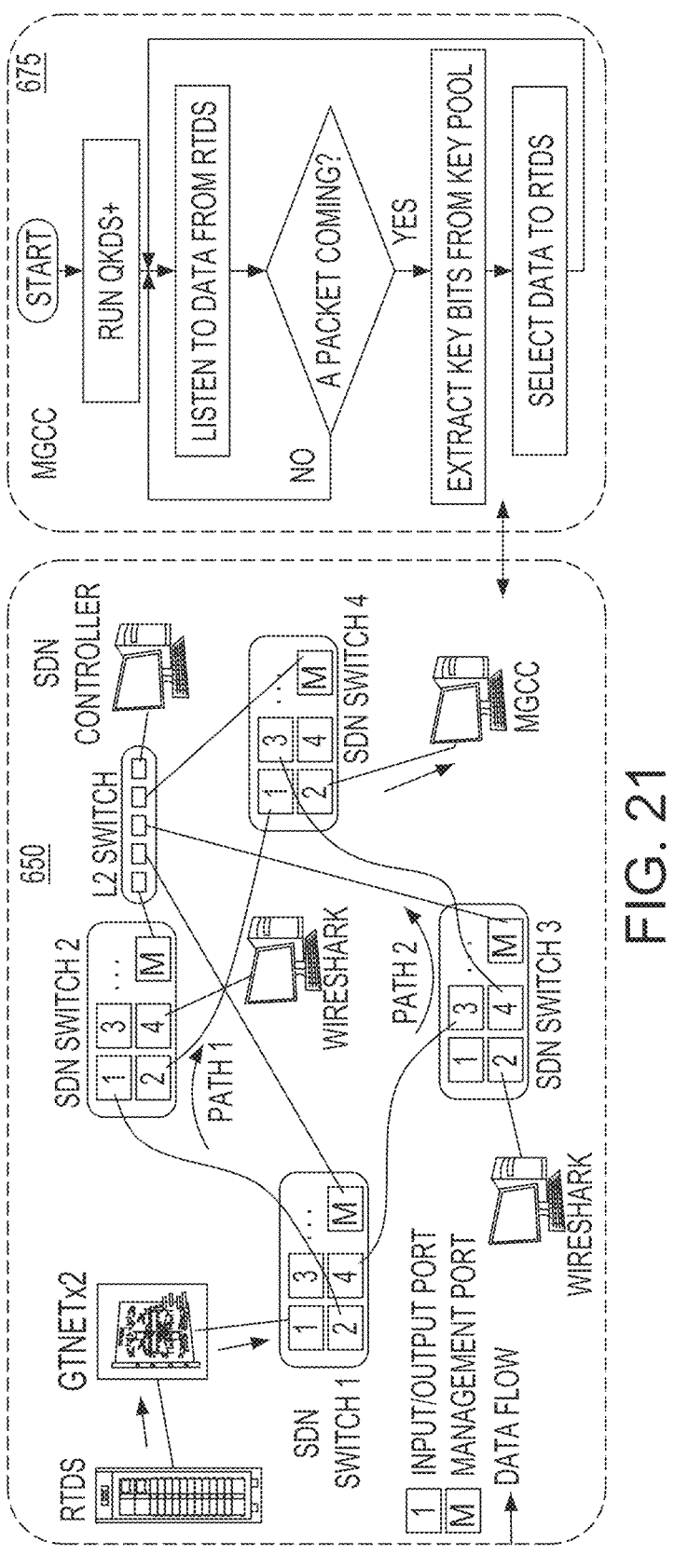
FIG. 21 depicts a hardware connection and the flow chart in the microgrid control center (MGCC) of FIG. 20.

FIG. 21 depicts a hardware connection 650 and an accompanying flow chart 650 depict the MGCC processing logic. As shown in FIG. 21, two data paths are created with four Pica8 SDN switches. For Path 1, each packet goes from Switch 1, through Switch 2, to Switch 4. For Path 2, each packet flows from Switch 1, through Switch 3, to Switch 4. For each SDN switch, the control logic is developed separately using the field "datapath.id" (as each SDN switch has a unique dpid). To find the dpid of an SDN switch, the following command can be applied via Putty: "ovs-ofctl show br0". Two PCs (i.e., PCs 3 and 4 in FIG. 20) with Wireshark installed are used to capture the traffic flowing through the two paths, respectively. The following command can be utilized to add two flows in an SDN switch from Port 1 to Ports 2 and 4: "ovs-ofctl add-flow br0 in_port=port1, actions=port2, port4". To verify the flows are correctly added, the following command can be utilized: "ovs-ofctl dump-flows br0".

Figures 22, 23A, 23B:
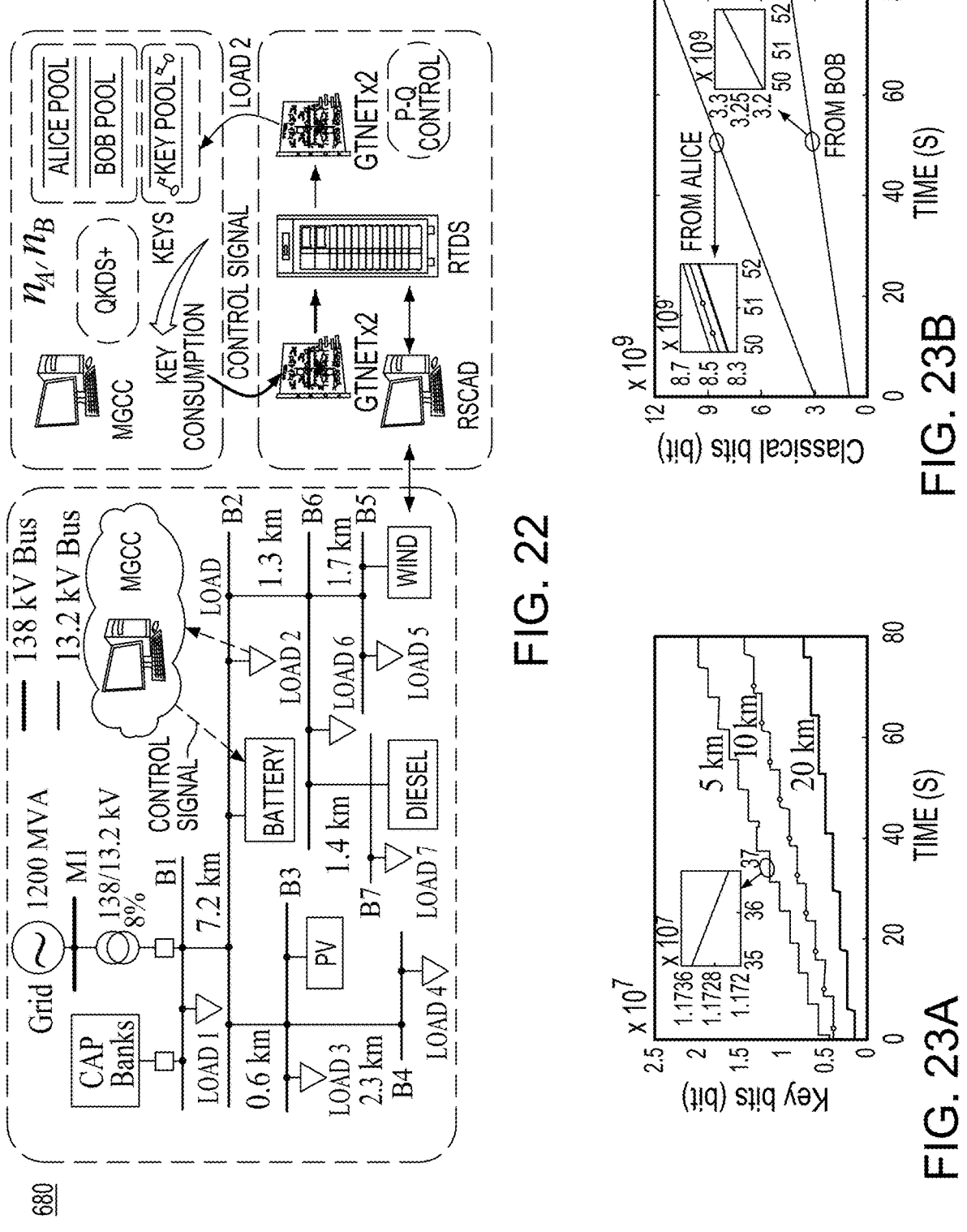
FIG. 22 shows a further embodiment of a microgrid model utilized in an embodiment.
FIG. 23A shows the QKD performance with different fiber lengths and the number of key bits.
FIG. 23B shows the QKD performance with different fiber lengths and the numbers of classical bits generated from Alice and Bob.

FIG. 22 shows a further embodiment of a microgrid model 680 utilized in an embodiment. Microgrid model 680 contains a 1.74 MVA photovoltaic (PV) system, a 5.5 MVA diesel generator, a 2 MW doubly-fed induction generator wind turbine system, a battery, and 7 power loads at different buses. A P-Q controller is designed to regulate the output power of the battery, the value of which is determined by the real and reactive power references transmitted from the MGCC.

Referring back to FIG. 21, the method 675 implemented as the MGCC works as follows: The QKDS+ quantum key distribution method continuously generates key bits and stores them into a key pool. Meanwhile, it listens to the data packets sent from the RTDS. When a packet is received, it consumes a certain number of key bits in the key pool, and then sends corresponding control signals to the RTDS.

For the microgrid model and hardware connection of the testbed depicted in FIG. 22, experimental results are provided including: 1) test on QKD, 2) test on dynamic routing, 3) test on rate limitation, and 4) test on firewall implementation.

Case 1: Test on QKD

The QKD performance is evaluated with this testbed. Specifically, a time-varying load with a magnitude of 2 MW and a frequency of 0.05 Hz is added to Load 2 to model the dynamic characteristics of loads. The value of the varying Load 2 is continuously sent from the RTDS to the MGCC through a GTNET×2 card and the SDN network, with a frequency of 80 packets/s.

When the MGCC receives each packet from the RTDS, it forwards the value of the received data, which functions as the updated real power reference, to the Battery's P-Q controller. The value of the reactive power reference is kept at 0. Meanwhile, the MGCC consumes 64 bits from the key pool for modeling the encryption process. Note that key bits are continuously generated by QKDS+, and are stored into a key pool. In this case, for the QKDS+, the fiber length L is set at 5 km, 10 km, and 20 km, respectively. Other parameters are the same as given in Table 2.

The number of key bits in the key pool and the numbers of classical bits generated from Alice and Bob are illustrated in FIG. 23. It can be observed that: With a fixed QKD configuration, at regular intervals, a given number of key bits are generated by QKDS+; meanwhile, key bits are continuously consumed in the key pool (see FIG. 23A which depicts: QKD performance with different fiber lengths and the number of key bits). A larger fiber length leads to a lower key generation speed (see FIG. 23A), which is reasonable due to the higher loss in the quantum channel. For a single QKD system, a great number of classical bits are generated from Alice and Bob (see FIG. 23B which depicts: QKD performance with different fiber lengths and the numbers of classical bits generated from Alice and Bob), which inevitably makes the traffic more crowded. The number of classical bits generated from Alice is more than twice as large as that from Bob (see FIG. 23B); and changing the fiber length only has a little impact on the numbers of classical bits required from Alice and Bob, and its impact on Alice is slightly larger than that on Bob.

Case 2: Test on Dynamic Routing

A dynamic routing function has been implemented in this case. With the dynamic routing, when one classical data path is under attack, has a failure, or is too crowded, another path can be used in real time, which enhances the resilience of the QKD-enabled microgrids. Specifically, in this case, the initial system configuration is the same with that in FIG. 23A with the 20 km fiber length used. At around time t=43 s, another type of packet with a specific source MAC address is sent from the RTDS to SDN Switch 1 (this is achieved by using another GTNET×2 card), which then forwards the packet to the SDN controller. The SDN controller, based on the control rules developed, removes the existing flows for Path 1 and adds new ones for Path 2 (see FIG. 21 for Paths 1 and 2).

FIGS. 24A and 24B illustrate the test results. Two computers with Wireshark installed (see FIGS. 14 and 20) are used to capture packets on the two paths. It can be seen that, the dynamic routing has been successfully achieved (see FIG. 24B), while the key consumption process (reflecting the normal data transmission) is not affected (see FIG. 24A), i.e., the slope of the line 700 in FIG. 24A remains the same from 42 s to 44 s.

Case 3: Test on Rate Limitation

Unlike a traditional switch, the Pica8 SDN switch is capable of flexibly configuring the rate limitation function by applying the following command: "ovs-vsctl set interface port ingress_policing_rate=value". In this test case, the rate threshold for Port 1 of Pica8 Switch 1 is set at 50 kbps. To demonstrate the effect of rate limitation, the frequency of data transmission from the RTDS to the MGCC is set at a time-varying sinusoidal value with a magnitude of 100 packets/s and a frequency of 0.1 Hz. Other parameters are the same with those in FIGS. 24A, 24B.

FIGS. 25A, 25B give the test results of rate limitation with number of stored key bits under rate limitation (FIG. 25A), and the traffic captured with and without rate limitation (FIG. 25B). It can be observed that:

When the rate of traffic is below the limitation threshold (e.g., from 26 s to 28 s; see the line 710 in FIG. 25B, the number of key bits in the key pool is sinusoidal (see the line 715 in FIG. 25A from 26 s to 28 s), which is reasonable, as the frequency of data transmission from the RTDS to the MGCC is set at sinusoidal.

However, when the rate of traffic is above the limitation threshold (e.g., from 32 s to 34 s; see the line 720 in FIG. 25B), the speed of key consumption becomes almost constant (see the line 725 in FIG. 25A from 32 s to 34 s).

Case 4: Test on Firewall Implementation

In the case of implementing firewalls using SDN switches, two subcases are created: In the first subcase, the Pica8 switches are configured as traditional switches, with no firewalls installed. In the second subcase, only those packets with particular source and destination MAC addresses are allowed to flow through Pica8 switches. This is achieved by using the "match" field when adding flows. In both subcases, the MGCC sends control signals to the RTDS whenever a packet is received; meanwhile, another computer, which models the attacker and is connected to Pica8 Switch 4, keeps sending fake control signals (i.e., zero real power reference for the Battery) to the RTDS (with a frequency of 100 packets/s). Other configurations are the same with those in FIG. 24.

Figures 26A, 26B:
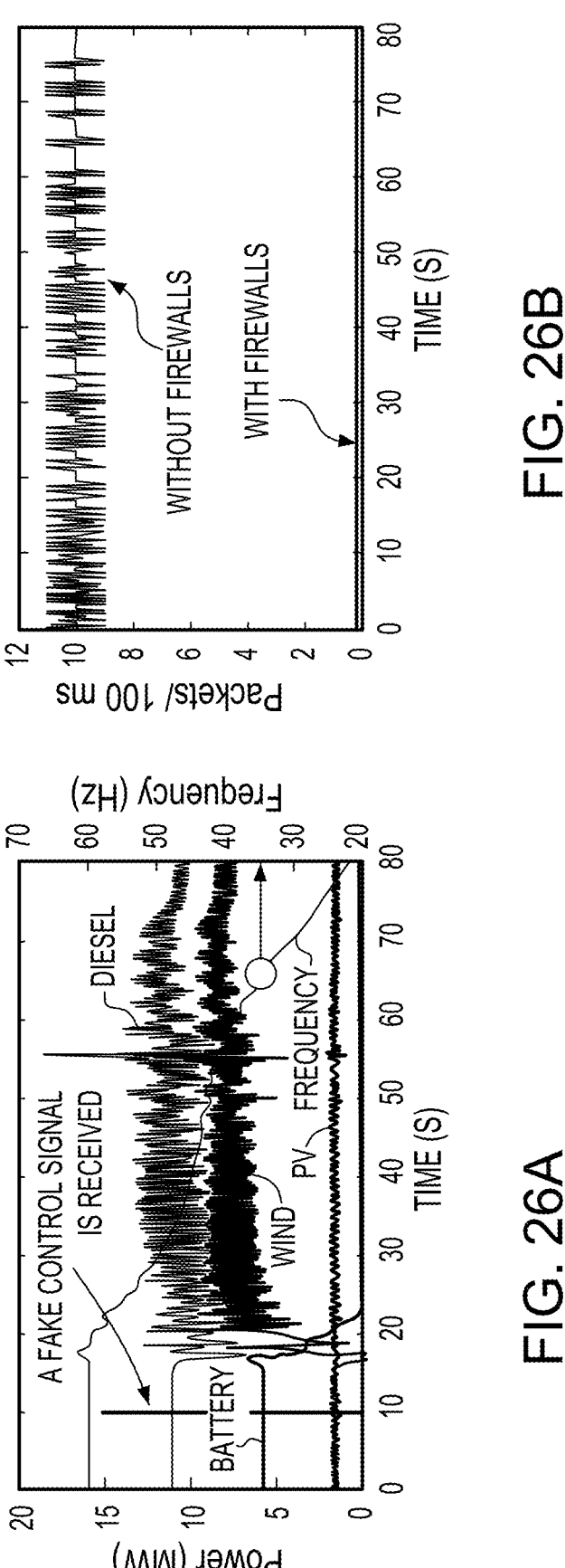
FIG. 26B depicts the traffic (from the attacker's IP address) captured with and without firewalls.

FIG. 26A shows the system's performance before and after a fake control signal is received. It can be observed that the system collapses in around 7 seconds. However, as shown in FIG. 26B, when firewalls are installed inside the SDN switches, no packets with source MAC addresses other than the allowed ones can flow through SDN switches.

An embodiment addresses the technical challenges impeding a wide adoption of QKD in power grids. One critical issue is the distance limitation, i.e., the key rate of QKD is reduced exponentially with the increase of the distance between two parties, which is especially undesirable in a large-scale power grid with high frequencies of data transmission. Another is that QKD is limited to point-to-point communications, which results in that, in a power grid with intensive communicating devices, the choice of using QKD merely becomes impractical.

To overcome these limitations, an efficient way is to establish a quantum network. By interconnecting a number of quantum devices, a quantum network not only extends the communication distance greatly, but also provides a more flexible environment for plug-and-play communicating devices, maximally utilizing quantum resources. However, the topic of developing quantum networks is still silent in the community of power grids, and there are challenges. For instance, continuous data transmission in power grids makes key consumption in power grids faster than that in many other applications such as online banking. Therefore, while keys are sufficient in many other applications, it is easier to exhaust keys in power grids. In addition, a power grid has a dynamic environment, where the data transmission frequency can change dynamically, resulting in a variable key consumption rate. Without a quantum network-integrated power grid testbed, it is difficult to determine whether a certain topology and a certain configuration of a quantum network will meet the data transmission requirements in a dynamic power grid. Moreover, the distance between two communicating parties in power grids can be larger than the limits of existing QKD protocols. Noise levels on different quantum channels in a power grid can also be different and dynamically changing. Further, the placement of multiple communicating DERs can affect system performance and also needs to be investigated.

Thus, in a further embodiment, there is established a quantum network-based power grid (QNetGrid) framework and a real-time, reliable, flexible, programmable, and cost-effective QNetGrid software testbed that contains repeater-based quantum communication, quantum routing, real software-defined networking (SDN) switches, and real-time NMGs operations. In particular, a quantum repeater and routing based quantum network simulator (QNSim) is established that can not only simulate the number of generated key bits and the routing process, but also interact with any real-time power grid simulator. Unlike other existing quantum network simulators that either do not support real-time simulation, fail to work for large-scale quantum networks, lack flexibility for multi-party communications, do not support routing, or are too complicated to implement, QNSim is easy to implement, allows for real-time simulation, is flexible to alter network parameters, and is easily extensible for different network topologies, protocols, numbers of repeaters, distances between neighboring nodes, and routing strategies. With both NMGs and quantum network features incorporated, the QNetGrid testbed provides a unique test environment for various quantum network research in NMGs. Specifically, there is provided:

A quantum repeater and routing based quantum network simulator, QNSim, is developed. QNSim can not only simulate the number of generated key bits and the routing process, but also interact with any real-time power grid simulator. It is easy to implement, allows for real-time simulation, is flexible to alter network parameters, and is easily extensible for different network topologies, protocols, numbers of repeaters, distances between neighboring nodes, and routing strategies.

Quantum repeaters with and without quantum memories are respectively simulated in QNSim, providing a great example to show that QNSim can be easily modified for different protocols. The quantum network performances with the two types of repeaters are compared using the QNetGrid testbed, and valuable insights are obtained.

Different routing scenarios are investigated, such as with different DER routing sequences, node priorities, and DER locations. This shows the critical importance of the QNet-Grid testbed, i.e., evaluating the system performance under different scenarios with great flexibility and providing valuable guidelines before constructing real quantum networks in power grids in practice.

A real-time QNetGrid testbed is built in RTDS. Details including NMGs modeling and operations, control strategies, and integration of QNSim, RTDS hardware, and real SDN switches are described. QNetGrid presents a practical application of quantum networking in NMGs, and the QNet-Grid testbed can be utilized as a benchmark for various quantum network research in NMGs.

Various test cases are designed, and the experimental results produced with the QNetGrid testbed provide valuable insights to build quantum networks in power grids.

Quantum Repeater-Based Communication

Distributing quantum resources over a long distance is a challenging task due to the transmission loss in the quantum channel, e.g., an optical fiber. The classical way of using amplifiers to boost signals will destroy signals' quantum property due to the no-cloning theorem. A quantum approach to overcome this challenge is to use quantum repeaters. 1) Qubits: A qubit is a bit with quantum properties. Unlike a classical bit that is either zero or one, a qubit can be in the superposition of both zero and one. Before measuring a qubit, its state is uncertain; after it is measured, the quantum property of the qubit is destroyed, meaning that the qubit becomes a classical bit. In other words, a qubit can be measured only once. Mathematically, a qubit state ($|\varphi\rangle$) can be represented as follows:

$$|\varphi\rangle = \alpha|0\rangle + \beta|1\rangle$$

where $|0\rangle$ and $|1\rangle$ represent the two bases of quantum states, and $\alpha$ and $\beta$ are probability amplitudes (they can be complex numbers) with property $|\alpha|^2+|\beta|^2=1$.

Entanglement

Quantum entanglement is a physical phenomenon in which a group of qubits shares correlations. For instance, if two qubits are entangled, each qubit state is uncertain until it is measured; however, once one qubit state is determined, the other qubit state will also be determined.

BSM

Bell states are four specific maximally-entangled quantum states of two qubits. Suppose that there are two entangled qubits, A and B. The following four quantum states ($|\Phi^+\rangle$, $|\Phi^-\rangle$, $|\Psi^+\rangle$ and $|\Psi^-\rangle$) are four Bell states:

$$\begin{cases} |\Phi^+\rangle = \frac{1}{\sqrt{2}}(|0\rangle_A \otimes |0\rangle_B + |1\rangle_A \otimes |1\rangle_B) \\ |\Phi^-\rangle = \frac{1}{\sqrt{2}}(|0\rangle_A \otimes |0\rangle_B - |1\rangle_A \otimes |1\rangle_B) \\ |\Psi^+\rangle = \frac{1}{\sqrt{2}}(|0\rangle_A \otimes |1\rangle_B + |1\rangle_A \otimes |0\rangle_B) \\ |\Psi^-\rangle = \frac{1}{\sqrt{2}}(|0\rangle_A \otimes |1\rangle_B - |1\rangle_A \otimes |0\rangle_B) \end{cases},$$

where $|0\rangle_A$ and $|1\rangle_A$ are two basis states for qubit A, $|0\rangle_B$ and $|1\rangle_B$ are two basis states for qubit B, and $\otimes$ denotes the tensor product. BSM (Bell State Measurement) is a two-qubit measurement that determines which Bell state among the four the two qubits are in.

Quantum Repeaters

Figure 27A:
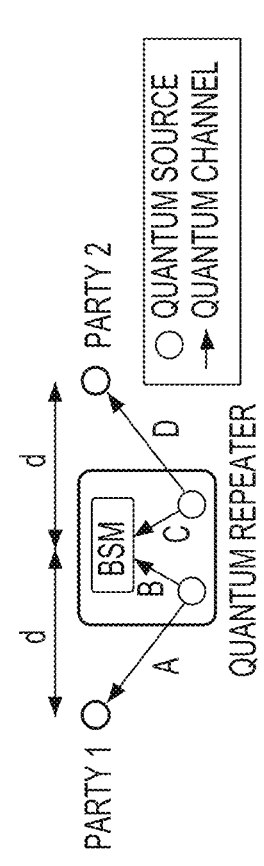
FIG. 27A depicts a quantum repeater-based communication and in particular, a quantum repeater.
Figure 27B:
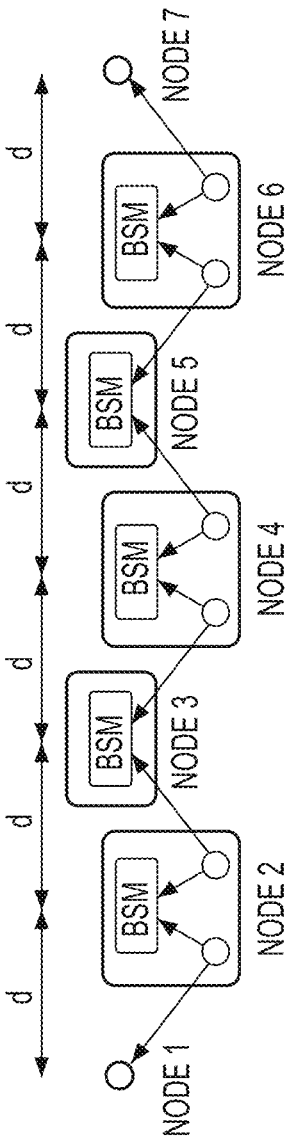
FIG. 27B depicts a quantum repeater chain.

FIG. 27A depicts a quantum repeater-based communication and in particular, a quantum repeater; FIG. 27B depicts a quantum repeater chain. In FIGS. 27A, 27B, a node is a quantum repeater (including a node with only the measurement capability) or a communicating party. The distance between two quantum nodes is indicated as "d".

A quantum repeater consists of two sources (each generates two entangled qubits) and a BSM device. As illustrated in FIG. 27A, qubits A and D are sent to two communicating parties, respectively, and qubits B and C are sent to the BSM device. If the measurement of qubits B and C succeeds, qubits A and D will be entangled together. In this way, the two communicating parties, which are separated in a distance larger than the one reached using a single source, have shared two entangled qubits. If multiple repeaters are used that form a chain of repeaters, the distance between two communicating parties can be further extended (see FIG. 27B).

Entanglement Swapping

A single repeater works is demonstrated and can be generalized similarly to multiple repeaters. In this instance, one party, commonly named Alice, and the repeater share a Bell state of the form $$\phi_0 = \frac{1}{\sqrt{2}}(00 + 11);$$

similarly, the repeater and the other party, commonly named Bob, share a Bell state in the same form. The goal of the repeater is to perform a Bell swap, thus creating an entangled state between Alice and Bob, while leaving the repeater unentangled from the final system (and thus the repeater cannot learn any subsequent information that Alice and Bob may derive from their established shared state). For notation, the four Bell states are denoted as as $$\phi_0 = \frac{1}{\sqrt{2}}(00 + 11), \phi_1 = \frac{1}{\sqrt{2}}(00 - 11),$$

$$\phi_2 = \frac{1}{\sqrt{2}}(01 + 10), \text{ and } \phi_3 = \frac{1}{\sqrt{2}}(01 - 10).$$

The joint state shared among all three parties is then:

$$\frac{1}{2}\left(00_{AR_1} + 11_{AR_1}\right) \otimes \left(00_{R_2B} + 11_{R_2B}\right) = \frac{1}{2}(0000 + 0011 + 1100 + 1111) =$$

$$\frac{1}{2\sqrt{2}}(0(\phi_0 + \phi_1)0 + 0(\phi_2 + \phi_3)1 + 1(\phi_2 - \phi_3)0 + 1(\phi_0 - \phi_1)1) \cong$$

$$\frac{1}{2}\sum_{i=0}^{3} \phi_{i_{R_1R_2}} \otimes \phi_{i_{AB}}.$$

Here, $R_1$ and $R_2$ are used to denote the two qubits that the repeater node holds, and, in the last line, the subspaces are permuted for clarity, putting the repeater's qubits in the two registers left most and Alice and Bob's qubits right most. Note that above no operation was performed; this is simply the joint state of the system following the establishment of entanglement between Alice and the repeater (register $R_1$), and the repeater (register $R_2$) and Bob. From this, the repeater will measure its $R_1R_2$ system in the Bell basis resulting in outcome $\phi_i$ with probability $\frac{1}{4}$ (that is, the repeater will see one of the four Bell states with equal probability). Following this, Alice and Bob's qubits collapse to the state $\phi_i$. The repeater will then broadcast to Alice and Bob its measurement outcome, allowing Bob to perform a local operation (either a bit flip or a phase flip, or both) to "correct" their shared joint state to the desired Bell state $\phi_0$. Importantly, the repeater is unentangled with Alice and Bob at this point. Furthermore, any deviation from the protocol (e.g., if the repeater is corrupted by an adversary) can be detected by Alice and Bob as their resulting state will not be a pure Bell state and so will create detectable noise in the subsequent Z or X basis measurements performed by the QKD protocol.

The E91 QKD protocol is one of the important applications of quantum entanglement. It allows two remote parties, Alice and Bob, to establish a secret key using the shared quantum entanglement. Its basic idea is as follows:

Step 1: A series of pairs of entangled qubits is distributed to Alice and Bob, respectively. Photons are commonly used to implement qubits, and the polarization of each photon is utilized to encode a quantum state. Specifically, two polarizations, namely the diagonal polarization (denoted as the basis X) and the horizontal polarization (denoted as the basis Z) are considered.

Step 2: For each pair, Alice and Bob independently randomly (with a certain probability) select a basis from X and Z to measure the received qubit, respectively. If the two parties select the same basis, the information will be transmitted deterministically; if different bases are selected, the measured results will be uncorrelated.

Step 3: Alice and Bob publicly announce their selected bases. They keep the measured results for which the same bases are used and publicly announce the rest of the measured results, which are then used to detect the occurrence of a potential adversary.

Step 4: Post-processing procedures, including error correction and privacy amplification, are performed on an authenticated classical channel, producing a secret key with information-theoretic security.

While there has been recent research in establishing quantum communication to secure data transmission in power grids, most related efforts focus on QKD. However, in a power grid with intensive communicating devices, a quantum repeater and routing based quantum network, with which communicating devices can be flexibly plug-and play in the network, is more required. While existing quantum network simulators either do not support real-time simulation, fail to work for large-scale quantum networks, lack flexibility for multi-party communications, do not support routing, or are too complicated to implement, integrating these simulators into a real-time power system simulator may or may not be applicable and proper designs and analyzes must be performed.

Thus, in a further aspect, there is provided a repeater and routing based quantum network simulator, QNSim, that is easy to implement, allows for real-time simulation, is flexible to alter network parameters, and is easily extensible for different network topologies, protocols, numbers of repeaters, distances between neighboring nodes, and routing strategies.

QNetGrid Modeling

Figure 28:
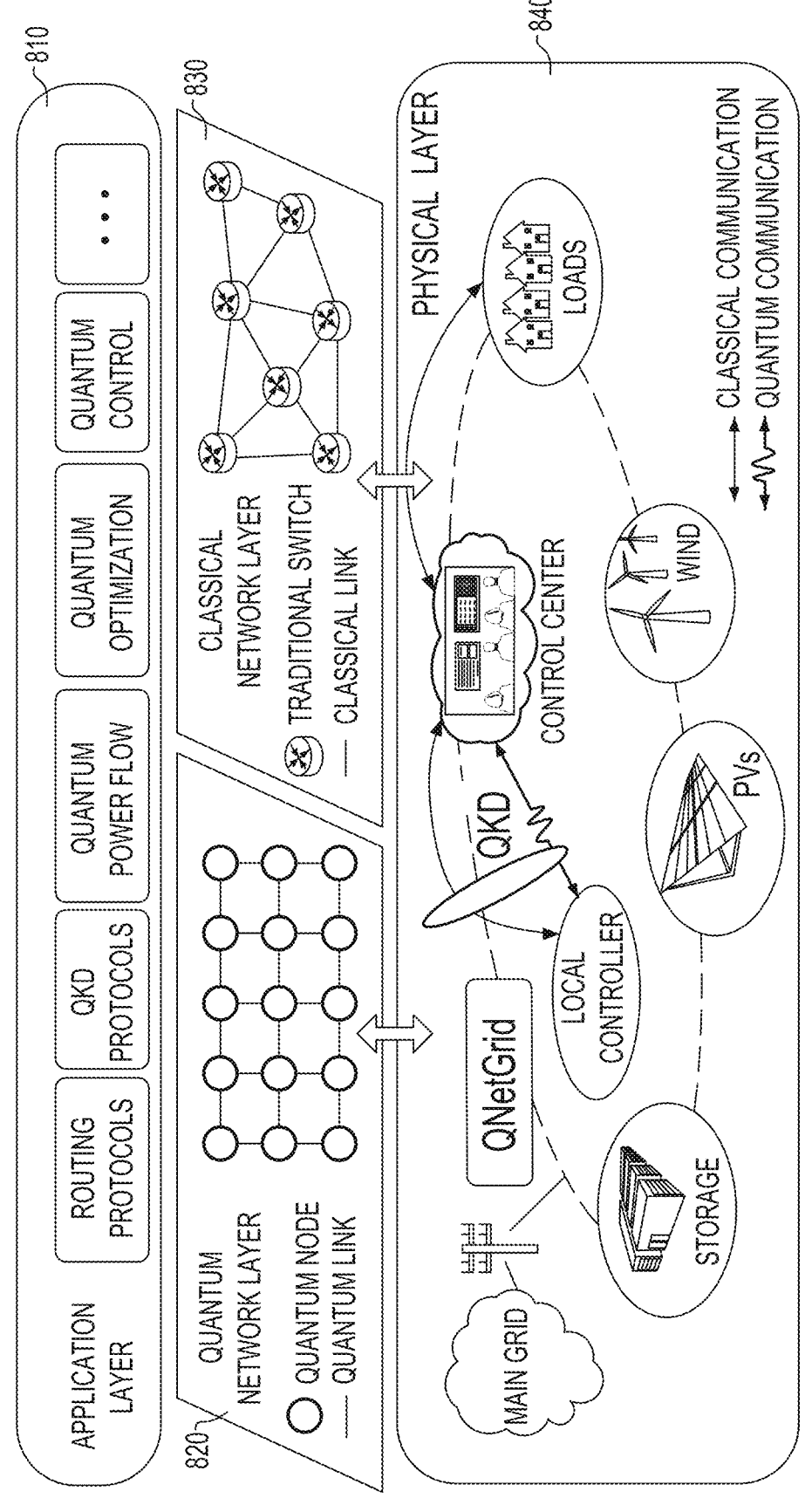
FIG. 28 illustrates a QNetGrid architecture according to an embodiment.

FIG. 28 illustrates a QNetGrid architecture 800. Architecture 800 consists of four layers, namely an application layer 810, a quantum network layer 820, a classical network layer 830, and a physical layer 840. In the physical layer, a control center, which is coordinating the whole system, can communicate with certain DERs where secret keys are generated through the quantum network.

Letting $N_d$ denote the number of DERs (or any grid components) that need to communicate with the control center through the quantum network, then, each DER (i.e., $DER_i$, where i=1,2, ..., $N_d$) shares a separate key pool (i.e., $KP_i$) with the control center, where the keys are stored and, when necessary, extracted. For the quantum network, there is considered a grid topology consisting of N×N nodes, each connected to its neighboring nodes, as exemplified in FIGS. 29A, 29B. In particular, an example of QNetGrid quantum network in FIG. 29A depicts a quantum network of a 5×5 grid with FIG. 29B depicting a quantum link connecting two quantum nodes and the intra-node entanglement; and FIG. 29C depicting the installing of more links around the control center. Considering an N×N grid with uniform distances is a useful first step in analyzing the potential benefits of quantum networks for microgrids and also in discovering how to appropriately operate it (e.g, what routing protocols to use). In general quantum Internet research, grid topologies with uniform distances are often the first considered in order to develop the framework needed to successfully operate the system, and so this approach is kept here, as this is the first time quantum networks of this type have been applied to microgrid scenarios.

Specifically, each node can be a user (i.e., the control center or a communicating DER), or a quantum repeater (including a node with only the measurement capability). To generate keys for $KP_i$, the control center and $DER_i$ first select a path through a series of nodes and then perform the E91 QKD protocol using intermediate nodes on the path. Let $n_i$ denote the total number of nodes (including the control center and $DER_i$) in the established path for $DER_i$ and the control center. Different route schedules can result in different values of $n_i$s (here, $n_i$s refers to the whole group of $n_1$, $n_2$, . . . , and $n_{N_d}$), leading to different QNetGrid performance. The hardware requirements for experimentally implementing a quantum network depend on the implementation and typically include new sources, detector devices, fiber channels, and quantum repeaters. Note that a classical network is still needed, both for quantum post-processing and classical data transmission.

The QNSim

FIG. 30 depicts a QNSim algorithm 900 according to an embodiment that consists of two parts: an iterative part 902 for determining the values of $n_i$s and an iterative part 910 for calculating the number of key bits generated at any time for each key pool. Specifically, a certain routing protocol is first utilized to determine the path between each communicating DER and the control center. If a path is found, the total number of nodes on that path, namely the value of $n_i$, will be determined at 907. If a DER cannot find a route to the control center, it will not establish the quantum key generation, meaning that keys will not be generated and added to the key pool. The routing in a quantum network normally only permits that one quantum link is used for one QKD system at each moment. Thus, the routing algorithm in QNSim is designed in a way that once a quantum link between two nodes is used by one DER, it is removed for other DERs. The value of $n_i$ is determined one by one from $DER_1$ to $DER_{N_d}$.

After determining the values of all $n_i$ s, the simulator enters the "listening" mode. When secret keys are required to secure communication between $DER_i$ and the control center, the simulator checks if there are enough keys in $KP_i$. If so, a certain number of key bits will be consumed from $KP_i$, and the corresponding control signals will be sent from the control center to the RTDS. If not, the keys will not be consumed and the control signals will not be sent.

Meanwhile, key bits are continuously generated and stored in each key pool. For a discrete-variable QKD protocol such as the E91, key bits of a given length are generated over a certain time period. Let $t_c$ be the current time and $t_{p,i}$ be the last calling time for $KP_i$. Then, within the time interval, $t_c - t_{p,i}$, the number of qubits that have been sent from the source to $DER_i$, $N_{t,i}$, can be calculated at 912 as follows:

$$N_{t,i} = v_s(t_c - t_{p,i}), \tag{49}$$

where $v_s$ is the average speed of the source sending qubits, i.e., $4×10^6$ bits/s in an example. This framework at the single-qubit level for quantum networks is applied to power grids. While $4×10^6$ bits/s are used in the example evaluations, other speeds may be evaluated using a general-purpose simulator and will cause the key generation rate to scale proportionally.

In the E91 QKD protocol, two communicating parties independently randomly select a basis from X and Z to measure each received qubit. It is assumed each receiver has a single photon detector capable of distinguishing the four BB84 states. It is also assumed that these detectors can fail with a certain probability, which is simply characterized with a single parameter $p_{b,i}$ (in Eq. (51)). The dark count and efficiency of the detector can be absorbed into this parameter (these are not parameterized separately). For each measurement, if both parties select the same basis, the measured result will be kept; if they select different bases, the result will be discarded. Among the retained results, those measured with the X basis are used to distill final secret keys, and those with the Z basis are utilized for error correction purposes.

The two communicating parties, i.e., the control center and $DER_i$, temporarily store the results measured with the X basis in an X-basis "buffer", and store the results measured with the Z basis in a Z-basis "buffer". Let $n_{x,i}$ be the number of X-basis signals already in the X-basis buffer, and $n_{z,i}$ be the number of Z-basis signals already in the Z-basis buffer.

For $DER_i$ and the control center, when a sufficient number (denoted as $B_i$) of X-basis signals have been stored in the X-basis buffer, post-processing procedures will start. Note that $B_i$ is set by users. Let $N_{r,i}$ be the number of qubits that need to be sent to $DER_i$ before post-processing can start. Then, as computed at 915, FIG. 30, $$N_{r,i} = \frac{B_i - n_{x,i}}{R_{x,i}},\qquad(50)$$

where $R_{x,i}$ is the expected transmission rate of the X signals for $KP_i$, i.e., the ratio of the number of signals (for which both parties selected the basis X) and the number of signals actually sent.

Case 1: With Memoryless Quantum Repeaters

When all quantum repeaters have no memory, for a signal to contribute to the final secret key, both parties should choose the basis X, the photon should be transmitted through the channel successfully, and all repeaters should successfully perform the bell measurement. Specifically, $R_{x,i}$ can be obtained as follows:

$$R_{x,i} = p_x^2 \eta_{t,i} p_{b,i},\qquad(51)$$

where $p_x$ is the probability that the X basis is selected (therefore, the probability that the Z basis is selected is $1-p_x$). In an example embodiment, $p_x$ is set at 0.8. Note that it is not necessary to make the selection of both bases equally probable. Basically, the exact bias does not affect the security as long as the bases are randomly selected and there are enough signals. Meanwhile, adding a bias can improve the efficiency of the QKD system, and its value is something to optimize over—the values chosen were a decent 'rule of thumb', but there may be more optimal values. In particular, different choices of bias can only change the simulated results obtained. $\eta_{t,i}$ is the total transmittance in the repeater chain for $KP_i$, and is related to the length of each quantum link, L, and the number of quantum links in the path, $n_i-1$, as follows:

$$\eta_{t,i} = 10^{-0.2L(\eta_i-1)/10},\qquad(52)$$

where an attenuation coefficient of 0.2 dB/km is assumed for fibers. $p_{b,i}$ is the total probability that BSM is successful in the repeater chain for $KP_i$. As there are $(n_i-2)$ repeaters on the path, $p_{b,i}$ can be expressed as follows:

$$p_{b,i} = p_r^{n_i-2},\qquad(53)$$

where $p_r$ is the probability that a quantum repeater will succeed, representing the quality of the repeater. To be specific, if $p_r$ is set to one, the repeater is assumed to be perfect, and if $p_r$ is less than one, the repeater is non-ideal.

After $N_{t,i}$ and $N_{r,i}$ are calculated from equations (49)-(53), they are compared with each other. If $N_{t,i}$ is smaller than $N_{r,i}$, the number of X signals stored in the X-basis buffer will not be sufficient for post-processing to start. In this case, the value of $t_c$ will be assigned to $t_{p,i}$. Note that $t_c$ is continuously increasing. Meanwhile, a certain number of bits within the time interval $(t_c-t_{p,i})$ will be added to X-basis and Z-basis buffers. Specifically, $n_{x,i}$ and $n_{z,i}$ can be updated as $$\begin{cases} n_{x,i} \leftarrow n_{x,i} + N_{t,i}R_{x,i}, \\ n_{z,i} \leftarrow n_{z,i} + N_{t,i}R_{z,i} \end{cases},\qquad(54)$$

where $R_{z,i}$ is the expected transmission rate of Z signals for $KP_i$, and can be expressed as $$R_{z,i} = (1-p_x)^2 \eta_{t,i} p_{b,i}.\qquad(55)$$

When all the X and Z signals have been added, the simulator goes back to the "listening" mode. As mentioned above, $t_{p,i}$ becomes $t_c$, and $t_c$ grows continuously. However, if $N_{t,i}$ is greater than or equal to $N_{r,i}$, post-processing will start as indicated as processing 920, FIG. 30. The simulator will then add all the X and Z signals to $n_{x,i}$ and $n_{z,i}$, respectively. Specifically, $n_{x,i}$ and $n_{z,i}$ can be updated as follows:

$$\begin{cases} n_{x,i} \leftarrow n_{x,i} + N_{r,i}R_{x,i} \\ n_{z,i} \leftarrow n_{z,i} + N_{r,i}R_{z,i} \end{cases}.\qquad(56)$$

After completion of the post-processing, a secret key of size $\rangle_i$ is established for $KP_i$ and can be used by $DER_i$ and the control center. The simulator simulates the process by calculating the length of the extracted secret key, $\ell_i$, that would be generated under the same conditions in practice. The length of the extracted secret key, $\ell_i$, can be obtained as follows:

$$\ell_i = n_{x,i}(1 - h(\tilde{e}_i)) - \text{leak}_{EC} - \Delta_i,\qquad(57)$$

where $h(x)=-x \log_2 x-(1-x)\log_2(1-x)$ is the binary entropy function. $\tilde{e}_i$ is the worst-case estimate of the error rate in the Z basis for $KP_i$, and can be represented as $$\tilde{e}_i = e_1 + \xi(n_{z,i}, m = 2),\qquad(58)$$

where $e_1$ is the error rate in the Z basis (or the probability of a bit flip in one link), and m is the number of outcomes. Note that while loss correlates with the distance (see (52)), it is not necessarily true that noise correlates with the distance. This depends heavily on the optical implementation. Thus, a setting of 0.05 is used for $e_1$ which is typical in certain fiber implementations. Other values may be simulated by a general-purpose simulator, though the key rate would simply scale appropriately. In an embodiment, $\xi(n_{z,i}, m)$ can be represented as follows:

$$\xi(n_{z,i}, m) = \sqrt{\frac{2\ln(1/\epsilon) + m\ln(n_{z,i} + 1)}{n_{z,i}}},\qquad(59)$$

where $\epsilon$ is a small number, i.e., 0.000001 in an example.

In (57), $\text{leak}_{EC}$ characterizes the imperfect error correction and can be represented as follows:

$$\text{leak}_{EC} = 1.2h(e_1).\qquad(60)$$

And, $\Delta_i$ can be represented as follows:

$$\Delta_i = 2\log_2 1/(2\epsilon) + 7\sqrt{n_{x,i}\log_2(2/\epsilon)}. \tag{61}$$

Case 2: With Memory-Enhanced Quantum Repeaters

In this case, there is presented the QNSim with memory-enhanced quantum repeaters as an example to show that the QNSim can be easily modified for different protocols. Specifically, with memory-enhanced quantum repeaters, only $R_{x,i}$ and $R_{z,i}$ (in equations (51) and (55), respectively) need to be adjusted properly. Procedures and other formulations do not need to be changed. In an embodiment, the nested purification protocol is adopted for the quantum repeater protocol. This protocol connects a string of (imperfect) entangled qubit pairs to create a single distant pair of high fidelity. It can tolerate general errors and work with a polynomial overhead in time and a logarithmic overhead in the number of qubits that need to be controlled locally. Note that other protocols for repeaters or QKD can also be utilized, while the principles are similar.

In the nested purification protocol, the distance between two communicating parties (denoted as D) is divided into $2^N$ segments, each of length $L=D/2^N$, where L is the distance between two neighboring quantum nodes (as defined before) and N is the maximum nesting level, a natural number. Therefore, the number of repeaters between the two communicating parties is $2^N-1$. For $DER_i$ and the control center, the maximum nesting level (denoted as $N_i$) is therefore $\log_2(n_i+1)$. $R_{x,i}$ can then be obtained as follows:

$$R_{x,i} = p_x^2\left(2 - \frac{\eta_{tr}}{1-(1-\eta_{tr})^2}\right)^{(N_i+1)} \eta_{tr}\prod_{\mu=0}^{N_i-1} p_r^{2^\mu}, \tag{62}$$

where $\eta_{tr}$ is the transmittance in the fiber between two neighboring quantum nodes and can be determined as follows:

$$\eta_{tr} = 10^{-0.2L/10}, \tag{63}$$

where an attenuation coefficient of 0.2 dB/km is assumed for fibers. Similarly, $R_{z,i}$ can be obtained as follows:

$$R_{z,i} = (1 - p_x)^2\left(2 - \frac{\eta_{tr}}{1-(1-\eta_{tr})^2}\right)^{(N_i+1)} \eta_{tr}\prod_{\mu=0}^{N_i-1} p_r^{2^\mu}. \tag{64}$$

In an embodiment, the initial values of the parameters from (49)-(64) are given in Table 3.

TABLE 3

| Initial Values of The Parameters in QNSim | | | | | |
|---|---|---|---|---|---|
| $n_{x,i}$ | $n_{z,i}$ | $N_d$ | $B_i$ | $p_x$ | L (km) |
| 0 | 0 | 4 | $10^7$ | 0.8 | 2 |
| $t_{p,i}$ | $p_r$ | $e_1$ | $v_s$ (bit/s) | $\epsilon$ | |
| 0 | 0.5 | 0.05 | $4 \times 10^6$ | $10^{-6}$ | |

Quantum Routing for QNetGrid

Without loss of generality, a typical shortest path routing protocol is utilized in QNSim to select a route for each communicating DER, that is, to determine the value of ni. Integrating a routing protocol into QNSim provides a more realistic test environment, and the routing process can also be observed in QNSim. A routing protocol is presented along with routing scenarios in QNetGrid.

The Routing Protocol in QNSim

In a quantum network, two neighboring nodes are connected through a quantum link, and each link is associated with a weight, representing the physical distance or the transmission delay of the link. The shortest path routing aims to find a route for two communicating nodes along the links such that the sum of link weights is minimum. For simplification, in an embodiment, the links are assumed to have the same weight, i.e., 1. Note that each link's weight can be different and even dynamically changing in practice, while the routing principle remains the same.

The shortest path routing in QNSim utilizes a distance vector to form a routing table for each node, which contains information including a list of reachable destinations, the total cost (i.e., the sum of total link weights) to each reachable destination, and the next neighboring node ID to reach there. Specifically, the protocol works as follows:

Multiple rounds are involved. In the first round, each node only has its neighbors' IDs and the costs involved. Each node then sends to each neighbor its routing table, which, in this case, contains its neighbors' IDs, the total cost to each, and its own ID. When each node receives the information from a neighbor, it compares the information with that in its own routing table. Any new information will be inserted into the routing table. In every next round, each node sends its updated routing table to its neighbors, and when a node receives information, its routing table is further updated. Over time, each node finds the next neighbors to which it should reach and the total costs of all destinations.

It is noted that each node only has its local information in the routing protocol in an embodiment. There are also some global routing protocols and other local routing protocols; but the routing principles are similar.

In a further embodiment, when a route has been established for a pair of two communicating parties, it is not allowed to be used for other pairs of communicating parties. This is reasonable, as there exists a physical speed limit for transmitting signals over a quantum channel. If multiple pairs of communicating parties share the same quantum link, the signal transmission speed on that link for each pair of communicating parties will inevitably be reduced. In an embodiment, each quantum link is used only for one pair of communicating parties at each moment. Note that the system configuration can be updated at different times. This setting guarantees that a communicating device lacking keys will obtain the best key service, that is, the fastest key generation. Those communicating devices with enough key bits in their key pools may find longer routes without affecting their normal operations.

QNetGrid Routing Scenarios

In an embodiment, three critical factors can affect the overall routing performance in QNetGrid with multiple communicating DERs: 1) DER routing sequence, 2) node priority, and 3) DER location. The DER routing sequence is the sequence of DERs that select routes. The node priority is the sequence of route selection when there are multiple routes with the same minimum cost during the routing process.

Figures 31A, 31B:
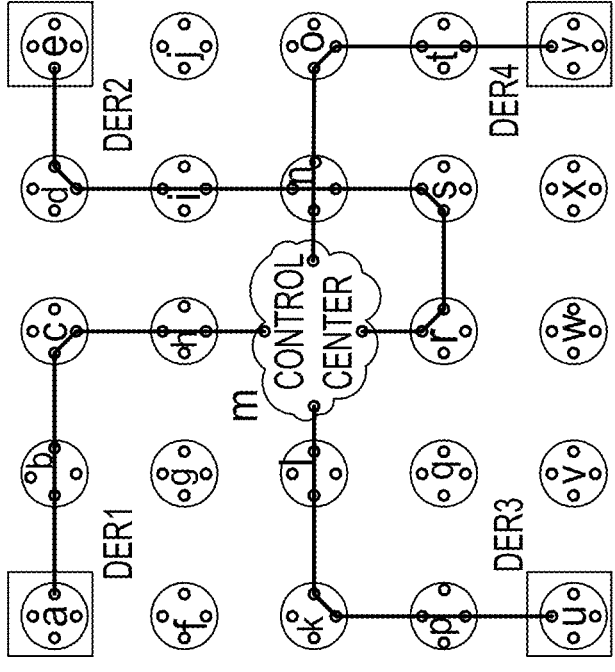
FIG. 31B depicting when the node priority is "a" to "y" in an embodiment.

FIG. 31 shows a Quantum routing for QNetGrid with FIG. 31A depicting when there are two or more neighbors that can connect to the control center at the same minimum cost, the node priority is "a" to "y", and the DER routing sequence is $DER_1$-$DER_2$-$DER_3$-$DER_4$; FIG. 31B depicting when the node priority is "a" to "y", and the DER routing sequence is changed to $DER_1$-$DER_3$-$DER_4$-$DER_2$.

Figures 32A, 32B:
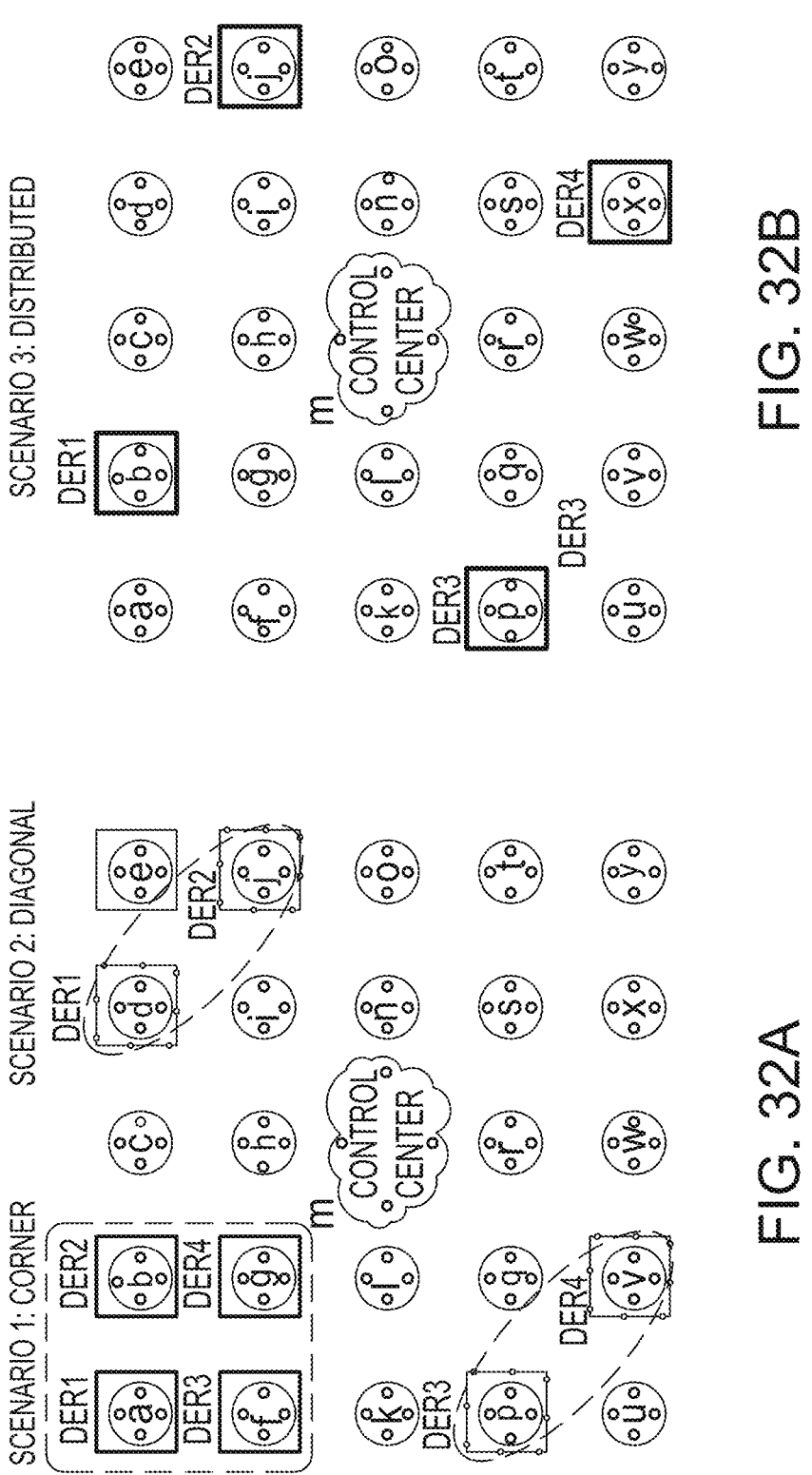
FIG. 32A depicts example three DER placements in QNetGrid including two example scenarios 1 and 2 (e.g., Corner and Diagonal) and FIG. 32B showing a third example scenario (e.g., Distributed)

FIG. 31 gives two examples of routing results, where each node is assigned an ID, from "a" to "y", respectively. In FIG. 31A, the DER routing sequence is $DER_1$-$DER_2$-$DER_3$-$DER_4$, meaning $DER_1$ first selects a route, and this is followed by $DER_2$, $DER_3$, and $DER_4$, respectively. The node priority is from "a" to "y", which means that for each node, when there are two or more neighbors that can reach the control center with the same minimum cost, the selection priority is from "a" to "y". With this node priority and the DER routing sequence, all DERs can find a route connecting to the control center. However, when the node priority remains the same and the DER routing sequence is changed to $DER_1$-$DER_3$-$DER_4$-$DER_2$, the overall routing performance becomes worse as illustrated in FIG. 31B, where for $DER_2$, five quantum repeaters are included along the route, causing a longer communication distance between $DER_2$ and the control center. In addition, the DER location plays a vital role in the overall QNetGrid routing performance. In an example, three DER placements in the quantum network are investigated, referred to as corner, diagonal, and distributed placements, as exemplified in FIGS. 32A, 32B. In particular, FIG. 32A depicts example three DER placements in QNetGrid including two example scenarios 1 and 2 (e.g., Corner and Diagonal) and FIG. 32B shows a third example scenario (e.g., Distributed).

Grid Model and Operation

Figure 33:
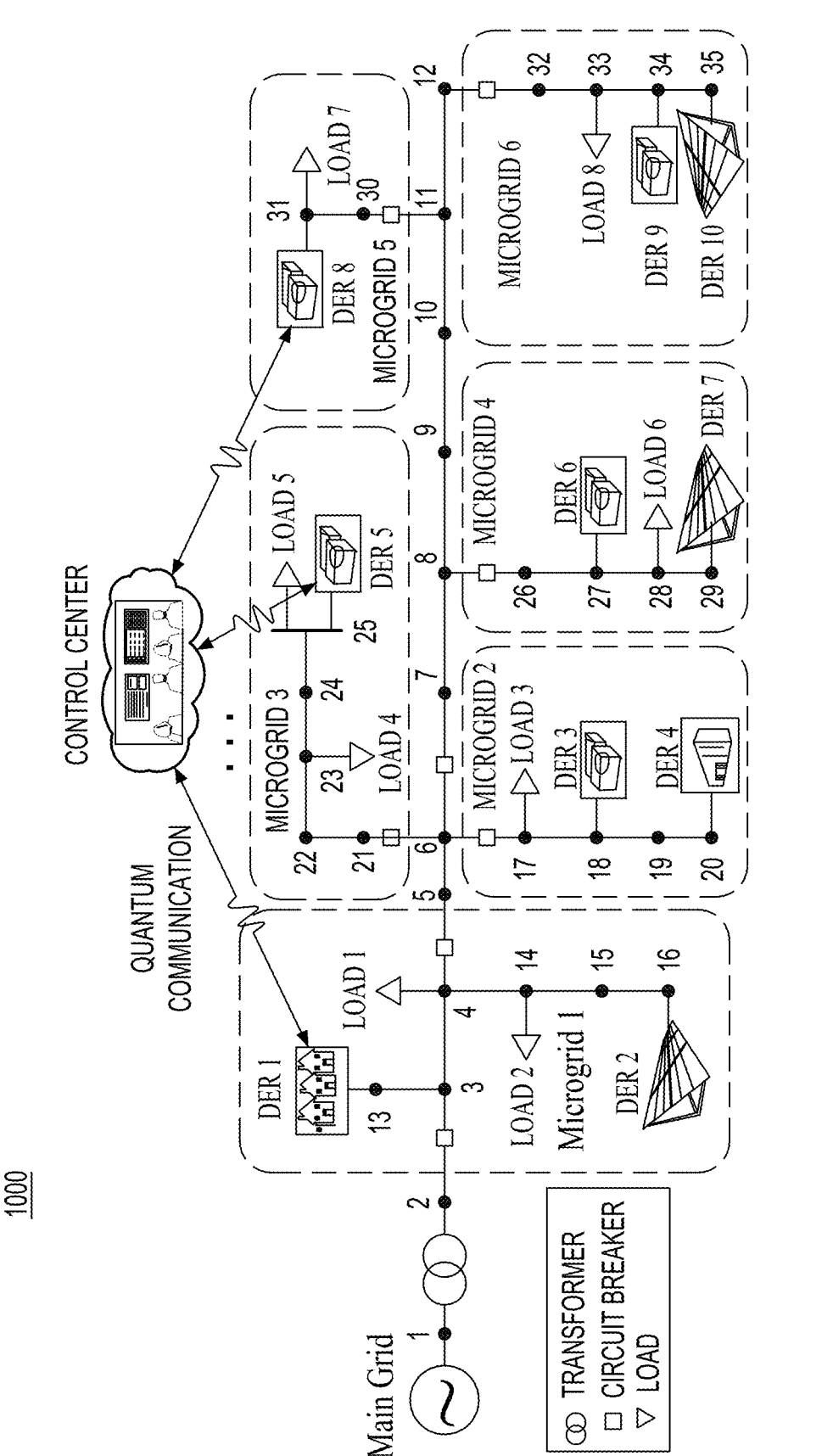
FIG. 33 depicts a one-line diagram of the communication-based six-microgrid system in an embodiment.

A communication-based six-microgrid NMGs system 1000 in the form of a one-line diagram of the system is depicted in FIG. 33 to evaluate the performance of QNet-Grid in different scenarios. The system 1000 contains six microgrids including ten DERs and eight power loads, and can operate in either grid-connected or islanded mode depending on whether the circuit breaker between buses 2 and 3 is closed or open. In an embodiment, it operates in the islanded mode.

Specifically, all DERs use traditional droop control as the primary control strategy to maintain the system frequency and voltage. Among all the DERs, some DERs are only equipped with the droop controller, while some have a secondary controller, i.e., the power-sharing-based control strategy, as will be discussed later, above the droop controller. The DERs with droop and secondary controllers will communicate with the control center, whereas the DERs with only the droop controller will not. The number of communicating DERs can vary in different test scenarios. Let $N_d$ be the number of communicating DERs (which is also the number of key pools as mentioned), and $N_m$ be the number of DERs without communication.

For DERs without communication, the reference frequency and output voltage of the $j^{th}$ DER inverter can be expressed as follows:

$$\begin{cases} \omega_{r,j} = \omega_{0,j} - K_{P,j}P_j \\ v_{rd,j} = v_{0d,j} - K_{Q,j}Q_j \\ v_{rq,j} = 0, \, j = 1, 2, \ldots, N_m \end{cases} \quad (65)$$

where $\omega_{r,j}$ is the reference frequency of the $j^{th}$ DER inverter. $v_{rd,j}$ and $v_{rq,j}$ are the reference d-axis and q-axis output voltages of the $j^{th}$ DER inverter, respectively. $\omega_{0,j}$ and $v_{0d,j}$ are the nominal set points of frequency and d-axis output voltage of the $j^{th}$ DER inverter, respectively. $P_j$ and $Q_j$ are the real and reactive output power of the $j^{th}$ DER inverter, respectively. $K_{P,j}$ and $K_{Q,j}$ are the frequency and voltage droop coefficients for the $j^{th}$ DER inverter, respectively.

One rationale of this controller is to fine-tune the reference frequency and voltage by using the actual real and reactive power sharing from other communicating DERs. It uses information on the total real power generation of all communicating DERs $$\left( P_{tot} = \sum_{i=1}^{N_d} P_i \right)$$

and the reactive power generation of all communicating DERs $$\left( Q_{tot} = \sum_{i=1}^{N_d} Q_i \right),$$

where $P_i$ and $Q_i$ are the real and reactive power generation of $DER_i$, respectively. When the power-sharing-based controller is added above the droop controller, the reference frequency and voltage of the $DER_i$ inverter are given by $$\begin{cases} \omega_{r,i} = \omega_{0,i} - K_{P,i}P_i + K_{Ps,i}(\alpha_{P,i}P_{tot} - P_i) & (66) \\ v_{rd,i} = v_{0d,i} - K_{Q,i}Q_i + K_{Qs,i}\int(\alpha_{Q,i}Q_{tot} - Q_i)dt, \\ v_{rq,i} = 0, \, i = 1, 2, \ldots, N_d \end{cases}$$

where $\omega_{r,i}$, $\omega_{0,i}$, $K_{P,i}$, $v_{rd,i}$, $v_{0d,i}$, $K_{Q,i}$, and $v_{rq,i}$ have the same meaning as $\omega_{r,j}$, $\omega_{0,j}$, $K_{P,j}$, $v_{rd,j}$, $v_{0d,j}$, $K_{Q,j}$, and $v_{rq,j}$ in equation (65), respectively, except that they are for the $i^{th}$ DER inverter among communicating DERs. $K_{Ps,i}$ and $K_{Qs,i}$ are real and reactive power sharing gains of the $DER_i$ inverter, respectively, and $\alpha_{P,i}$ and $\alpha_{Q,i}$ are the coefficients with respect to the desired sharing of real and reactive power by $DER_i$, respectively. Specifically, there is obtained $$\sum_{i=1}^{N_d} \alpha_{Ps,i} = 1 \text{ and } \sum_{i=1}^{N_d} \alpha_{Qs,i} = 1.$$

With the secondary controller, each communicating DER (e.g., $DER_i$) periodically sends its $P_i$ and $Q_i$ to the control center. The control center updates $P_{tot}$ and $Q_{tot}$ using the information received from all communicating DERs, and sends $\alpha_{P,i}P_{tot}$ and $\alpha_{Q,i}Q_{tot}$ to $DER_i$. When each communicating DER receives the data from the control center, its reference frequency and voltage are updated according to (66). Some critical parameters of the system are given in Tables 4 and 5.

TABLE 4

| Power Loads at Each Bus in FIG. 33 | | |
|---|---|---|
| Load | P (kW) | Q (KVAR) |
| 1 | 10 | 5 |
| 2 | 5 | 2 |
| 3 | 10 | 5 |

41

TABLE 4-continued

Power Loads at
Each Bus in FIG. 33

| Load | P (kW) | Q (KVAR) |
|---|---|---|
| 4 | 5 | 2 |
| 5 | 5 | 2 |
| 6 | 15 | 7 |
| 7 | 10 | 5 |
| 8 | 15 | 7 |

TABLE 5

Droop Control and Secondary Control Parameters

| $K_{P,j}$ | $K_{Q,j}$ | $K_{P,i}$ | $K_{Q,i}$ | $K_{P_s,i}$ | $K_{Q_s,i}$ |
|---|---|---|---|---|---|
| $3 \times 10^{-5}$ | $4 \times 10^{-3}$ | $3 \times 10^{-5}$ | $4 \times 10^{-3}$ | $10^{-5}$ | $10^{-3}$ |

The QNetGrid Testbed

Figure 34:
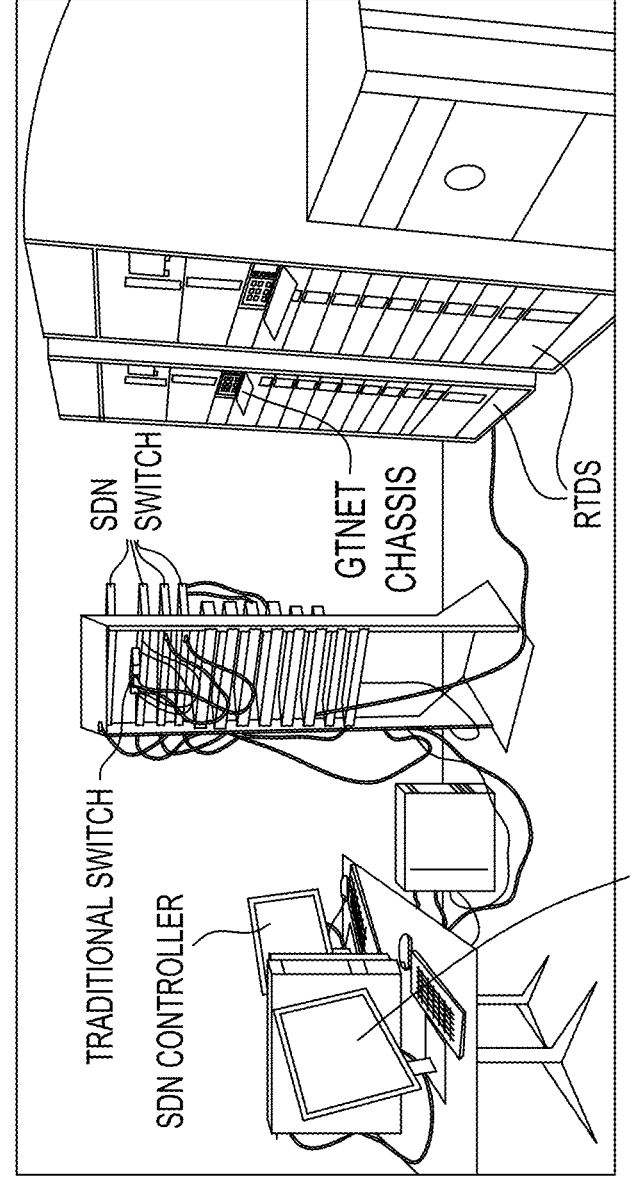
FIG. 34 depicts a QNetGrid testbed according to an embodiment.
Figure 35:
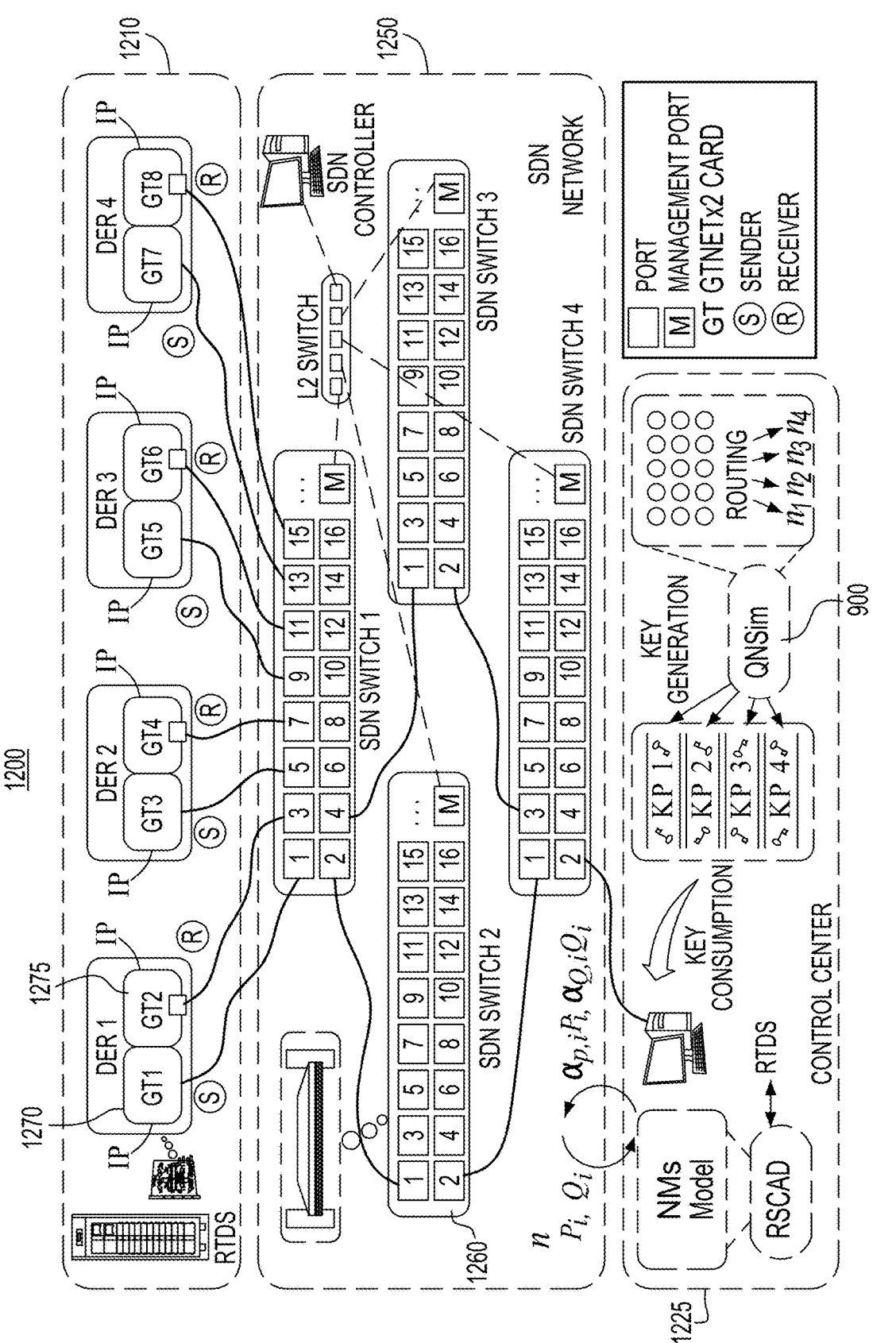
FIG. 35 depicts the hardware connection in the QNetGrid testbed of FIG. 34.

The QNetGrid testbed 1100 is illustrated in FIG. 34. The QNetGrid testbed 1100 consists of a control center, four software-defined networking (SDN) white box switches, an SDN controller, a traditional switch (L2 switch), GTNET×2 cards, and RTDS hardware. The hardware connections on the testbed is shown in FIG. 35. Specifically, in the hardware connections 1200 of FIG. 35, the six-microgrid system is developed and compiled in RSCAD, which is designed to interact with the RTDS hardware 1210. The control center 1225 and RSCAD are running on the same server. In one embodiment, the entire network is managed using the real SDN network 1250, which allows for a programmable, reliable, and efficient network management environment. It allows for real-time packet monitoring and network configuration, and greatly improves the network performance compared to traditional network management. Four SDN switches 1260, managed by an SDN controller through a traditional switch and Ethernet cables, are used in this embodiment to form a realistic network environment. Each SDN switch 1260 has a number of ports used to connect to other SDN switches or other devices such as GTNET×2 cards and servers.

In FIG. 35, the GTNET×2 cards are utilized for RTDS hardware to communicate with external devices, such as the control center running on the remote server. In an embodiment, each communicating DER has two GTNET×2 cards 1270, 1275. One is used to send $P_i$ and $Q_i$ to the control center, and the other is used to receive $\alpha_{P,i} P_{tol}$ and $\alpha_{Q,i} Q_{tol}$ sent from the control center. Each GTNET×2 card has a specific IP address, and GTNET×2 cards that receive data from the control center are assigned different ports. Note that GTNET×2 cards sending data to the control center do not need port information. The User Datagram Protocol (UDP) is utilized for communication in the testbed. The QNSim algorithm 900 of FIG. 30 is running within the control center. It continuously generates key bits and stores them in the corresponding key pools. When it receives $P_i$ and $Q_i$ from DER$_i$, a certain number of bits (e.g., 64 bits in this study) are consumed in KP$_i$. In this way, the key generation and consumption for each communicating DER are associated with the operation of the DER. Note that while different power grids have different conditions, such as topologies, operations, control paradigms, and information availability, the principles of QNetGrid can be extended to other systems, and only slight modifications are required.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The described aspects and examples of the present disclosure are intended to be illustrative rather than restrictive, and are not intended to represent every aspect or example of the present disclosure. While the fundamental novel features of the disclosure as applied to various specific aspects thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or aspects of the disclosure may be incorporated in any other disclosed or described or suggested form or aspects as a general matter of design choice. Further, various modifications and variations can be made without departing from the spirit or scope of the disclosure as set forth in the following claims both literally and in equivalents recognized in law.

What is claimed is:

1. A communications system for a plurality of microgrids comprising:

a first microgrid and a second microgrid, the first and second microgrids providing power to a load, a quantum channel connecting the first and second microgrids, the quantum channel adapted for distributing quantum generated keys between the first microgrid and second microgrid;

one or more key pools associated with the first and second microgrids for storing quantum generated keys;

a controller associated with a microgrid, the controller configured for determining a number of key bits in one key pool and comparing said number of key bits against a pre-determined threshold; and upon determining a number of key bits is below the pre-determined threshold, sharing a certain number of key bits from another key pool.

2. The communications system as claimed in claim 1, wherein the microgrid controller receives data messages from different loads; the controller, in response, sending control signals to one or more local controllers associated with a microgrid, a local controller responsive to a control signal to dynamically regulate an output power sent to the load.

3. The communications system as claimed in claim 2, wherein said controller implements a two-level key pool sharing (TLKPS) scheme to ensure a sufficient number of key bits is in a key pool for communication of said control signals, said two-level key pool sharing scheme comprising a first level key pool sharing scheme and a second level key pool sharing scheme implemented when the first level of TLKPS fails.

4. The communications system as claimed in claim 3, wherein in the first level key pool sharing scheme, a first key pool provides keys associated with communications between a first microgrid and a third microgrid and a second key pool provides keys associated with communications between a second microgrid and said third microgrid, and a controller determining whether a number of key pool bits at said first key pool and said second key pool both exceed a first predetermined threshold of key bits by a predetermined number, and when a number of key pool bits at said first key pool and said second key pool are determined to both exceed said first predetermined threshold of key bits by the predetermined number, then sharing, by the first key pool and second key pool, the predetermined number of bits above said predetermined threshold to a third key pool associated with said third microgrid.

5. The communications system as claimed in claim 4, wherein the third microgrid is configured intermediate a first microgrid and a second microgrid, the third key pool configured to distribute keys between the first microgrid and second microgrid, wherein said sharing, by the first key pool and second key pool, the predetermined number of bits above said predetermined threshold comprises:

a respective microgrid controller at said third microgrid and said first microgrid both extracting a respective string of bits of said predetermined number from said first key pool, and said third microgrid and said second microgrid both extracting the same number of bits from the second key pool, and said third microgrid applying an XOR logic function to the respective extracted two bit strings, and sends the result bit string to the second microgrid controller, the second microgrid controller then applying an XOR logic function to the result bit string with the bit string extracted previously from the second key pool such that an obtained result obtained at the second microgrid is the same as the bit string extracted by the first microgrid from the first key pool, wherein a string of bits is securely transferred from the first key pool and second key pool to the third key pool.

6. The communications system as claimed in claim 3, wherein in the second level key pool sharing scheme, a key pool inside the first microgrid or a key pool inside the second microgrid shares the predetermined number of bits above said predetermined threshold.

7. The communications system as claimed in claim 6, wherein said sharing, by the first key pool or second key pool, the predetermined number of bits above said predetermined threshold comprises:

the controller sharing a number of key pool bits from said first key pool inside the first microgrid when the number of bits at said first key pool is greater than a number of key pool bits at said second key pool inside the second microgrid.

8. The communications system as claimed in claim 7, wherein said microgrid controller is further configured for:

sharing, by the first key pool or second key pool, the predetermined number of bits when a number of key bits for communications between first and second microgrid are below the predetermined threshold, the controller extracting a string of bits from the key pool inside the first microgrid string and using extracted string as a plaintext, encrypted by the controller associated with said first microgrid via a key extracted from a third key pool associated with communications between said first microgrid and second microgrid and sent to a controller associated with said second microgrid;

the controller associated with said second microgrid using the same key from the third key pool to decrypt the received message and obtain the bit string, wherein the bit string is transferred from the first key pool for sharing with the third key pool.

9. A quantum key distribution system for networked microgrids comprising:

one or more microgrids, each microgrid providing a supply of power to loads and obtaining measurements from different loads associated with use of a microgrid;

a controller associated with a microgrid and employing control signals associated with communications among the one or more microgrids and between the microgrid and a local controller associated with said microgrid;

at least one key pool associated with one or more of said microgrids, the microgrid using quantum generated keys associated with key bits supplied from each of the at least one key pool for communications among said one or more microgrids and between the microgrid and its associated local controller, a key consumption speed associated with a rate of said communications among the one or more microgrids, wherein the controller at the microgrid is configured to transmit measurements at the microgrid as real-time messages from the microgrid to its associated local controller using a quantum generated key supplied from the key pool; and the controller at a microgrid employing a two level key pool sharing strategy to ensure there are enough key bits in each key pool.

10. The quantum key distribution system as claimed in claim 9, wherein said two level key pool sharing strategy ensures a sufficient number of key bits is in the key pool for handling said real-time messaging.

11. The quantum key distribution system as claimed in claim 9, further comprising:

a software-defined network (SDN) of switches configured to interface with said one or more microgrids and associated controllers; and an application running at a computing system associated with said software-defined network of switches, said application providing one or more software defined functionalities for said real-time messaging.

12. The quantum key distribution system as claimed in claim 11, wherein a SDN defined functionality comprises: a dynamic routing function for controlling, at an SDN switch, a flow of data at a route dependent upon a detection of a communication link failure or a rate of packets communicated in the communication link is above a threshold.

13. The quantum key distribution system as claimed in claim 11, wherein a SDN defined functionality comprises: a rate limitation function that controls a rate of packets for communication along a link based on a ratio of key generation speed and key consumption speed.

14. The quantum key distribution system as claimed in claim 11, wherein a SDN defined functionality comprises implementation of a firewall function at an SDN switch for one or more of: blocking a traffic outside of a local network, only allowing packets transmitted from certain areas, or provide separate the data paths depending upon a type of data transmission.

15. The quantum key distribution system as claimed in claim 14, further comprising: an SDN controller for managing said network of switches, said SDN controller collecting information from each of the one or more microgrids and providing routing of messages to mitigate denial of service attacks based on information of key pools each microgrid possesses and the microgrid's availability to share key bits.

16. The quantum key distribution system as claimed in claim 15, wherein said SDN controller employs an event-triggered communication scheme for reducing a communications bandwidth, wherein a first event is a bit-sharing request received at the SDN controller from any microgrid controller; and a second event is a request clearance after a key pool bit sharing is completed.

17. The quantum key distribution system as claimed in claim 16, wherein said SDN controller communicates with a controller associated with each one or more microgrid to collect key pool information associated with each microgrid; and based on said collected key pool information, updates one or more look-up tables, said one or more lookup tables accessed when an event is detected based on a request from a microgrid controller received at the SDN controller.

18. The quantum key distribution system as claimed in claim 17, wherein said lookup tables store information about each microgrid, said information comprising: local addresses of controllers and neighboring microgrid controllers that have key pools, binary bits established inside a microgrid and between two microgrids, said binary bits indicating whether a key pool is willing to share bits for other key pools or not.

19. The quantum key distribution system as claimed in claim 9, further comprising:

a quantum network layer comprising quantum nodes and connecting quantum links, and a quantum node employing an inter-node quantum entanglement.

20. The quantum key distribution system as claimed in claim 19, wherein a quantum node employs a quantum repeater, a quantum repeater being memoryless or memory-enhanced.

21. A method for operating a plurality of microgrids comprising:

providing a system having a first microgrid with a second microgrid, the first and second microgrids providing power to a load, and a quantum channel connecting the first and second microgrids, the quantum channel for distributing quantum bits between the first microgrid and second microgrid to generate secret keys;

providing one or more key pools associated with the first and second microgrids, the one or more key pools for storing quantum generated keys;

determining, using a controller associated with a microgrid, a number of key bits in one key pool and comparing said number of key bits against a pre-determined threshold; and upon determining a number of key bits is below the pre-determined threshold, sharing a certain number of key bits from another key pool.

22. The method as claimed in claim 21, further comprising:

receiving, at the microgrid controller, data messages from different loads; the controller, in response, sending control signals to one or more local controllers associated with a microgrid, a local controller responsive to a control signal to dynamically regulate an output power sent to the load.

23. The method as claimed in claim 22, further comprising:

implementing, by said microgrid controller, a two-level key pool sharing (TLKPS) scheme to ensure a sufficient number of key bits is in a key pool for communication of said control signals, the two-level key pool sharing scheme comprising a first level key pool sharing scheme and a second level key pool sharing scheme implemented when the first level of TLKPS fails.

24. The method as claimed in claim 23, wherein in the first level key pool sharing scheme, a first key pool provides keys associated with communications between a first microgrid and a third microgrid and a second key pool provides keys associated with communications between a second microgrid and said third microgrid, and a controller determining whether a number of key pool bits at said first key pool and said second key pool both exceed a first predetermined threshold of key bits by a predetermined number, and when a number of key pool bits at said first key pool and said second key pool are determined to both exceed said first predetermined threshold of key bits by the predetermined number, then sharing, by the first key pool and second key pool, the predetermined number of bits above said predetermined threshold to a third key pool associated with said third microgrid.

25. The method as claimed in claim 24, wherein the third microgrid is configured intermediate a first microgrid and a second microgrid, the third key pool configured to distribute keys between the first microgrid and second microgrid, wherein said sharing, by the first key pool and second key pool, the predetermined number of bits above said predetermined threshold comprises:

extracting, by a respective microgrid controller at said third microgrid and said first microgrid, a respective string of bits of said predetermined number from said first key pool, and a respective microgrid controller at said third microgrid and said second microgrid both extracting the same number of bits from the second key pool;

applying, by said third microgrid, an XOR logic function to the respective extracted two bit strings, and sending the result bit string to the second microgrid controller; and applying, at the second microgrid controller, an XOR logic function to the result bit string with the bit string extracted previously from the second key pool such that an obtained result obtained at the second microgrid is the same as the bit string extracted by the first microgrid from the first key pool, wherein a string of bits is securely transferred from the first key pool and second key pool to the third key pool.

26. The method as claimed in claim 23, wherein for the second level key pool sharing scheme, sharing, by a key pool inside the first microgrid or a key pool inside the second microgrid, the predetermined number of bits above said predetermined threshold.

27. The method as claimed in claim 26, wherein said sharing, by the first key pool or second key pool, the predetermined number of bits above said predetermined threshold comprises:

sharing, by the microgrid controller, a number of key pool bits from said first key pool inside the first microgrid when the number of bits at said first key pool is greater than a number of key pool bits at said second key pool inside the second microgrid.

28. A method for secure quantum key distribution among microgrids, the method comprising:

for a networked system comprising one or more microgrids, each microgrid providing a supply of power to loads and obtaining measurements from different loads associated with use of a microgrid; and a controller associated with a microgrid and employing control signals associated with communications among the one or more microgrids and between the microgrid and a local controller associated with said microgrid:

providing at least one key pool associated with one or more of said microgrids, the microgrid using quantum generated keys associated with key bits supplied from each of the at least one key pool for communications among said one or more microgrids and between the microgrid and its associated local controller, a key consumption speed associated with a rate of said communications among the one or more microgrids;

transmitting, by the controller at the microgrid, measurements as real-time messages from the microgrid to its associated local controller;

using a quantum generated key supplied from the key pool for said transmitting; and employing, by said controller at a microgrid, a two level key pool sharing strategy to ensure there are enough key bits in each key pool.

29. The method as claimed in claim 20, wherein said two level key pool sharing strategy ensures a sufficient number of key bits is in the key pool for handling said real-time messaging.

30. The method as claimed in claim 29, wherein the networked system further comprises: a software-defined network of switches configured to interface with said one or more microgrids and associated controllers; the method comprising:

providing, by an application running at a computing system associated with said software-defined network (SDN) of switches, one or more software defined functionalities for said real-time messaging.

31. The method as claimed in claim 30, wherein a SDN defined functionality comprises: a dynamic routing function for controlling, at an SDN switch, a flow of data at a route dependent upon a detection of a communication link failure or a rate of packets communicated in the communication link is above a threshold.

32. The method as claimed in claim 30, wherein a SDN defined functionality comprises: a rate limitation function for controlling a rate of packets for communication along a link based on a ratio of key generation speed and key consumption speed.

33. The method as claimed in claim 30, wherein a SDN defined functionality comprises implementation of a firewall function at an SDN switch for one or more of: blocking a traffic outside of a local network, only allowing packets transmitted from certain areas, or providing separate the data paths depending upon a type of data transmission.

34. The method as claimed in claim 30, further comprising:

managing, using an SDN controller, said network of switches, said SDN controller collecting information from each of the one or more microgrids and providing routing of messages to mitigate denial of service attacks based on information of key pools each microgrid possesses and the microgrid's availability to share key bits.

35. The method as claimed in claim 34, further comprising:

employing, by said SDN controller, an event-triggered communication scheme for reducing a communications bandwidth, wherein a first event is a bit-sharing request received at the SDN controller from any microgrid controller; and a second event is a request clearance after a key pool bit sharing is completed.

36. The method as claimed in claim 35, further comprising:

communicating, by said SDN controller, with a controller associated with each one or more microgrid to collect key pool information associated with each microgrid; and based on said collected key pool information, updating one or more look-up tables, said one or more lookup tables accessed when an event is detected based on a request from a microgrid controller received at the SDN controller.

37. The method as claimed in claim 36, wherein said lookup tables store information about each microgrid, said information comprising: local addresses of controllers and neighboring microgrid controllers that have key pools, binary bits established inside a microgrid and between two microgrids, said binary bits indicating whether a key pool is willing to share bits for other key pools or not.

* * * * *